(12) United States Patent
Agarwal et al.

(10) Patent No.: US 10,992,739 B2
(45) Date of Patent: Apr. 27, 2021

(54) INTEGRATED APPLICATION-AWARE LOAD BALANCER INCORPORATED WITHIN A DISTRIBUTED-SERVICE-APPLICATION-CONTROLLED DISTRIBUTED COMPUTER SYSTEM

(71) Applicant: VMware, Inc., Palo Alto, CA (US)

(72) Inventors: Mayank Agarwal, Palo Alto, CA (US); Eyal Maderer, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 920 days.

(21) Appl. No.: 15/005,806

(22) Filed: Jan. 25, 2016

(65) Prior Publication Data

US 2017/0214737 A1    Jul. 27, 2017

(51) Int. Cl.
*H04L 29/08* (2006.01)
*G06F 9/455* (2018.01)
*G06F 9/50* (2006.01)

(52) U.S. Cl.
CPC ...... *H04L 67/1002* (2013.01); *G06F 9/45558* (2013.01); *G06F 9/505* (2013.01);
(Continued)

(58) Field of Classification Search
CPC ......... H04L 67/02; H04L 67/06; H04L 67/10; H04L 67/32; H04L 67/1002;
(Continued)

(56) References Cited

U.S. PATENT DOCUMENTS

| 6,047,323 A * | 4/2000 | Krause | G06F 9/4426 |
| | | | 709/201 |
| 6,859,834 B1 * | 2/2005 | Arora | G06F 9/5033 |
| | | | 709/225 |

(Continued)

*Primary Examiner* — John A Follansbee
*Assistant Examiner* — James N Fiorillo

(57) ABSTRACT

The current document is directed to an integrated application-aware load-balancing component of a distributed computer system. The integrated application-aware load-balancing component is, in a described embodiment, incorporated within a distributed application that serves as a control component of multiple physical computers within a distributed computer system. The integrated application-aware load-balancing component includes a layer-4 load-balancing subcomponent that distributes communications connections initiated by remote client computers among computational nodes within the distributed computer system in order to balance the computational load applied to the distributed application and distributed computer system by the remote client computers. The integrated application-aware load-balancing component additionally includes a layer-7 load-balancing subcomponent that redistributes client requests among cluster nodes within the distributed computer system in order to enhance balancing of the computational load applied to the distributed application and distributed computer system by the remote client computers. Operation of the layer-4 and layer-7 load balancers are controlled and/or adjusted by rules and policies informed by performance and operational characteristics of the distributed application and distributed computer system.

20 Claims, 43 Drawing Sheets

(52) U.S. Cl.
CPC .......... *G06F 9/5083* (2013.01); *H04L 69/326* (2013.01); *H04L 69/329* (2013.01); *G06F 2009/4557* (2013.01)

(58) Field of Classification Search
CPC . H04L 67/1004; H04L 67/2833; G06F 9/542; G06F 9/546; G06F 9/4426; G06F 9/5027
USPC ................ 709/201, 218, 223, 226, 227, 238
See application file for complete search history.

(56) References Cited

U.S. PATENT DOCUMENTS

| | | | | |
|---|---|---|---|---|
| 6,950,848 B1* | 9/2005 | Yousefi'zadeh | .......... | G06F 9/50 707/999.01 |
| 7,072,807 B2* | 7/2006 | Brown | ...................... | G06F 8/20 703/1 |
| 7,299,294 B1* | 11/2007 | Bruck | .............. | H04L 29/12216 709/201 |
| 7,877,511 B1* | 1/2011 | Berger | ............. | G06F 17/30067 709/201 |
| 2002/0059451 A1* | 5/2002 | Haviv | ..................... | H04L 45/00 709/238 |
| 2002/0078255 A1* | 6/2002 | Narayan | ................. | G06F 9/548 719/316 |
| 2003/0009553 A1* | 1/2003 | Benfield | ............. | H04L 41/0213 709/224 |
| 2006/0168107 A1* | 7/2006 | Balan | ................. | G06F 9/505 709/218 |
| 2009/0276771 A1* | 11/2009 | Nickolov | .............. | G06F 9/4856 717/177 |
| 2010/0325287 A1* | 12/2010 | Jagadeeswaran | ....... | H04L 67/02 709/227 |
| 2011/0258638 A1* | 10/2011 | Davies | .................... | G06F 9/546 719/314 |
| 2012/0054755 A1* | 3/2012 | Evans | .................... | G06F 9/5027 718/102 |
| 2012/0144066 A1* | 6/2012 | Medved | .................. | H04L 45/02 709/242 |
| 2013/0047165 A1* | 2/2013 | Goetz | .................. | G06F 9/5027 718/105 |
| 2013/0191434 A1* | 7/2013 | Smith | ..................... | G06F 9/542 709/201 |
| 2013/0339510 A1* | 12/2013 | Douglas | .............. | H04L 41/5077 709/223 |
| 2014/0258483 A1* | 9/2014 | Mai | ........................ | H04L 67/10 709/223 |
| 2015/0039763 A1* | 2/2015 | Chaudhary | ........... | H04L 47/125 709/226 |
| 2015/0215234 A1* | 7/2015 | Shanmuganathan | ........................ | H04L 47/762 709/226 |
| 2015/0281378 A1* | 10/2015 | Kasturi | ............... | H04L 67/1004 709/223 |
| 2015/0304281 A1* | 10/2015 | Kasturi | ................ | H04L 63/105 726/1 |
| 2016/0219420 A1* | 7/2016 | Sah | ........................ | H04W 4/14 |
| 2017/0085622 A1* | 3/2017 | Gopinath | ................ | H04L 67/06 |
| 2017/0104641 A1* | 4/2017 | Bradshaw | ........... | H04L 67/2833 |
| 2017/0126790 A1* | 5/2017 | Mortsolf | ............. | H04L 67/1002 |
| 2017/0163762 A1* | 6/2017 | Nguyen | ................ | H04L 67/32 |

* cited by examiner

⋮

1208  1210
1202

2013-12-02T10:44:24.095Z li-qe-esx5.vmware.com Rhttpproxy:
[28959B90 verbose 'Proxy Req 46691'] Connected to
localhost:8307 ——— 1212         ⟵ 1206

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction

Log File

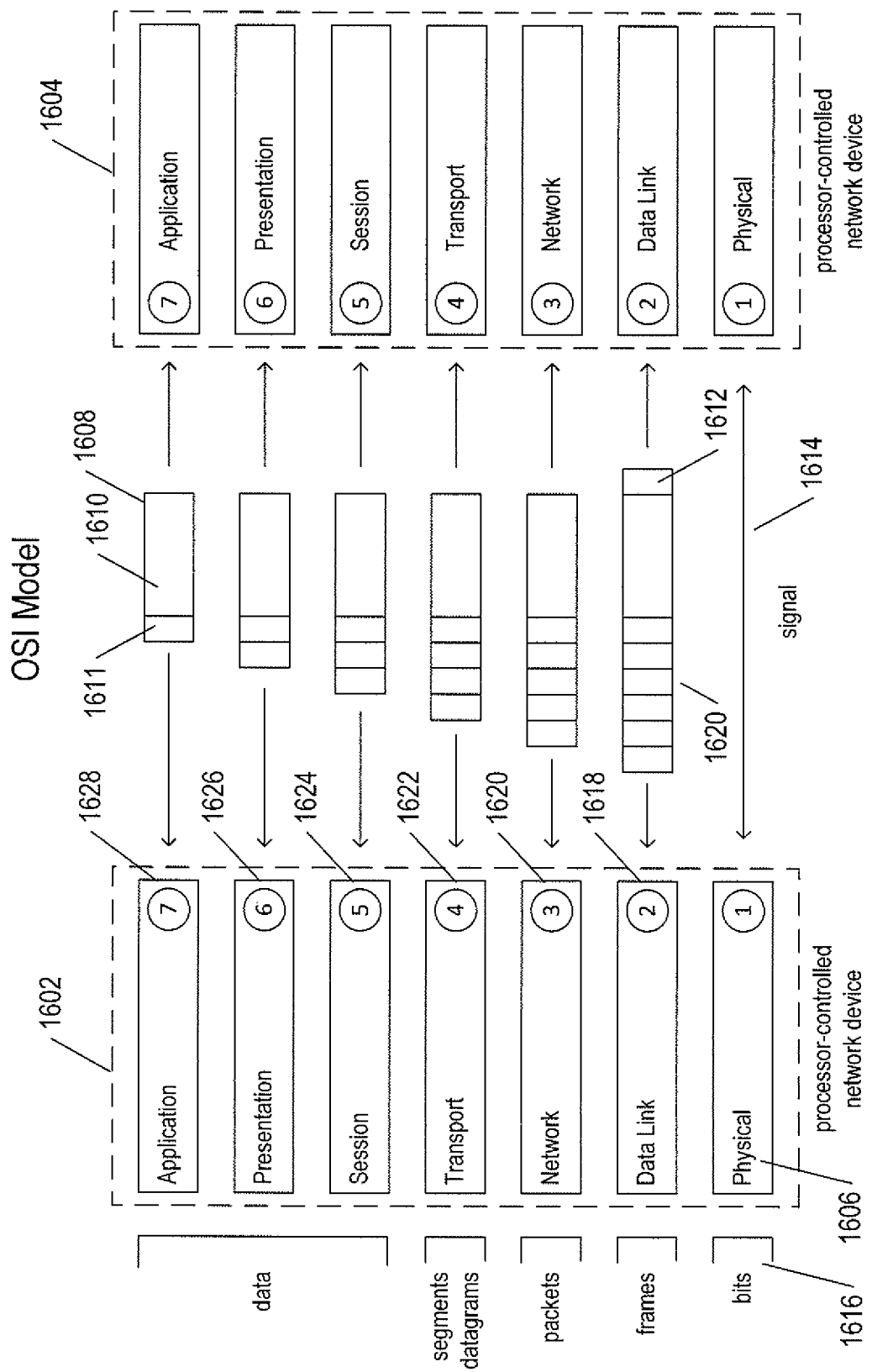

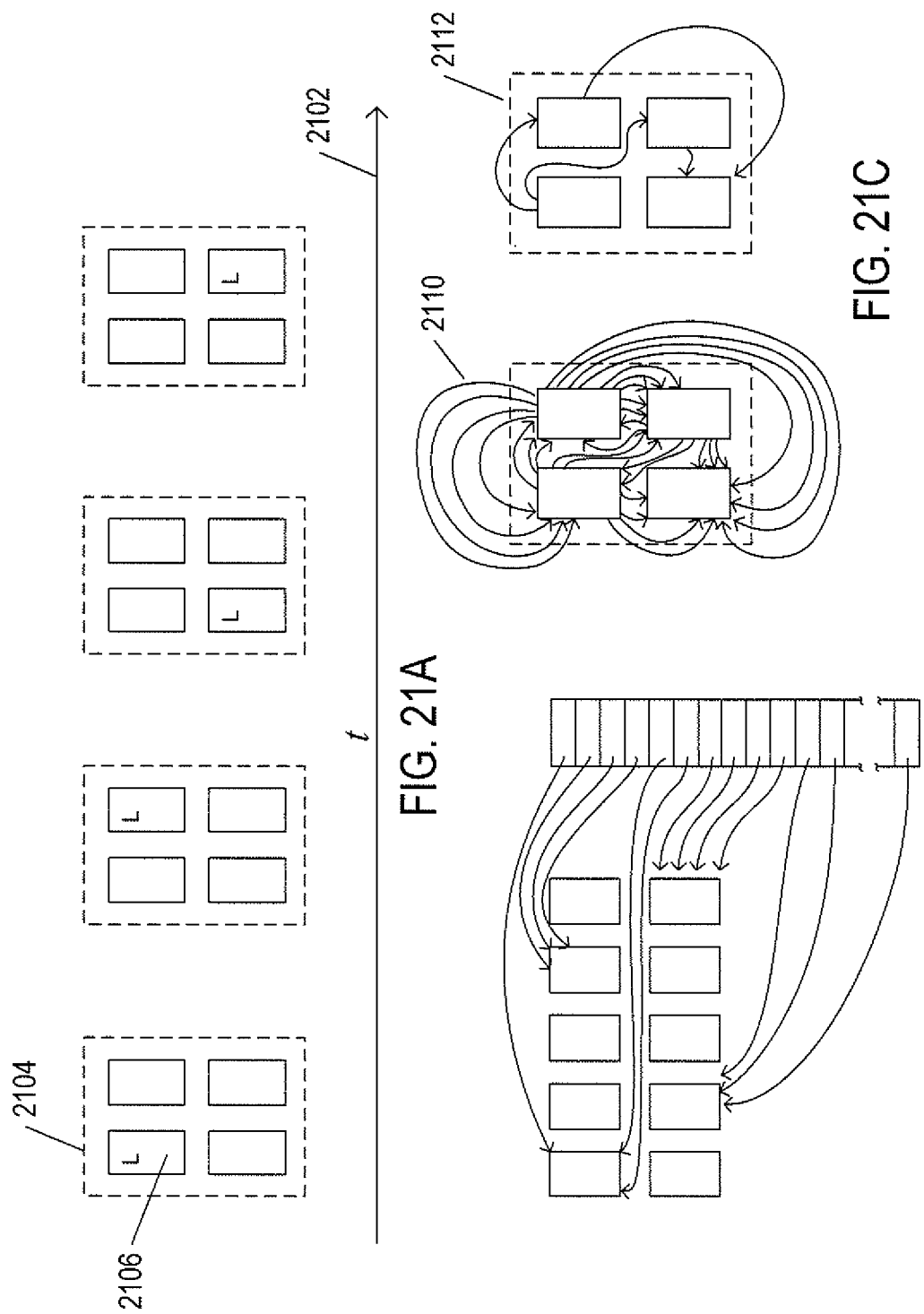

INTEGRATED APPLICATION-AWARE LOAD BALANCER INCORPORATED WITHIN A DISTRIBUTED-SERVICE-APPLICATION-CONTROLLED DISTRIBUTED COMPUTER SYSTEM

TECHNICAL FIELD

The current document is directed to distributed computer systems and distributed service applications that execute within distributed computer systems and, in particular, to integrated application-aware load balancing components of a distributed service application and distributed computer system that distribute incoming communications messages among multiple computational nodes within the distributed computer system.

BACKGROUND

For many years following the advent of electronic computer systems, application programs were executed locally within a single mainframe computer or minicomputer. Initially, applications were encoded on large sets of Hollerith cards and were executed one at a time in batch-mode processing either without the benefit of an operating system or, as computer systems evolved, using primitive operating-system-like functionality. Subsequently, modern operating systems were developed to allow many different application programs to execute concurrently within a single computer system, using techniques including time-division multiplexing to provide the appearance of simultaneous execution on a single-processor computer system. Ultimately, as computer networking, operating systems, virtualization layers, and computer hardware evolved, it became possible to execute large, compute-intensive distributed applications across multiple networked computer systems. Currently, large distributed computer systems, including cloud-computing facilities, provide users with the ability to execute large, distributed applications across multiple distributed computer centers located in different geographical locations. As one example, many large e-commerce websites execute as distributed web-server applications that execute in multiple cloud-computing facilities, each including hundreds to thousands of server computers, network-attached storage systems, multiple internal networks, and other distributed-computing-system components. Computational bandwidth and storage resources are now offered as services by large cloud-computing providers much like electricity and water are provided by utility companies.

While there has been remarkable progress in computer hardware, distributed operating systems and virtualization platforms, computer networking, and tools and techniques for designing and implementing distributed applications, many technological hurdles and problems associated with distributed applications remain. As one example, when a distributed application offers a service, through a client/response protocol or web interface, the distributed service application often supports many different internet-protocol ("IP") addresses or uniform resource locators ("URLs") to which requests for the service can be directed from client computers. The multiple IP addresses or URLs may be distributed across many different front-end server computers within many different computer centers so that the request traffic is distributed across multiple computer centers and multiple front-end servers within each of the computer centers. However, use of multiple IP addresses or URLs does not, by itself, generally provide effective balancing of the total workload applied by remote clients to the distributed service application among the many different servers or virtual servers within a distributed computer system on which the distributed service application runs. In one approach to attempting to balance the computational load over multiple servers or virtual servers, an external load-balancer system is used to distribute incoming service requests among multiple computational nodes. However, external load balancers ("ELBs") are relatively expensive, complicated to set up and operate, and are generally unable to be easily scaled as the number of servers or virtual servers that execute a distributed service application increase. Moreover, ELBs generally cannot access distributed-application-state information needed to effect anything close to an even distribution, over time, of the computational load applied by remote client devices to the distributed service application among the many servers or virtual servers controlled, at least in part, by the distributed service application. Designers and developers of distributed applications and distributed computer system continue to seek methods and systems for more efficient and robust support of distributed-application-program execution within distributed computer systems.

SUMMARY

The current document is directed to an integrated application-aware load-balancing component of a distributed computer system. The integrated application-aware load-balancing component is, in a described embodiment, incorporated within a distributed application that serves as a control component of multiple physical computers within a distributed computer system. The integrated application-aware load-balancing component includes a layer-4 load-balancing subcomponent that distributes communications connections initiated by remote client computers among computational nodes within the distributed computer system in order to balance the computational load applied to the distributed application and distributed computer system by the remote client computers. The integrated application-aware load-balancing component additionally includes a layer-7 load-balancing subcomponent that redistributes client requests among cluster nodes within the distributed computer system in order to enhance balancing of the computational load applied to the distributed application and distributed computer system by the remote client computers. Operation of the layer-4 and layer-7 load balancers are controlled and/or adjusted by rules and policies informed by performance and operational characteristics of the distributed application and distributed computer system.

BRIEF DESCRIPTION OF THE DRAWINGS

FIG. 12 shows a small, 11-entry portion of a log file from a distributed computer system.

FIG. 16 illustrates the Open Systems Interconnection model ("OSI model") that characterizes many modern approaches to implementation of communications systems that interconnect computers.

FIGS. 21A-D illustrate various goals and considerations that are addressed by the integrated application-aware load-balancing component to which the current document is directed.

DETAILED DESCRIPTION OF EMBODIMENTS

The current document is directed to an integrated application-aware load-balancing component of a distributed computer system. In a first subsection, below, computer systems, virtualization layers, and distributed computer systems are described, in overview, to provide context for a second subsection in which the integrated application-aware load-balancing component to which the current document is directed is presented both in overview and in detail.

Figure 1:
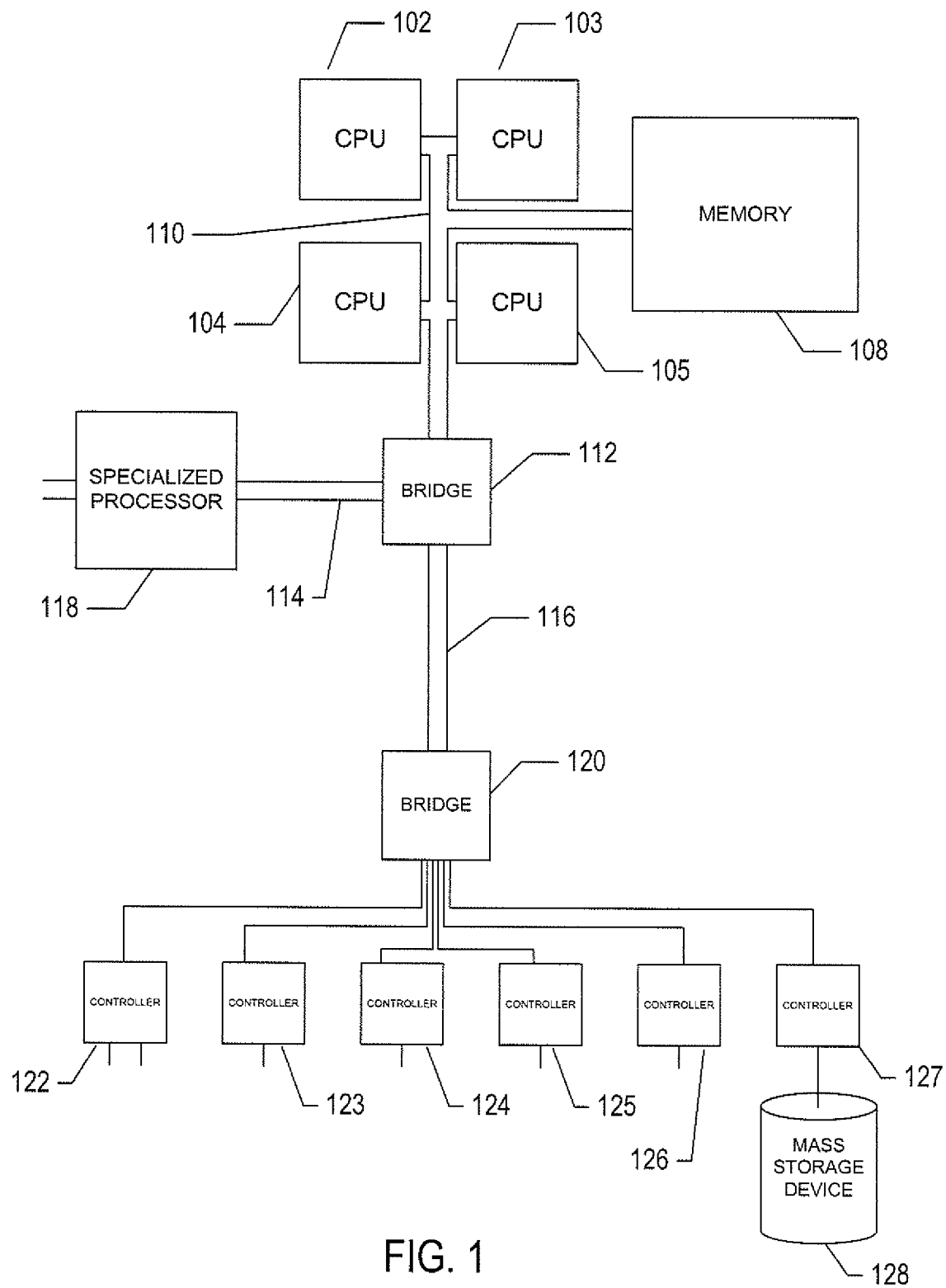
FIG. 1 provides a general architectural diagram for various types of computers.

Overview of Computer Hardware, Operating Systems, Virtualization Layers, and Distributed Computer Systems FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
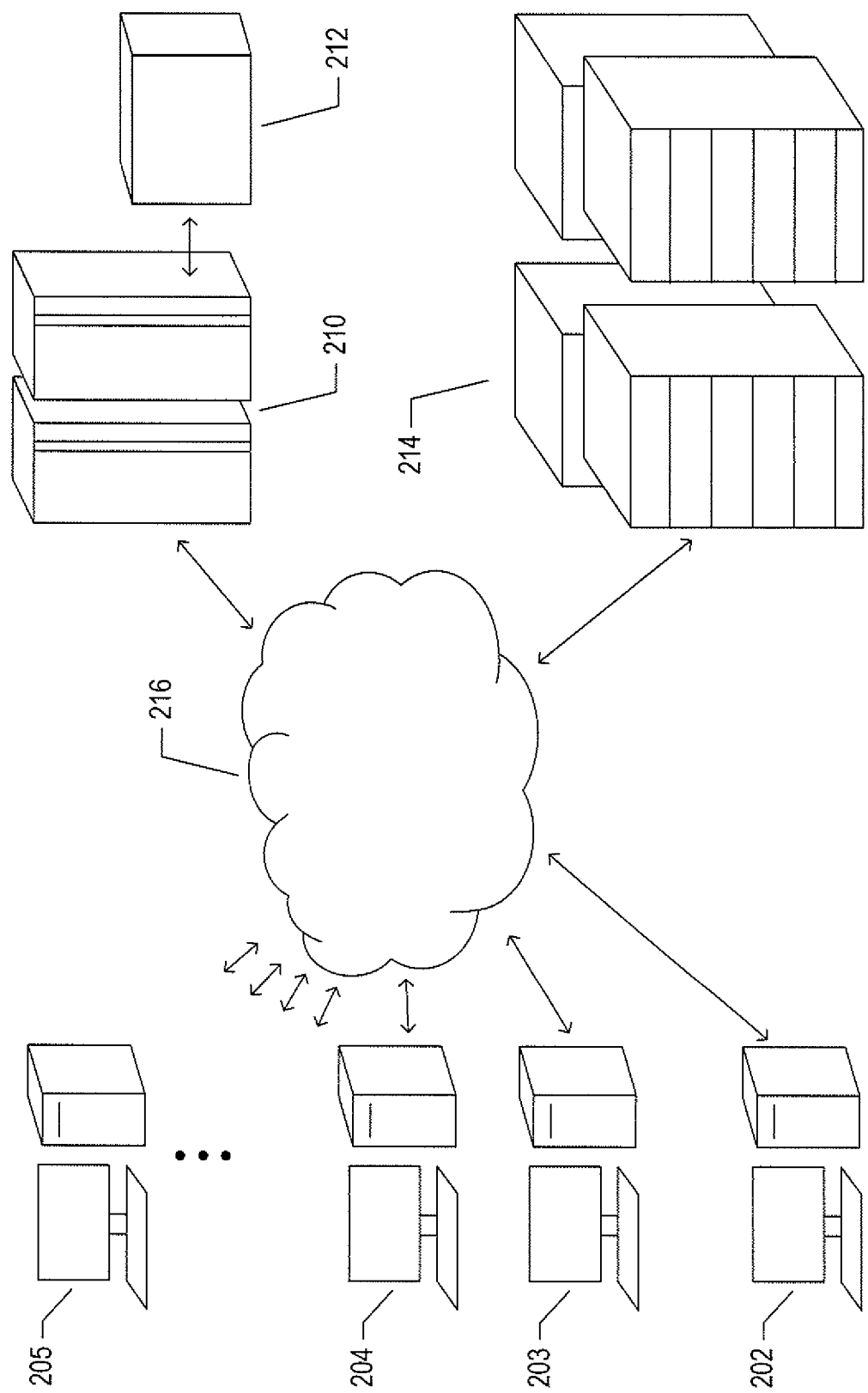
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
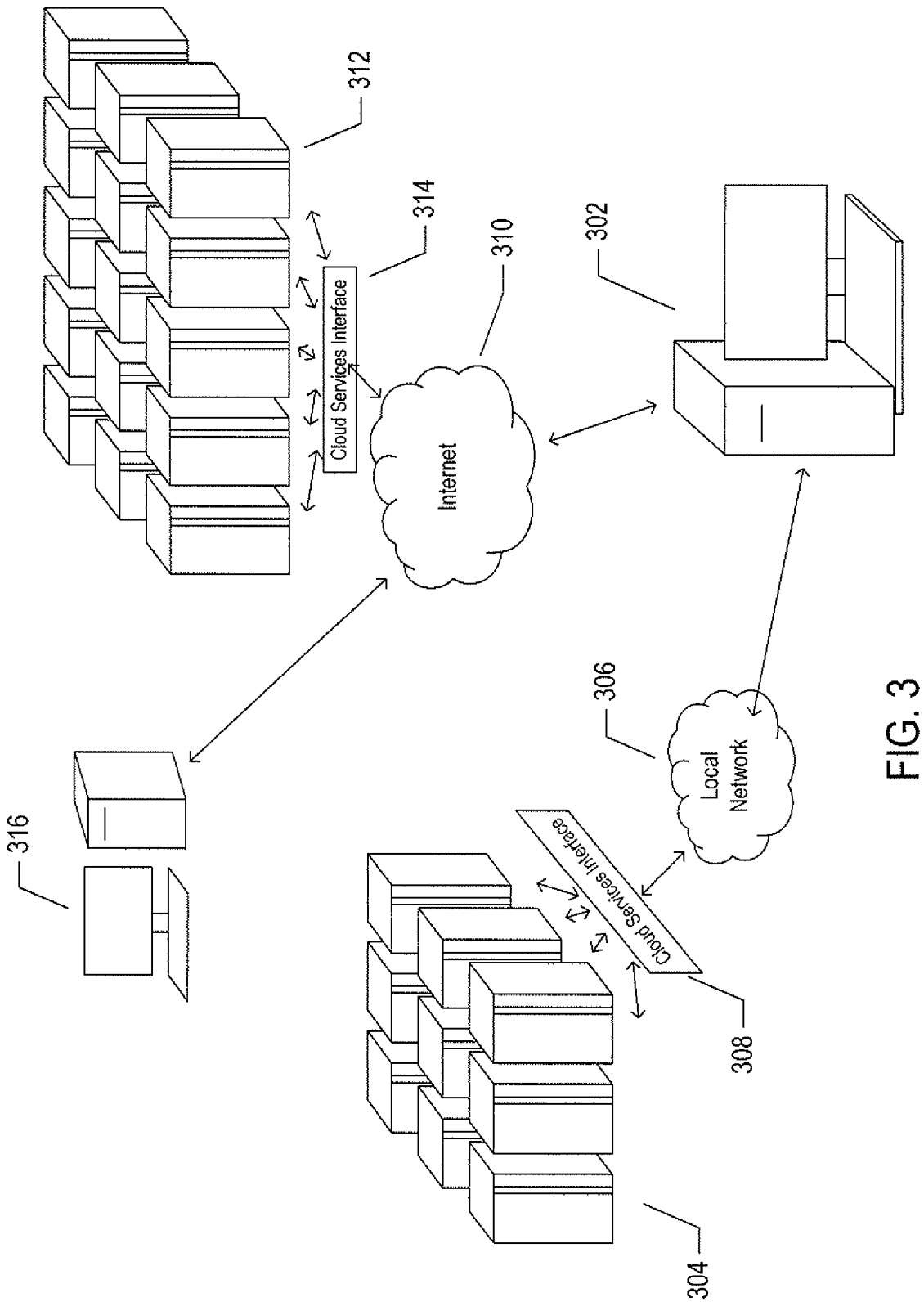
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
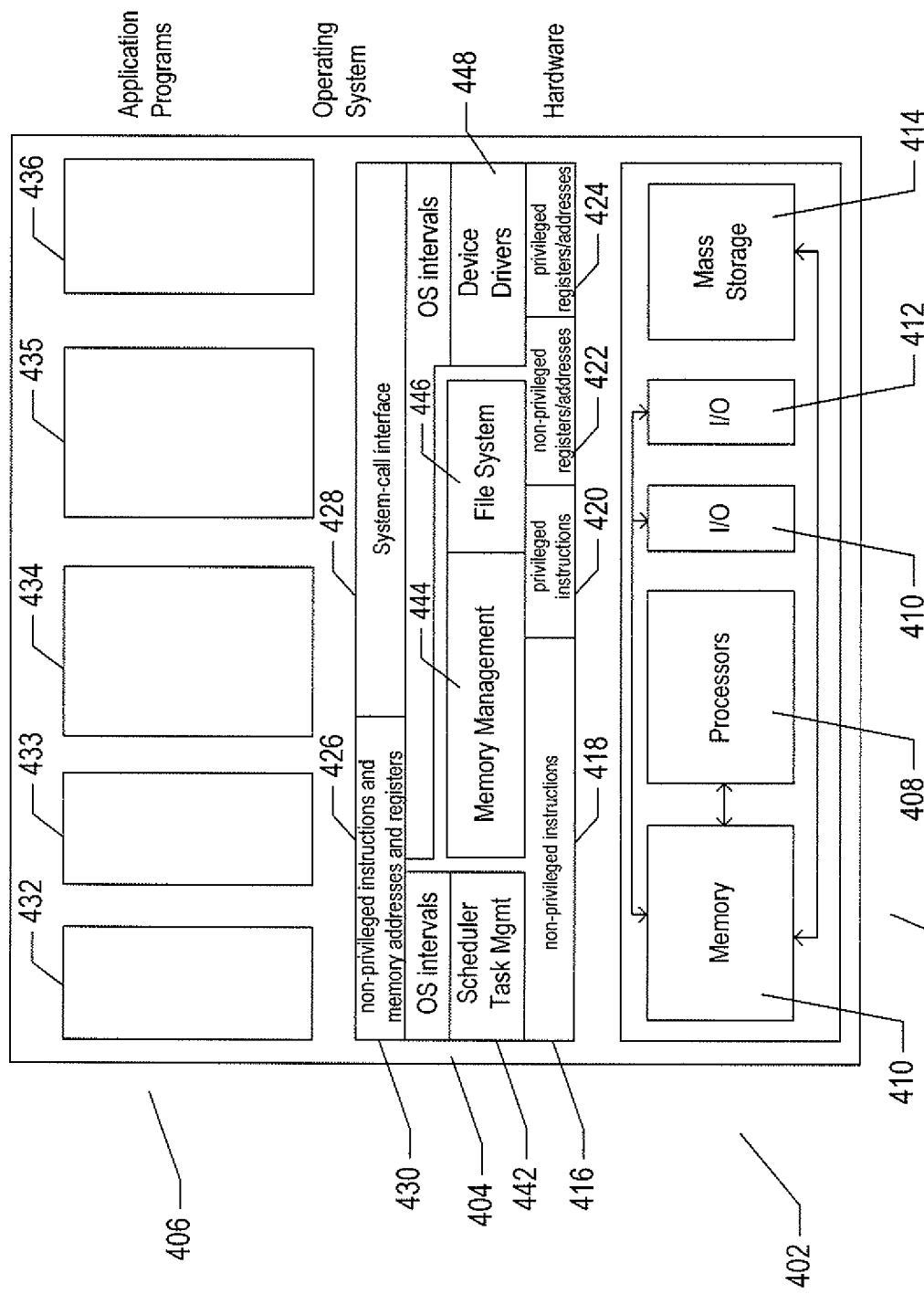
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
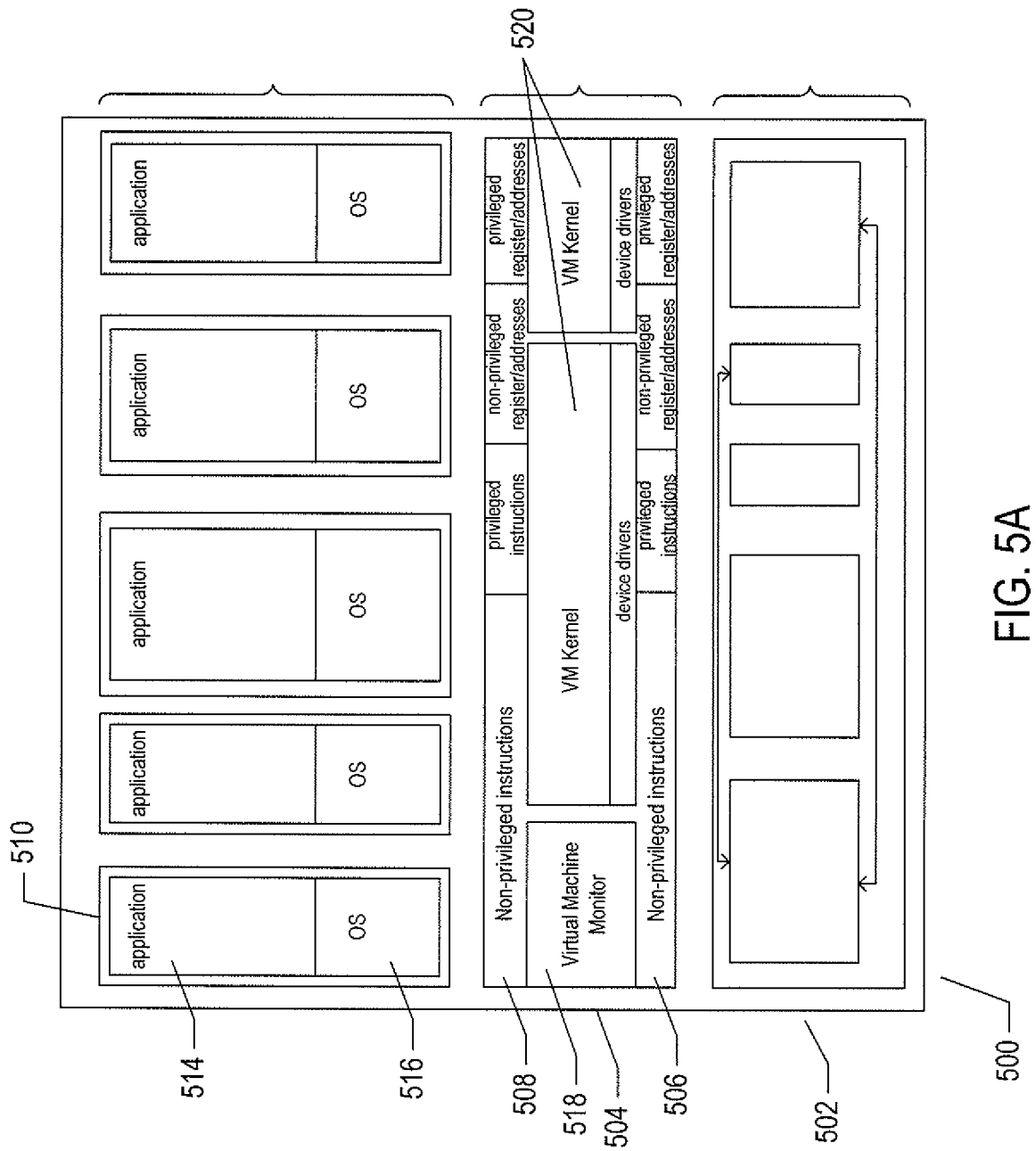
FIGS. 5A-B illustrate two types of virtual machine and virtual-machine execution environments.
Figure 5B:
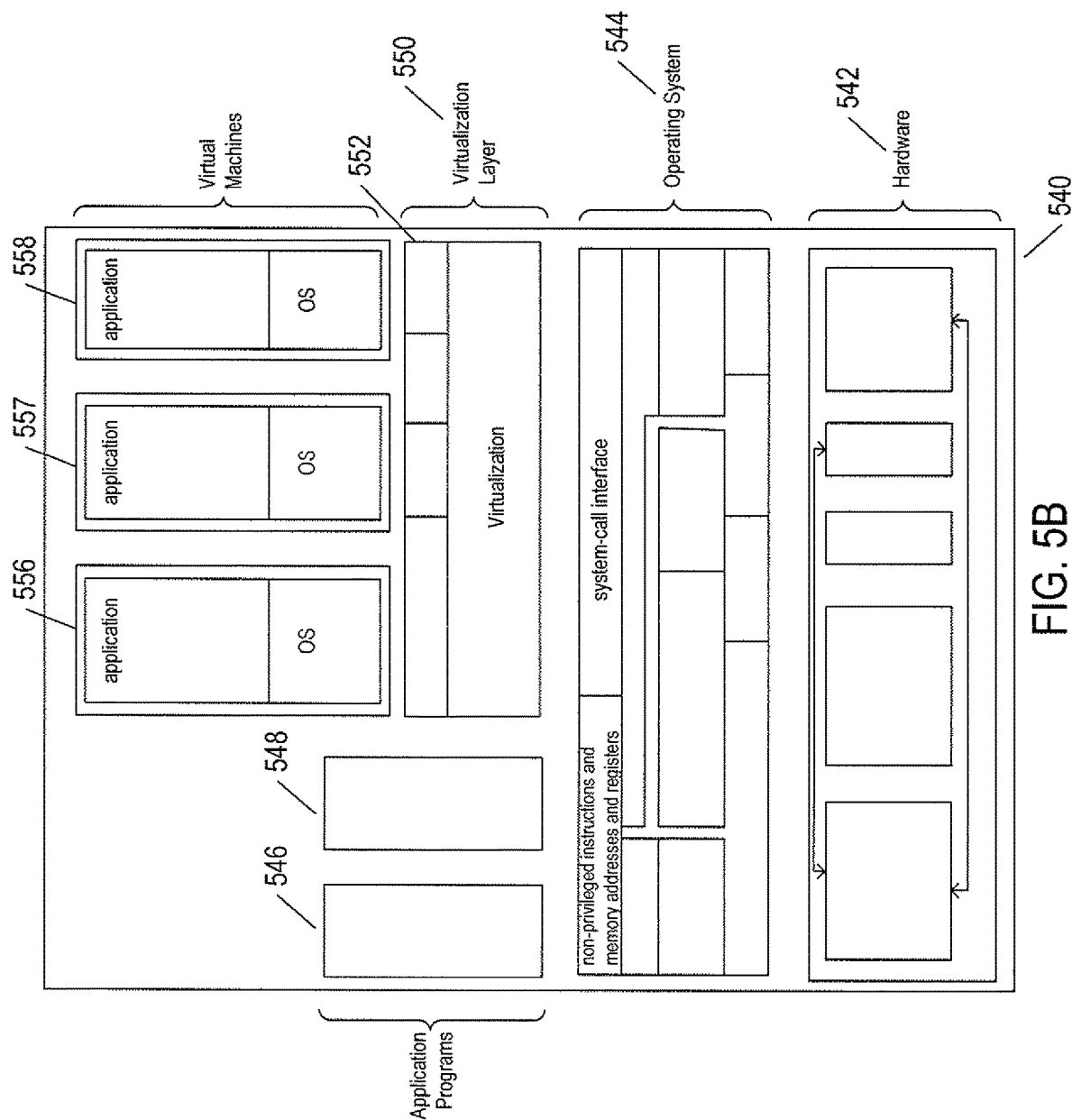

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
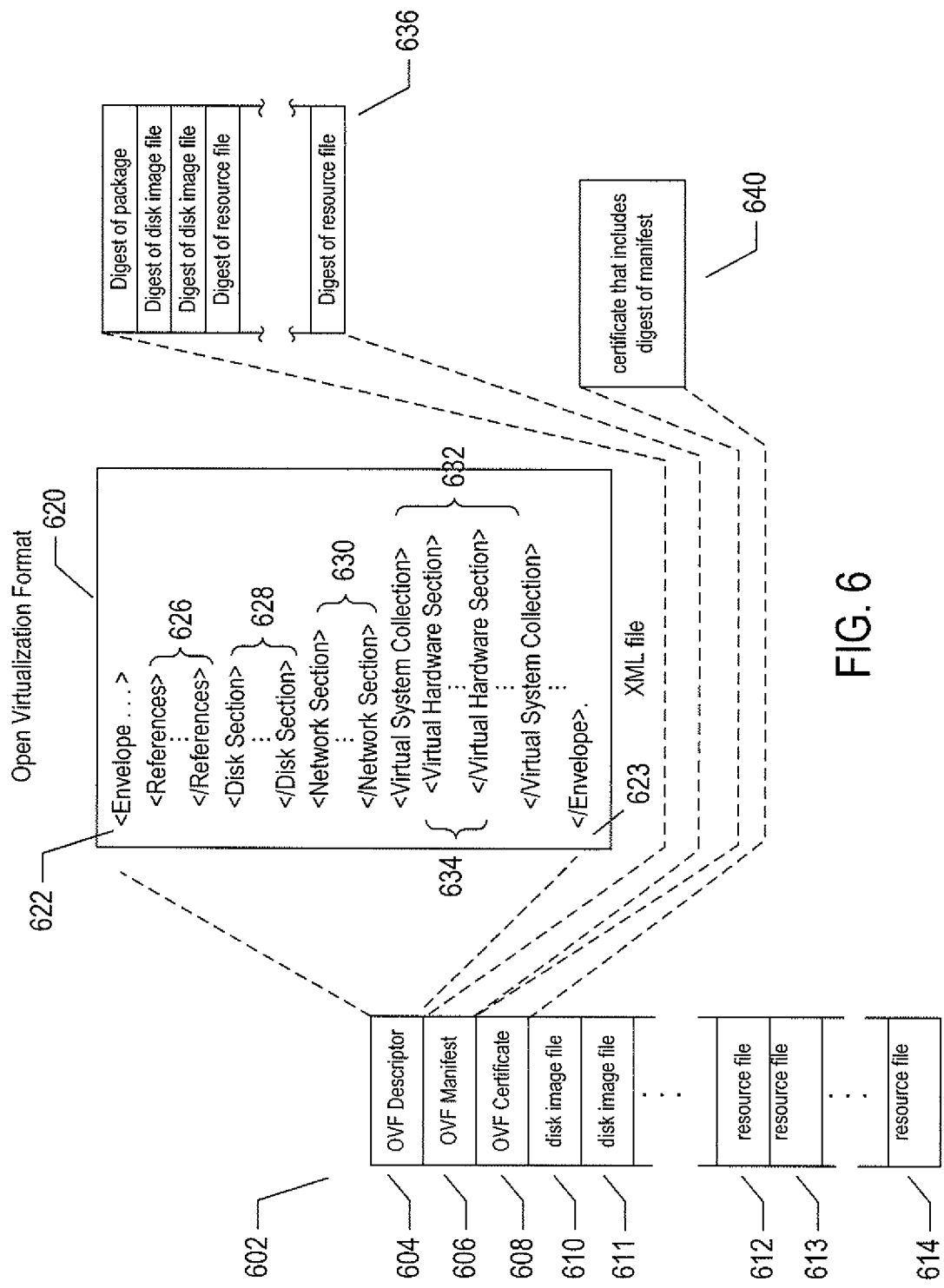
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
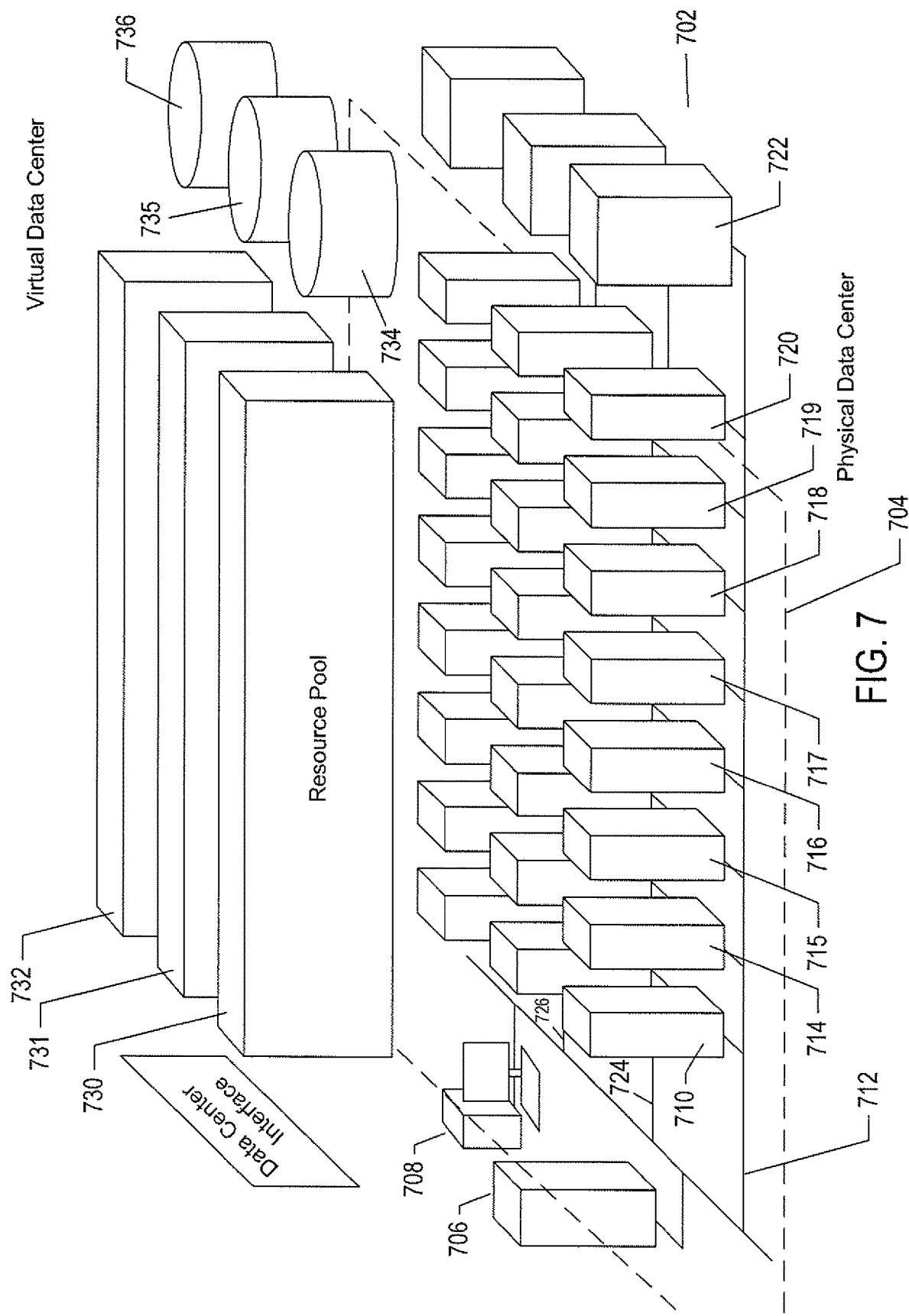
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
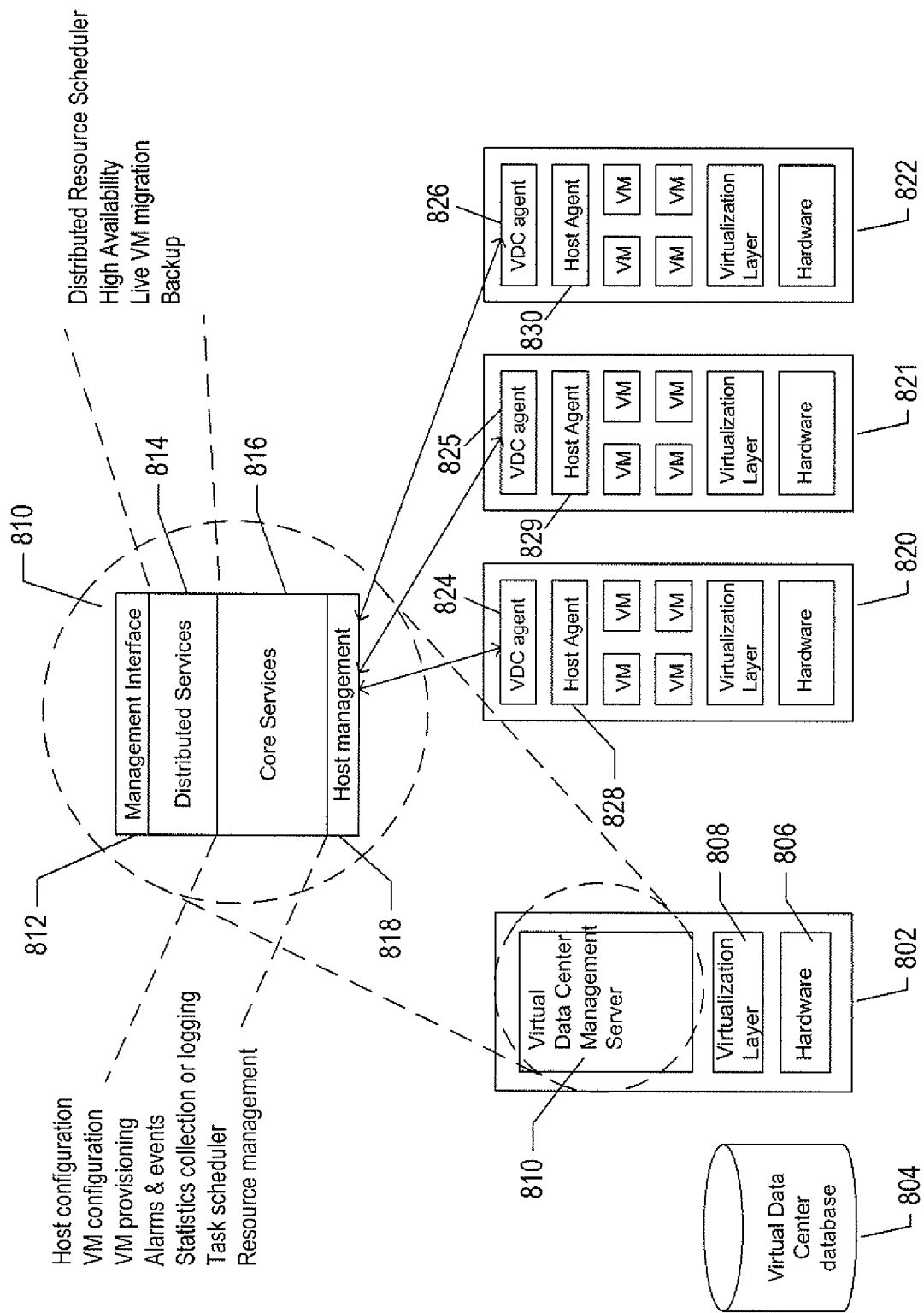
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
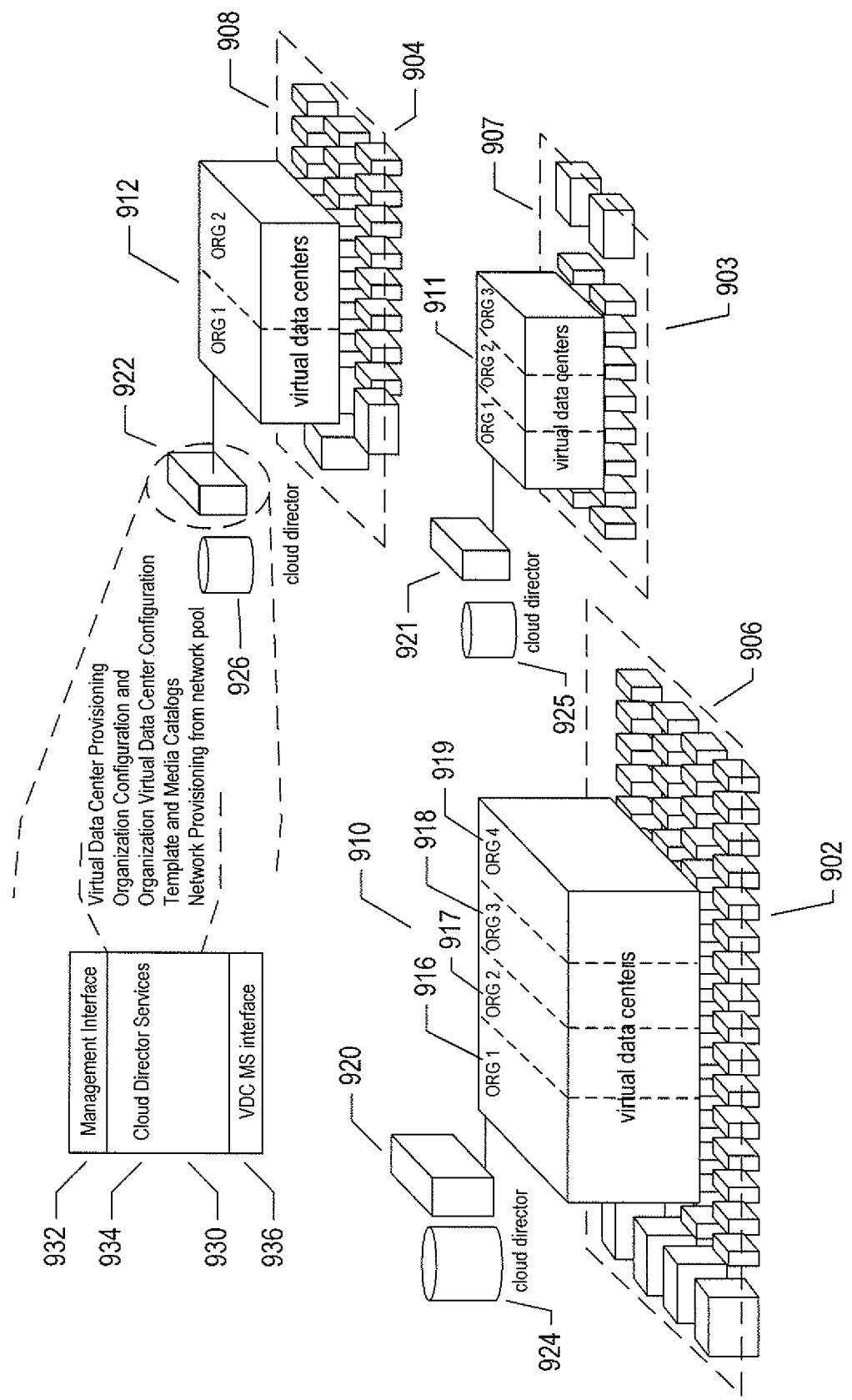
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
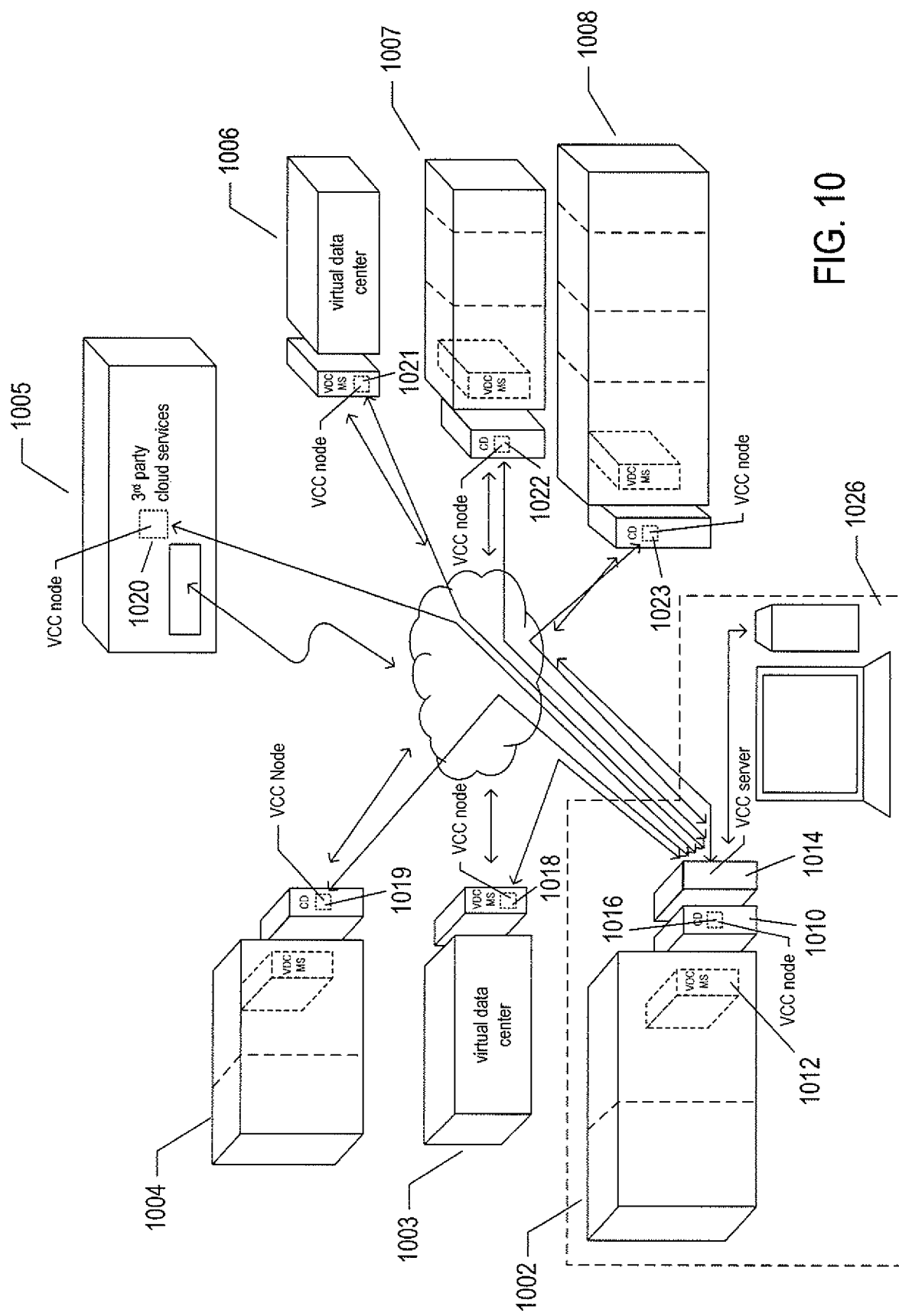
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
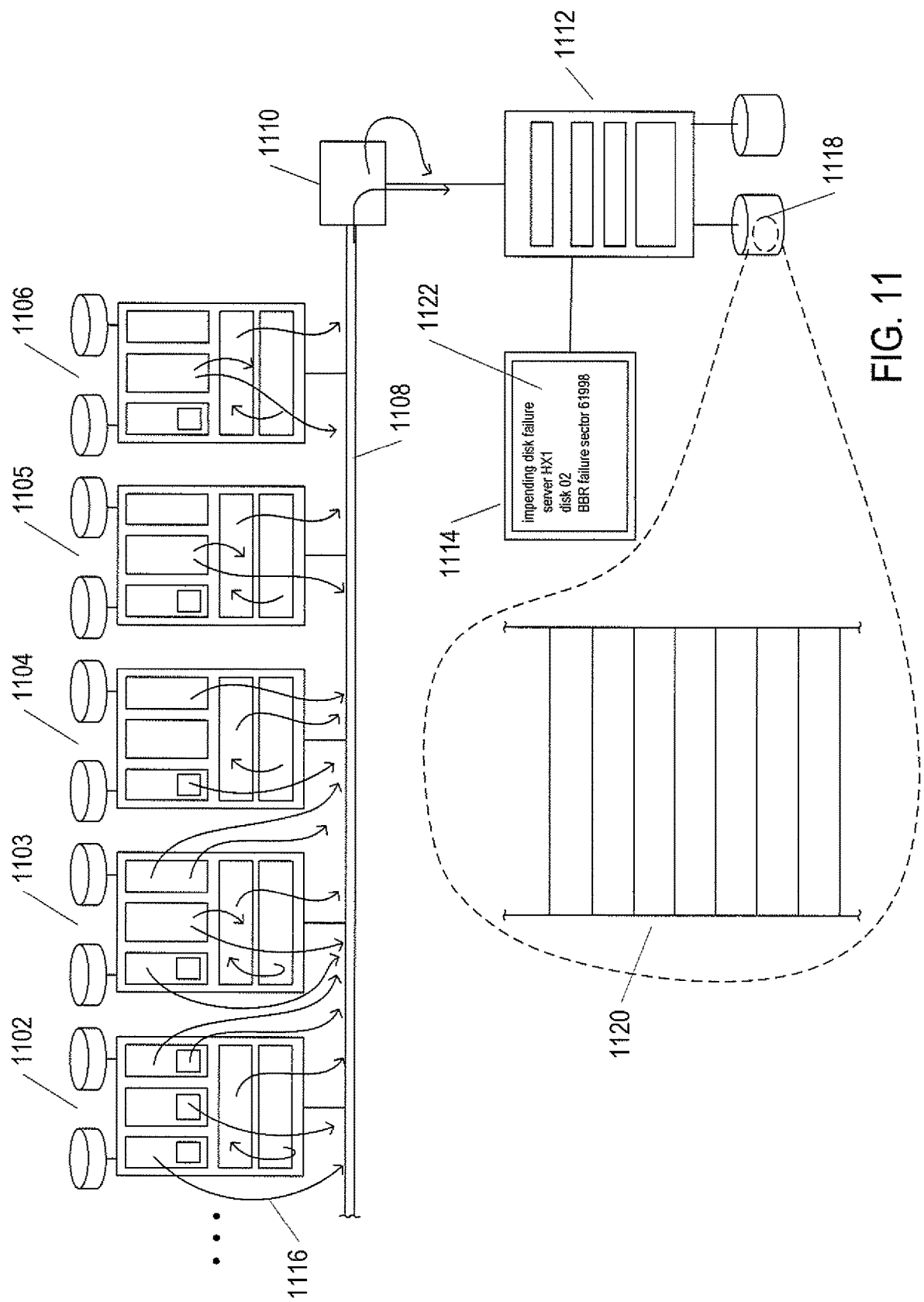
FIG. 11 illustrates a simple example of event-message logging and analysis by a distributed event-message-logging application.

As one example of a distributed application into which the currently disclosed integrated application-aware load-balancing component can be incorporated, a distributed event-message logging application is next discussed. FIG. 11 illustrates a simple example of event-message logging and analysis by a distributed event-message-logging application. In FIG. 11, a number of computer systems 1102-1106 within a distributed computer system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114. The local collection and transmission of event messages to one or more administrative computers and processing and storing of the messages by the one or more administrative computers is carried out by a distributed application that runs concurrently on many different computers, FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

It should be noted that the phrase "log file" is not intended to mean only operating-system-provided data-storage files, but includes any of many different types of event-message sources. Although, in many cases, event messages are stored in files, they may be alternatively streamed from event-message sources to administrative computers and other event-message sinks within a distributed computer system, stored and transferred in shared memory and distributed shared memory, or stored on physical media that is physically transported from a source computer to a receiving computer, It is convenient, in the following discussion, to diagram and discuss log files as files of log entries that each corresponds to an event message, but, in fact, there are many different types of sources of log-file entries.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computer systems. As mentioned above, a large, distributed computer system may generate and store terabytes of logged event messages during each day of operation. This represents an enormous amount of data to process, even were the individual event messages highly structured and precisely formatted to facilitate automated processing. However, event messages are not necessarily structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise.

Figure 13:
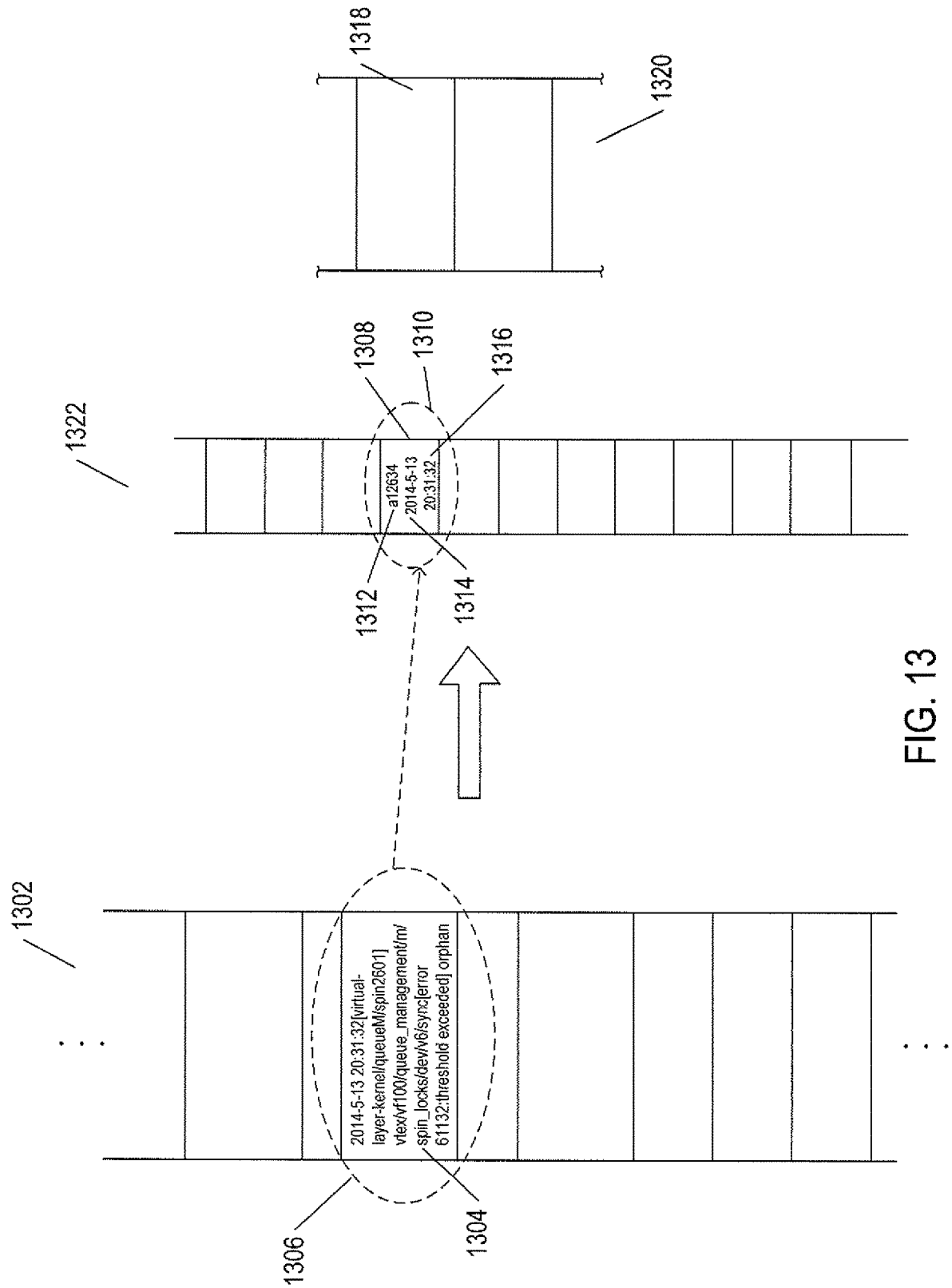
FIG. 13 illustrates the event-message-processing approach represented by the currently disclosed methods and systems.

FIG. 13 illustrates one event-message-processing method. In FIG. 13, a traditional event log 1302 is shown as a column of event messages, including the event message 1304 shown within inset 1306. The distributed event-message-logging application automatically process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, event messages may be somewhat compressed and stored as event records in log files. Many other types of processing may be carried out to standardize and normalize event messages in order to produce log files with log entries having a uniform format. For the purposes of describing the virtual-log-file system, it is assumed that the physical log files within a distributed computer system include normalized log-file entries. When this is not the case, log-file entries ingested by the virtual-log-file system may be initially normalized and efficiently stored by the virtual-log-file system to facilitate virtual-log-file-system operations.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computer system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Figure 14A:
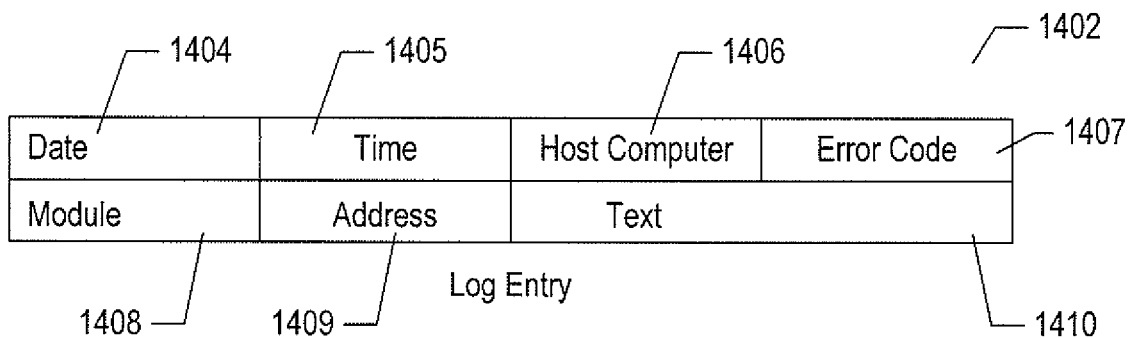
FIGS. 14A-C illustrate a simplified picture of log entries and log files.
Figure 14B:
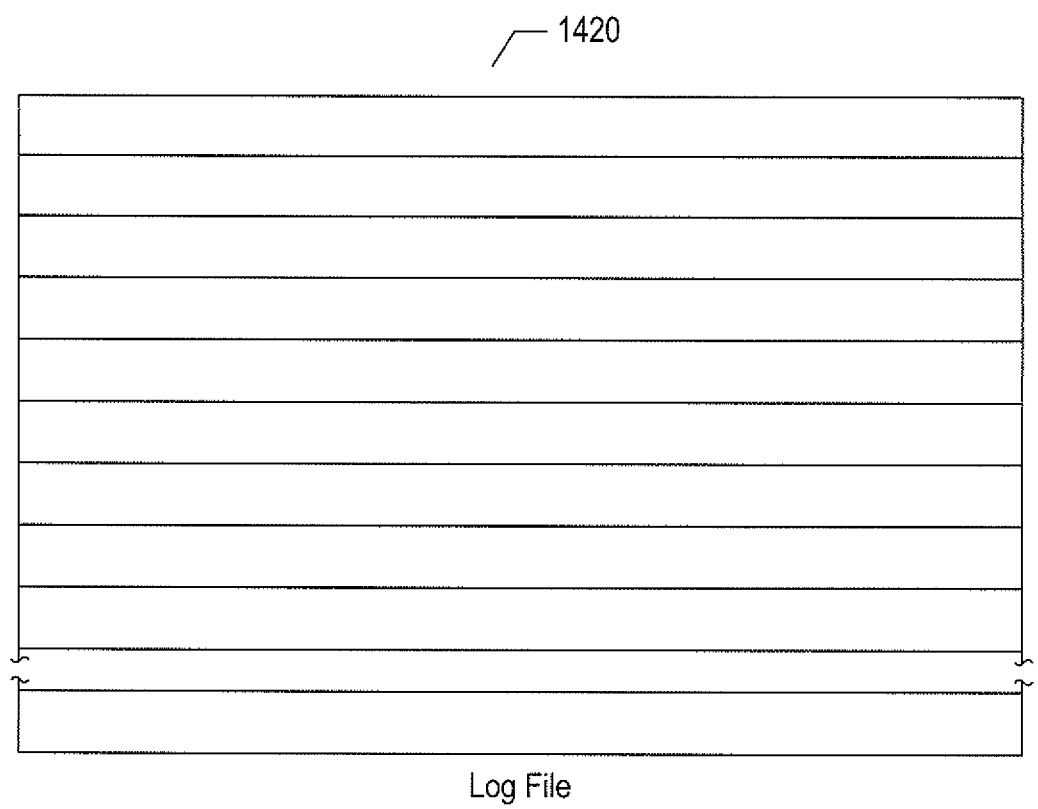
Figure 14C:
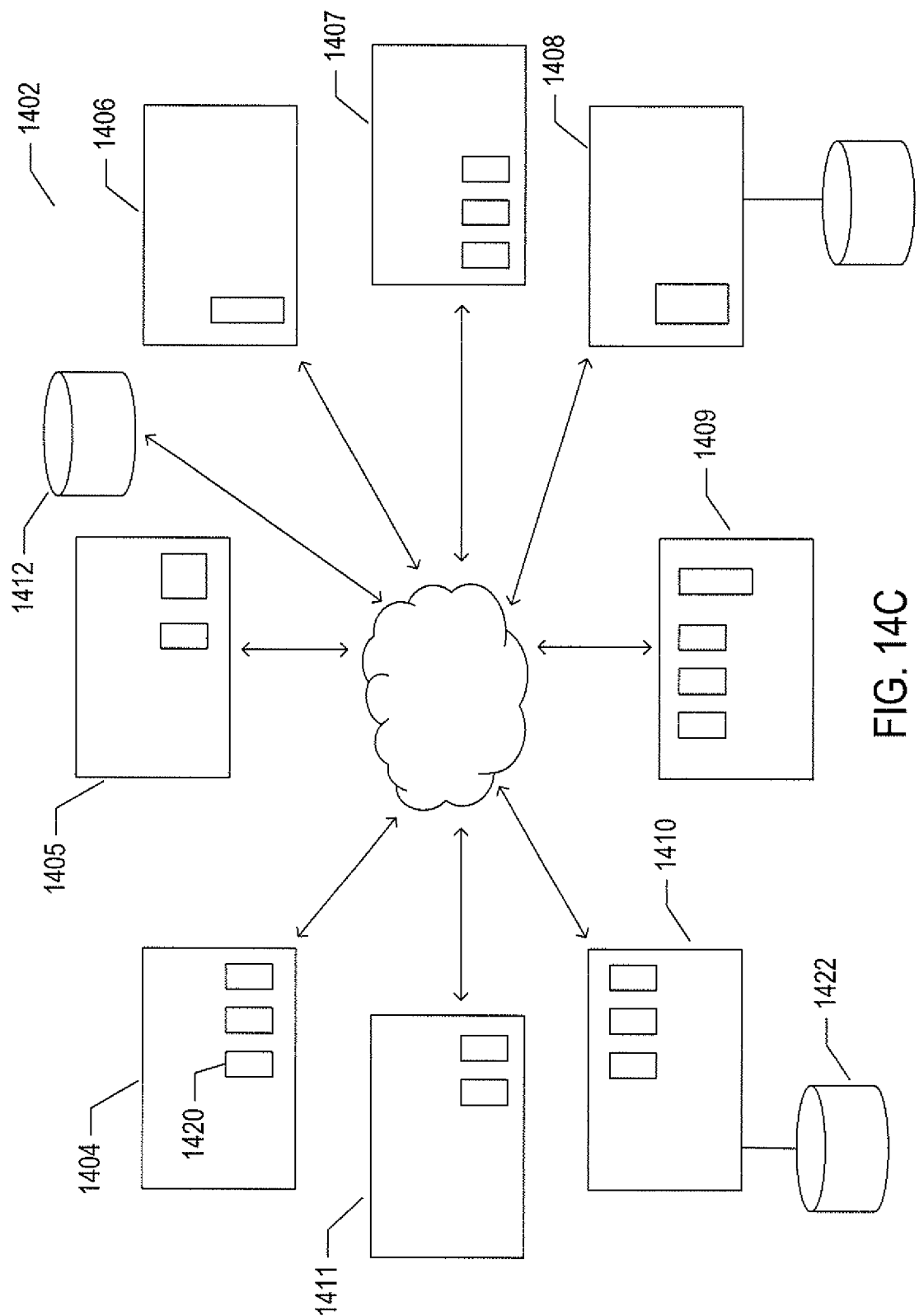

FIGS. 14A-C illustrate a simplified picture of log entries and log files. As shown in FIG. 14A, log-file entries, such as entry 1402, are short alphanumeric records that include various different fields. These fields include a date 1404, a time 1405, an identifier for the host computer 1406 which generated the log entry, an error code, also referred to as an "event type" 1407, an identifier of the module that includes the executable instructions that generated the log entry 1408, an address of a point in the module where the executable instructions reside 1409, and a potentially lengthier text field that includes a description of the event, error, anomaly, or other occurrence represented by the log entry 1410. There may be many additional fields in actual log entries stored in log files of different types of computer systems. Log-file entries may have various different formats, encodings, field orders, natural languages, and other differences. In many cases, the log entries collected within log files of a distributed computer system are somewhat standardized based on the operating systems, virtualization layers, and types of application programs running within the distributed system. As discussed above, additional standardization and normalization may occur during processing of error messages input to a logging subsystem within computer systems and components of computer systems and may be carried out by the virtual-log-file system when ingesting log entries from physical log files.

As shown in FIG. 14B, a physical log file 1420 can be thought of as a stored sequence of log entries. Any of many different types of files and file structures can be used for log files. Log files may be simple, flat files containing unstructured text that is processed, during file-access operations, into arrays or streams of log entries. Alternatively, log entries may be records within structured files. While traditional random-access files are conveniently used for storing log entries, log files may also be stored on underlying physical media that can be only sequentially read and processed. However, in all cases, standardized physical-log-file-access interfaces can be developed to provide logical physical log files that each consists of a sequence of standardized log entries, as shown in FIGS. 14A-B.

As shown in FIG. 14C, physical log files and, in certain cases, archived log files are generally distributed throughout a large distributed computer system. In FIG. 14C, the distributed computer system 1402 includes eight different discrete computer systems 1404-1411, a stand-alone archive of log-file entries 1412, and numerous log files, such as log file 1420 in discrete computer system 1404 and archived log files, such as archived log files 1422 contained within, or accessed from, discrete computer system 1410. In fact, in many large distributed computer systems, there may be hundreds, thousands, or more discrete computer systems and processor-controlled devices and tens of hundreds to many tens of thousands or more individual sources for log-file entries stored within thousands of log files distributed throughout the components of the distributed computer system.

While the distributed event-message logging application is an example of a distributed application, there are thousands of additional examples. A distributed application may run in VMs supported by a hypervisor or virtual-machine monitor, but may also run in execution environments provided by one or more operating systems layered above the hardware level of multiple physical computers or even in physical systems in which control programs provide distributed-application-execution environments. In certain cases, a distributed application may control operation of several discrete processors or other computational entities within a single computer system.

Figure 15A:
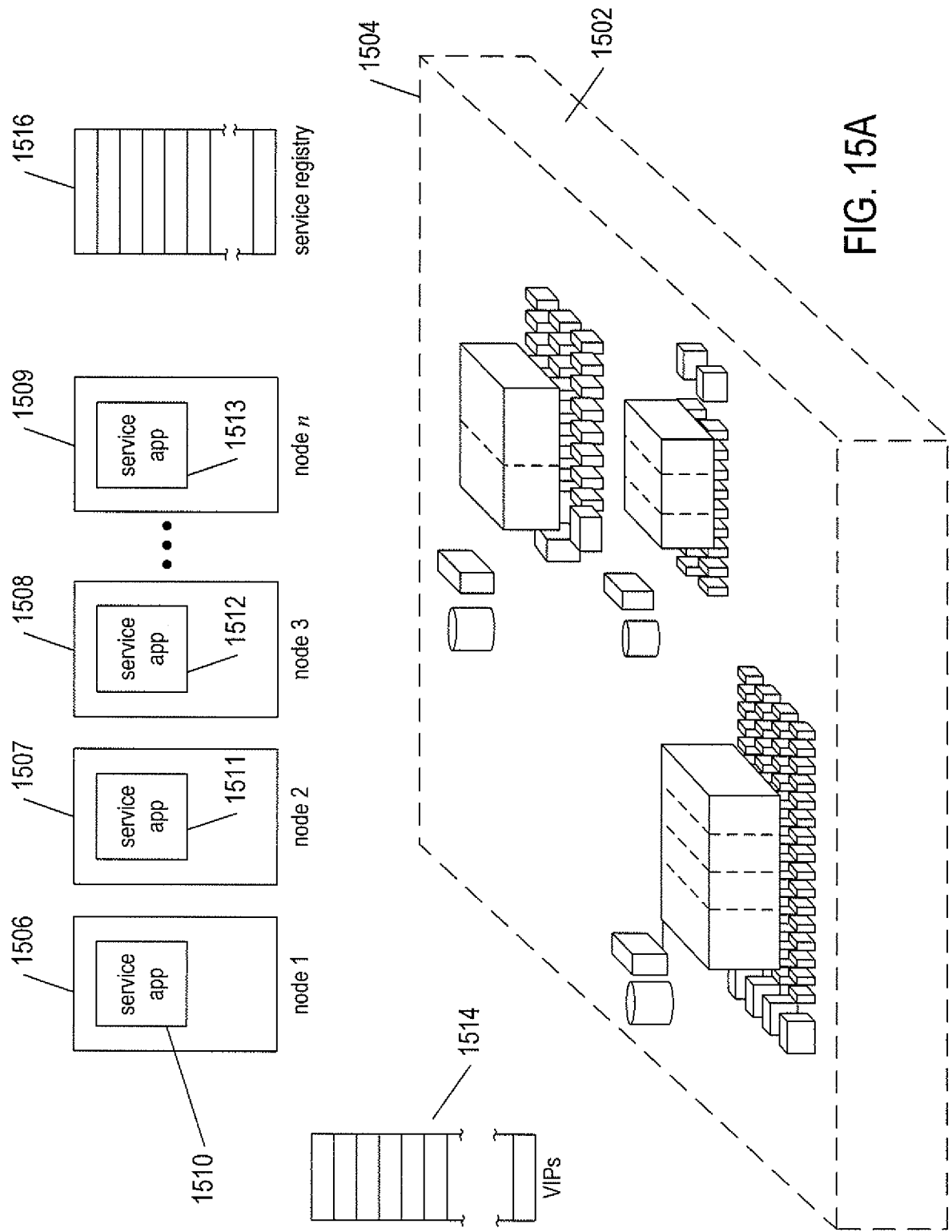
FIGS. 15A-C illustrate a distributed service application and several approaches to load balancing incoming requests to computational nodes controlled by the distributed service application.
Figure 15B:
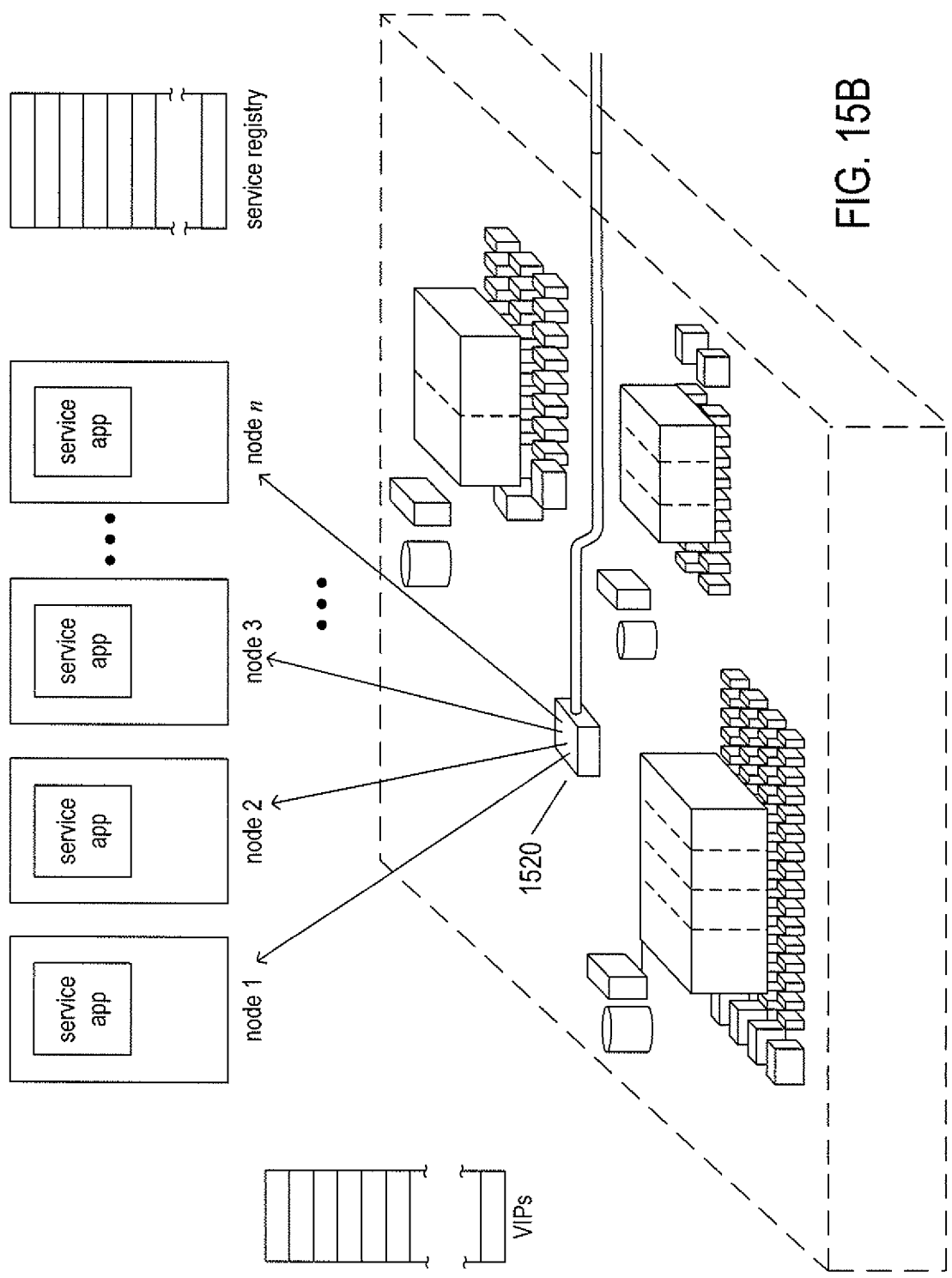
Figure 15C:
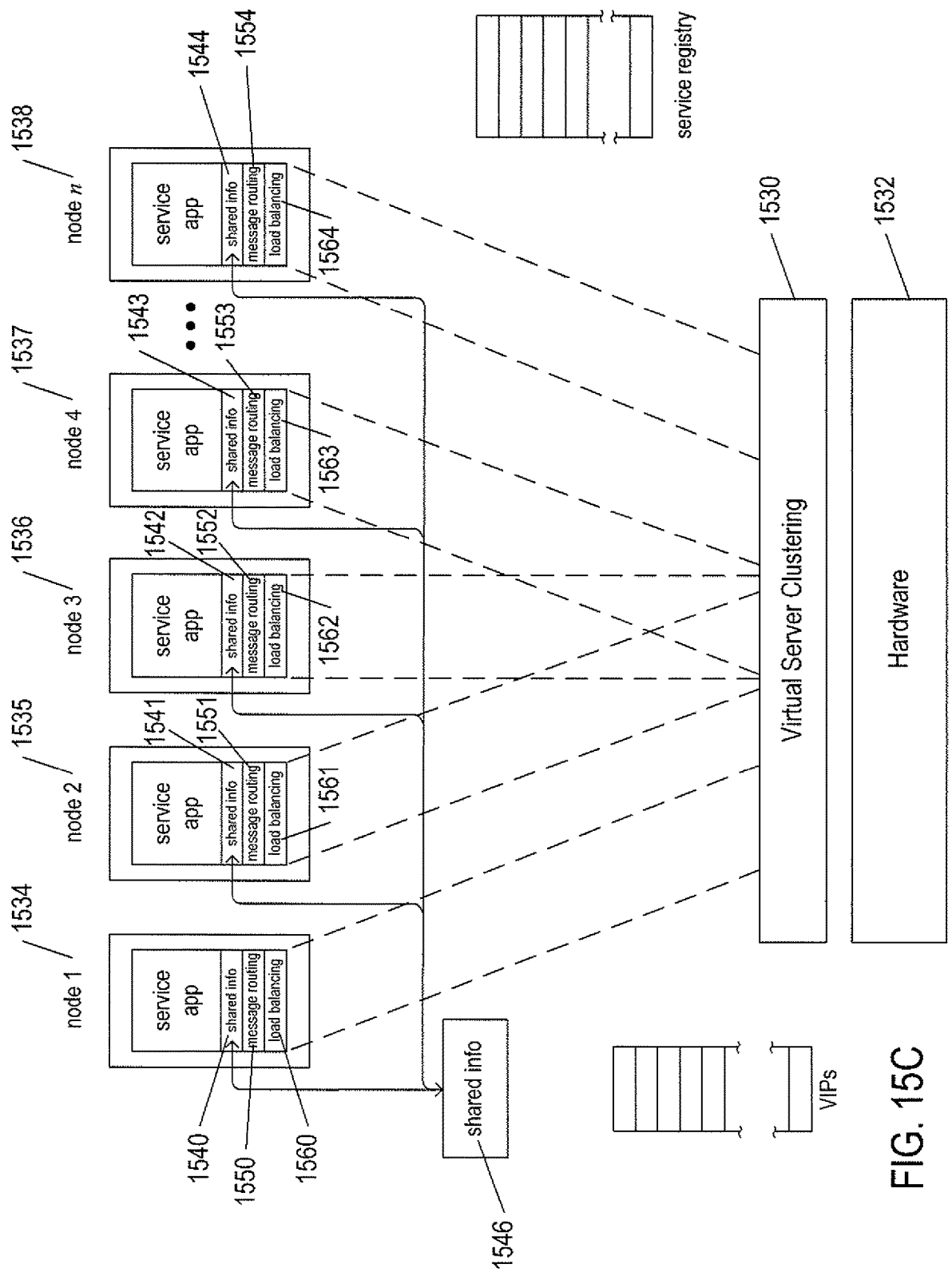

Integrated Application-Aware Load-Balancing Component of a Distributed Computer System FIGS. 15A-C illustrate a distributed service application and several approaches to load balancing incoming requests to computational nodes controlled by the distributed service application. FIG. 15A illustrates a distributed service application and several distributed-computer-system components that facilitate distributed-application control over the distributed computer system. In FIG. 15A, a distributed computer system 1502 controlled, at least in part, by a distributed service application is shown within a dashed rectangle 1504. In the example shown in FIG. 15A, the distributed computer system includes multiple virtual data centers implemented above three different physical data centers, as in the distributed computer system discussed above with reference to FIG. 9. However, the distributed computer system may contain as few as two separate physical servers or other computer systems in a single geographical location up to an arbitrary number of physical servers or other computer systems within an arbitrary number of physical data centers in multiple different geographical locations. In order to simplify and facilitate a discussion of the application-aware load-balancing component to which the current document is directed, a distributed-application-controlled distributed computer system 1502 is abstracted as n computational nodes 1506-1509, each controlled, at least in part, by a local instance of a distributed service application 1510-1513. In addition, the distributed computer system provides a set of virtual IP addresses ("VIPs") 514 and, in certain implementations, provides a service registry 516.

A distributed service application is, like many other computer programs, a physically stored set of computer instructions that, when executed on one or more processors of multiple servers or other computers within a distributed computer system, control the distributed computer system to provide specified services to remote client computers and other remote processor-controlled devices through one or more communications networks. In general, a distributed service application provides a well-defined interface and a communications protocol by which a client computer requests services and receives responses from the distributed service application. An example of a distributed service application is the above-discussed event-message-logging application. Another example of a distributed service application is an online, web-based banking-services application that provides a well-defined set of banking services that can be accessed by remote users through a web-browser-displayed set of web pages. When a remote user inputs an input to a particular web-page feature that invokes a particular service, the user's web browser initiates transmission of a service-request message to the online banking-services application via a URL embedded in the web page that is transformed to an IP address that serves as the destination for the service-request message. In many cases, the communications protocol used to implement the distributed service application is a RESTful communications interface based on the hypertext transfer protocol ("HTTP"). IP addresses may, in certain cases, be extracted from a URL while, in other cases, a host name is extracted from the URL and the host name is then transformed into an IP address via a Domain-Name-System ("DNS") server.

The service registry 516 provides for the storage and retrieval of service metadata. The service metadata may include information regarding the name, interface, protocol, IP addresses, and port bindings for each service provided by one or more distributed service applications. Although a convenient repository for this information, there are alternative methods and communications media by which clients are provided service metadata. All or a portion of the set of VIPs 514 are distributed among the computational nodes controlled by a distributed service application. The VIPs are mapped by the distributed computer system to internal IP addresses of distributed-computer-system computational nodes. The set of VIPs 514 is essentially one of many computational resources provided by the distributed computer system to the distributed service application. A particular service provided by the distributed service application, such as a balance-checking service provided an online banking service, can be associated with one or more VIPs that are, in turn, translated to internal IP addresses of computational nodes to which incoming communications messages directed to the one or more VIPs are routed.

FIG. 15B illustrates one approach to balancing the load of request messages from remote clients across multiple computational nodes controlled by a distributed service application. In this approach, an external load balancer ("ELB") 1520 is used to distribute connection requests from remote user devices among the computational nodes controlled by the distributed service application. The ELB 1520 is provided a mapping between each VIP associated with the distributed service application and the internal IP addresses of one or more computational nodes that can service connection requests for the service accessed through the VIP and that can process subsequent communications messages transmitted to the distributed service application through the communications connections established in response to the connection requests. An ELB does not have, in general, access to information that would allow the ELB to distribute connection requests based on current capacities and bandwidths of the computational nodes or other components of the distributed-service-application state, but instead attempts to distribute connection requests directed to a particular VIP either evenly among the computational nodes that are specified in advance for handling service requests directed to the VIP or according one of a few pre-specified distribution policies, such as weighted round-robin and weighted least-connection. When the number of computational nodes controlled by the distributed service application changes, as, for example, when additional computational nodes are added due to high service-request loads, the ELB often needs to be manually reconfigured, which introduces both a significant delay in scaling up the distributed service application as well as significant operational expenses. ELBs are also expensive to purchase, configure, and maintain. Thus, the ELB-based approach to balancing load over the computational nodes controlled by distributed service application is associated with significant deficiencies.

The computational nodes 1506-1509 in FIG. 15A and the ELB 1520 in FIG. 15B can be implemented in a variety of different ways. Computational nodes may be physical servers, virtual servers, virtual machines, and even tightly coordinated clusters of computational systems. Ultimately, the computational nodes are necessarily mapped to physical processor-controlled hardware systems. The ELB may be a server controlled by a load-balancing application, a specialized hardware device, or may be implemented in a variety of additional ways.

FIG. 15C illustrates an alternative approach to load balancing. In this approach, a virtual server clustering layer 1530 executes above the hardware layer of a distributed computer system 1532 to more or less tightly couple multiple computational nodes 1534-1538 into a cluster that appears, to remote users, as a single server. In addition to a service application, each computational node includes a local copy 1540-1544 of shared information 1546 as well as message-routing and load-balancing components 1550-1554 and 1560-1564. The local shared information, message-routing, and load-balancing components allow any given computational node to assume a director role for receiving service requests directed to one or a set of VIPs and to distribute the service requests among the computational nodes of the cluster. The local shared information within each computational node is a local copy of shared information 1546 maintained by the distributed computer system to coordinate load balancing and other virtual-server-cluster operations, by any of various distributed-shared-information technologies and methods. This information may include, for example, current mappings of VIPs to computational nodes, indications of the computational nodes that can service requests directed to each of a set of VIPs, indications of the current director nodes for each VIP or set of VIPs, and various performance and operational data for the distributed computer system to facilitate load-balancing decisions. The integrated application-aware load-balancing component to which the current document is directed employs, in certain implementations, virtual-server-clustering load-balancing techniques.

FIG. 16 illustrates the Open Systems Interconnection model ("OSI model") that characterizes many modern approaches to implementation of communications systems that interconnect computers. This is included in the current discussion to explain certain phrases introduced in the following discussion. In FIG. 16, two processor-controlled network devices, or computer systems, are represented by dashed rectangles 1602 and 1604. Within each processor-controlled network device, a set of communications layers are shown, with the communications layers both labeled and numbered. For example, the first communications level 1606 in network device 1602 represents the physical layer which is alternatively designated as layer 1. The communications messages that are passed from one network device to another at each layer are represented by divided rectangles in the central portion of FIG. 16, such as divided rectangle 1608. The largest rectangular division 1610 in each divided rectangle represents the data contents of the message. Smaller rectangles, such as rectangle 1611, represent message headers that are prepended to a message by the communications subsystem in order to facilitate routing of the message and interpretation of the data contained in the message, often within the context of an interchange of multiple messages between the network device. Smaller rectangle 1612 represents a footer appended to a message to facilitate data-link-layer frame exchange. As can be seen by the progression of messages down the stack of corresponding communications-system layers, each communications layer in the OSI model generally adds a header or a header and footer specific to the communications layer to the message that is exchanged between the network devices.

It should be noted that while the OSI model is a useful conceptual description of the modern approach to electronic communications, particular communications-systems implementations may depart significantly from the seven-layer OSI model. However, in general, the majority of communications systems include at least subsets of the functionality described by the OSI model, even when that functionality is alternatively organized and layered.

The physical layer, or layer 1, represents the physical transmission medium and communications hardware. At this layer, signals 1614 are passed between the hardware communications systems of the two network devices 1602 and 1604. The signals may be electrical signals, optical signals, or any other type of physically detectable and transmittable signal. The physical layer defines how the signals are interpreted to generate a sequence of bits 1616 from the signals. The second data-link layer 1618 is concerned with data transfer between two nodes, such as the two network devices 1602 and 1604. At this layer, the unit of information exchange is referred to as a "data frame" 1620. The data-link layer is concerned with access to the communications medium, synchronization of data-frame transmission, and checking for and controlling transmission errors. The third network layer 1620 of the OSI model is concerned with transmission of variable-length data sequences between nodes of a network. This layer is concerned with networking addressing, certain types of routing of messages within a network, and disassembly of a large amount of data into separate frames that are reassembled on the receiving side. The fourth transport layer 1622 of the OSI model is concerned with the transfer of variable-length data sequences from a source node to a destination node through one or more networks while maintaining various specified thresholds of service quality. This may include retransmission of packets that fail to reach their destination, acknowledgement messages and guaranteed delivery, error detection and correction, and many other types of reliability. The transport layer also provides for node-to-node connections to support multi-packet and multi-message conversations, which include notions of message sequencing. Thus, layer 4 can be considered to be a connections-oriented layer. The fifth session layer of the OSI model 1624 involves establishment, management, and termination of connections between application programs running within network devices. The sixth presentation layer 1626 is concerned with communications context between application-layer entities, translation and mapping of data between application-layer entities, data-representation independence, and other such higher-level communications services. The final seventh application layer 1628 represents direct interaction of the communications systems with application programs. This layer involves authentication, synchronization, determination of resource availability, and many other services that allow particular applications to communicate with one another on different network devices. The seventh layer can thus be considered to be an application-oriented layer.

Figure 17:
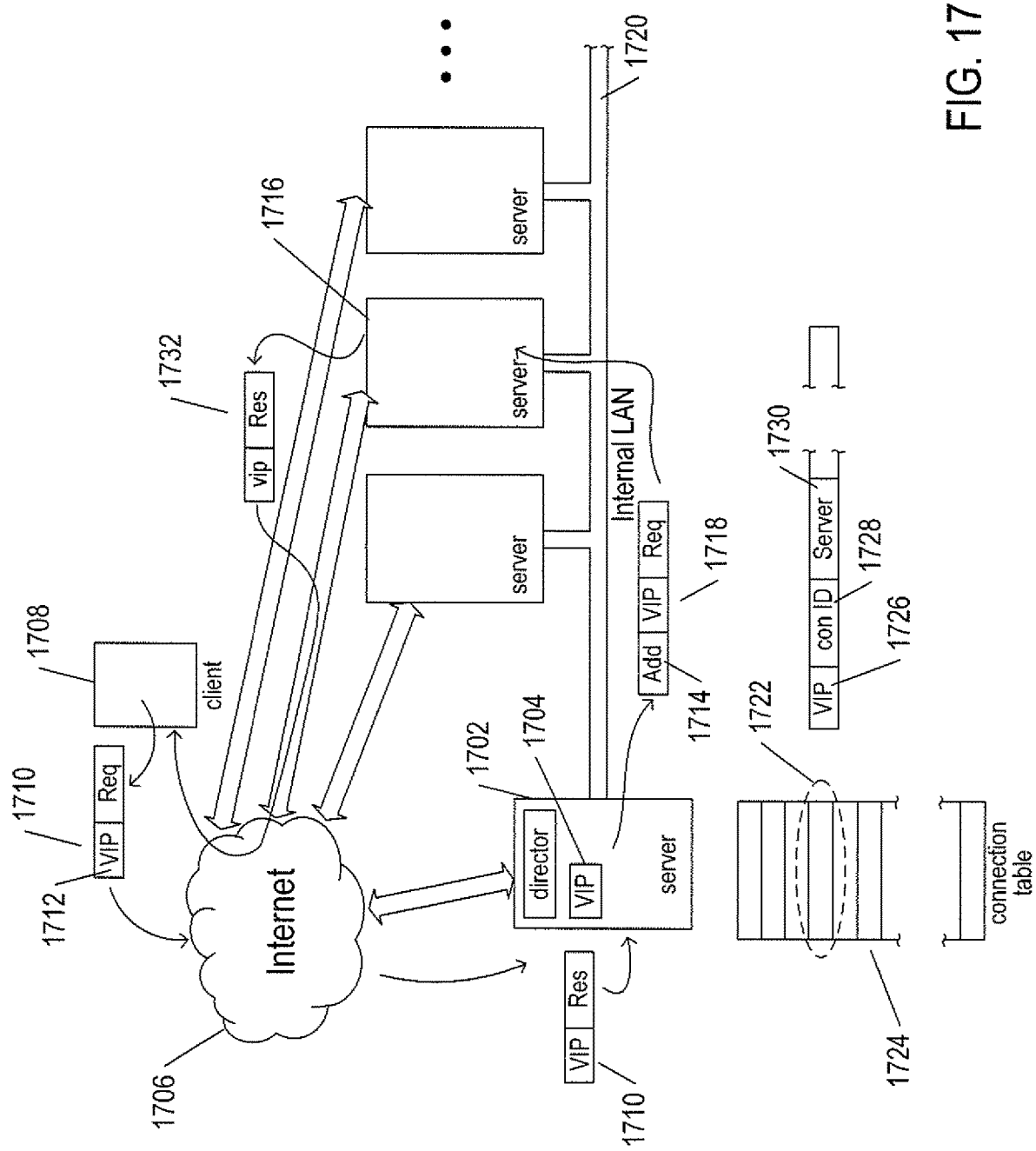
FIG. 17 illustrates load balancing in the virtual-server-clustering approach discussed above with reference to FIG. 15C.

FIG. 17 illustrates load balancing in the virtual-server-clustering approach discussed above with reference to FIG. 15C. As shown in FIG. 17, one server 1702, or computational node, within the server cluster is designated as the director server with respect to a particular VIP 1704. The VIP is advertised by the director server as the IP address for a service offered by the distributed service application that runs on each of the servers of the cluster, as discussed above with reference to FIG. 15C. There are many approaches to layer-4 load balancing. FIG. 17 is intended to provide a general description rather than focusing on particular techniques and methodologies, but may also describe particular aspects of only one or a subset of the many different load-balancing methods that have been developed. The director server communicates via the Internet 1706, in the illustrated implementation, with client computers, such as client computer 1708, that request the service from the virtual-server cluster. Of course, client/distributed-application communications may be carried out over networks within data centers or organizations and other communications systems in addition to the Internet. When the client computer sends a request message 1710 to the virtual server cluster requesting a service available at the VIP, with the VIP used as the target address 1712 in the request message, the request message is sent through the Internet 1706 to the director server 1702 associated with the VIP 1704. When the request message 1710 is an initial connection-request message, the director server uses various load-balancing policies and rules to determine to which server within the virtual server cluster to forward the request for processing. The policies and rules seek to fairly balance the computational load of client requests among the servers of the virtual server cluster. Having determined which server should handle the new connection, the director server creates an entry in the connection table for the new connection so that subsequent messages that are received through the new connection can be routed by the director server to the same virtual-server-cluster server. Each entry 1722 in the connection table 1724 includes an indication of a VIP 1726, a connection ID 1728, and a server within the virtual server cluster 1730, as well as additional information, such as the local-network address of the server, to allow the director server to forward request messages received within the context of an existing connection to the appropriate server of the virtual server cluster. The director server may process certain requests locally, in implementations in which a director not only routes messages among virtual-server-cluster servers but also concurrently functions as a request-handling virtual-server-cluster server. When the director server decides to forward the received request message 1710 to another server in the virtual server cluster, the director server, in the illustrated implementation, appends the local network address 1714 of the server 1716 to which the request is to be sent to the request message to produce an internal request message 1718 that is sent through a local network 1720 to the server that is determined by the director server to handle the request 1716. In alternative implementations, other methods for message forwarding may be employed. When the received request message 1710 has been sent in the context of an already established communications connection between the client and the virtual server cluster, as determined by the director server from a connection table 1724, the director server forwards the request message to the virtual-server-cluster node to which the connection has been previously assigned. The computational node that processes a request message directly returns a response message 1732 to the requesting client computer 1708, in the illustrated implementation. In alternative implementations, the response message may be returned through the director by other methods.

Having provided an overview of load balancing, distributed service applications, and the OSI model, the integrated application-aware load-balancing component to which the current document is directed can now be described with reference to FIGS. 18A-18I. FIGS. 18A-I illustrate processing by the integrated application-aware load-balancing component of request messages received from remote client computers as well as amelioration of certain server-failure conditions.

Figure 18A:
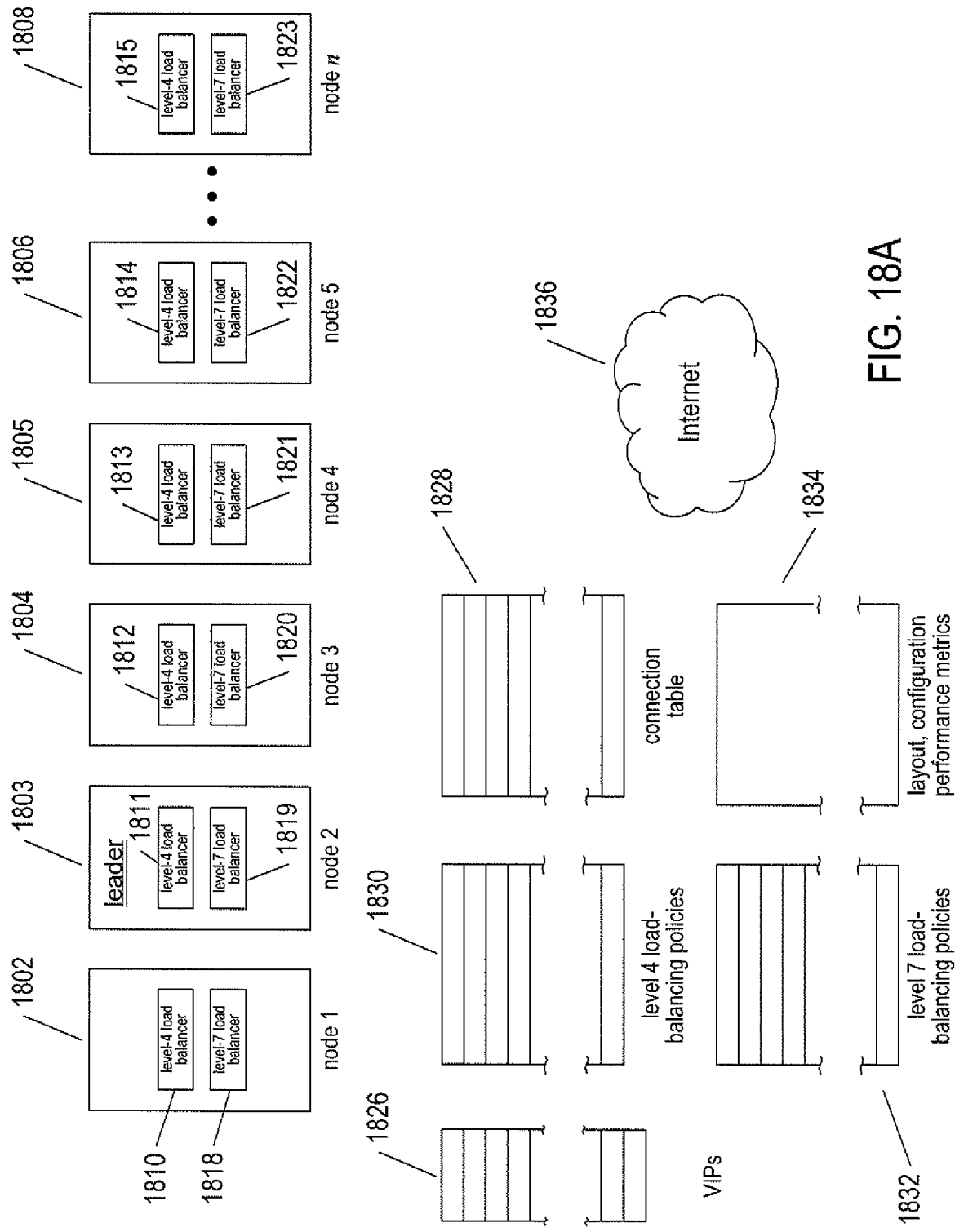
FIG. 18A shows various components of a distributed computer system that runs a distributed service application in which the integrated application-aware load-balancing component to which the current document is directed is incorporated.

FIG. 18A shows various components of a distributed computer system that runs a distributed service application in which the integrated application-aware load-balancing component to which the current document is directed is incorporated. The distributed computer system supports or implements a set of n computational nodes 1802-1808. These computational nodes, as mentioned above, may be physical servers, virtual servers, virtual machines, or any other physical or virtual processing entity that can be controlled by a distributed service application. In addition to distributed-application control logic that implements the various services and functionalities provided by the distributed service application, the distributed service application, on each computational node, also includes a layer-4 load-balancing control subcomponent 1810-1815 and a layer-7 load-balancing control subcomponent 1818-1823. The pair of load-balancing subcomponents within each computational node, such as the layer-4 load-balancing subcomponent 1810 and layer-7 load-balancing subcomponent 1818 within node 1802, together comprise a local integrated application-aware load-balancing component that is incorporated within the local distributed service application that controls, at least partly, operation of computational node 1802. The phrases "layer-4" and "layer-7" arise from the above-described OSI model. The layer-4 load-balancing subcomponent balances connections across computational nodes while the layer-7 load-balancing subcomponent redistributes messages among the distributed-application-controlled computational nodes.

A distributed service application is an aggregation of multiple local instances of the distributed service application that each controls a different computational node. The integrated application-aware load-balancing component is a component of a distributed application, and is therefore also a collection of local instances of the integrated application-aware load-balancing component. Similarly, the layer-4 load-balancing subcomponent and the layer-7 load-balancing subcomponent are subcomponents of the integrated application-aware load-balancing component, and also comprise multiple local instances of the layer-4 load-balancing subcomponent and layer-7 load-balancing subcomponent. Whether a phrase such as "layer-4 load-balancing subcomponent" refers to the aggregation of local instances or to a particular local instance should be clear from the context in which the phrase is used.

The incorporation of the integrated application-aware load-balancing component within the distributed service application gives rise to the term "integrated" in the phrase "integrated application-aware load-balancing component." The incorporation of the integrated application-aware load-balancing component within the distributed service application also provides access by the load-balancing component to distributed-application state information that gives rise to the phrase "application-aware" in the phrase "integrated application-aware load-balancing component."

The layer-4 load-balancing subcomponents 1810-1815 use a load-balancing technique similar to that discussed above with reference to FIG. 15C to balance communications connections among the nodes 1802-1808 controlled, at least in part, by the distributed service application. The layer-7 load-balancing subcomponents 1818-1823 are responsible for a second level of load balancing that involves redirection of messages received by a computational node to other computational nodes that are, at least in part, controlled by the distributed service application. Additional components of the distributed computer system involved in load balancing include a set of VIPs allocated to the distributed service application 1826, a connection table 1828, layer-4 load-balancing policies and rules 1830, layer-7 load-balancing policies and rules 1832, and stored information accessible to the nodes controlled, at least in part, by the distributed service application that provides a representation of the layout and configuration of the distributed service application with respect to distributed-computer-system resources as well as various types of performance metrics and operational characteristics that are accumulated during operation of the distributed service application 1834. Remote clients access the distributed service application via the Internet 1836.

Figure 18B:
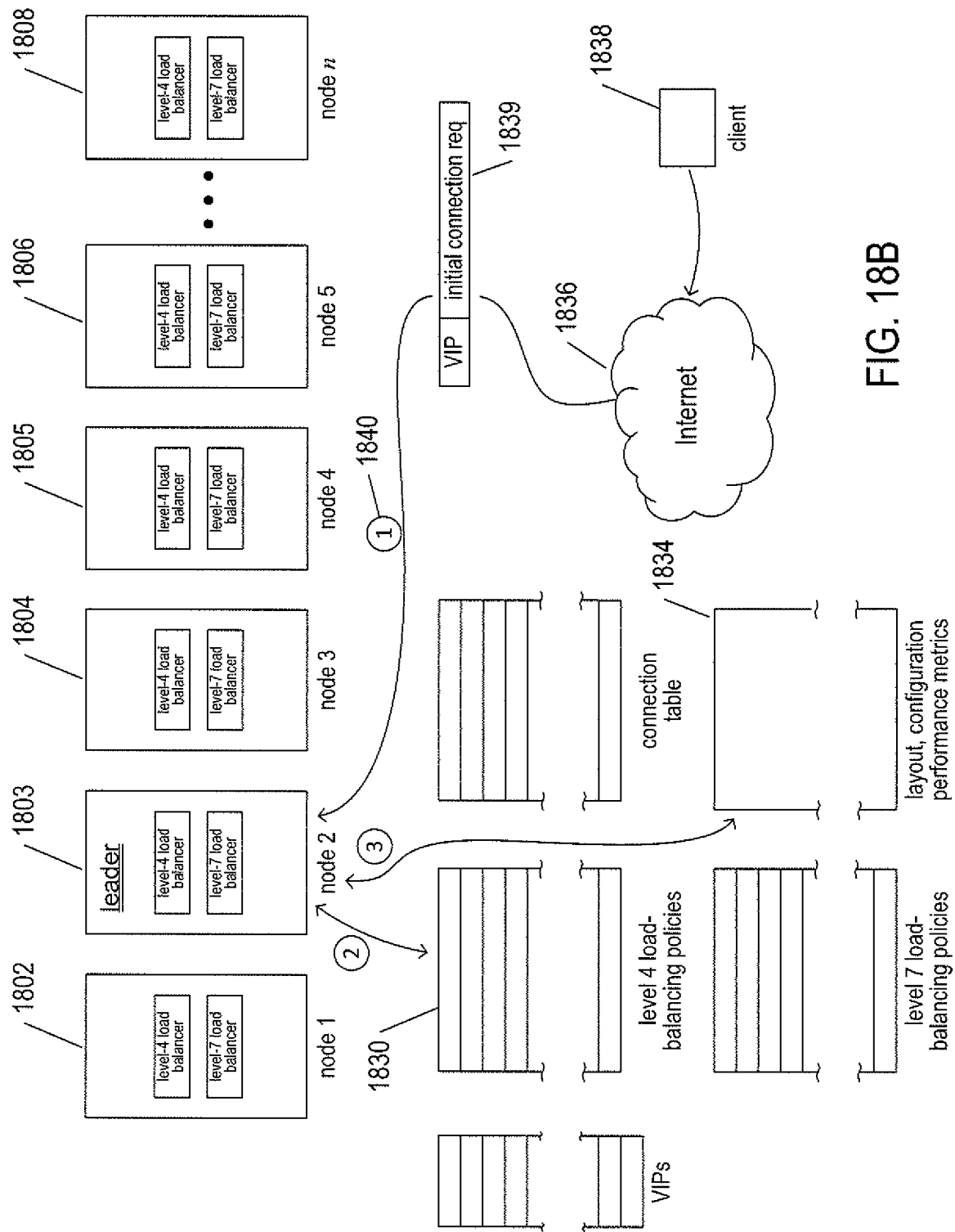
FIGS. 18B-F illustrate operation of the layer-4 and layer-7 load-balancing subcomponents of the integrated application-aware load-balancing component to which the current document is directed.

FIGS. 18B-F illustrate operation of the layer-4 and layer-7 load-balancing subcomponents of the integrated application-aware load-balancing component to which the current document is directed. In FIG. 18B, a remote client computer 1838 sends an initial connection-request message 1839 through the Internet 1836 to the VIP corresponding to a particular service or set of services that the remote client computer wishes to access. These services are, of course, provided by the distributed service application that, at least in part, controls operation of the n computational nodes 1802-1808. Node 1803 is, in the current example, the leader or director node associated with the VIP to which the connection request 1839 is targeted. Note that, in FIGS. 18B-F, circled numbers, such as the circled number "1" 1840, are associated with curved arrows to indicate the sequence of events illustrated in the figures. When leader node 1803 receives the initial connection request, the leader node consults the layer-4 load-balancing policies 1830 to determine to which computational node to assign the received connection-request message. The load-balancing policies may be implemented in a variety of different fashions, including sets of if-then-else statements, logic rules, routines, or other methods for encoding policies. Evaluation and execution of load-balancing policies may additionally involve access to the stored information 1834 that includes various performance metrics and operational characteristics accumulated as operation of the distributed service application is internally monitored. An example load-balancing policy might be that, when one of the n computational nodes has fewer current connections than all of the other computational nodes, the next received connection-request message should be forwarded by the leader node 1803 to that node with fewest current connections. Of course, the layer-4 load-balancing policies may contain far more complex and interesting types of policies and rules that attempt to approximately uniformly distribute computational load, rather than simply uniformly distributing connections, across the computational nodes.

Figure 18C:
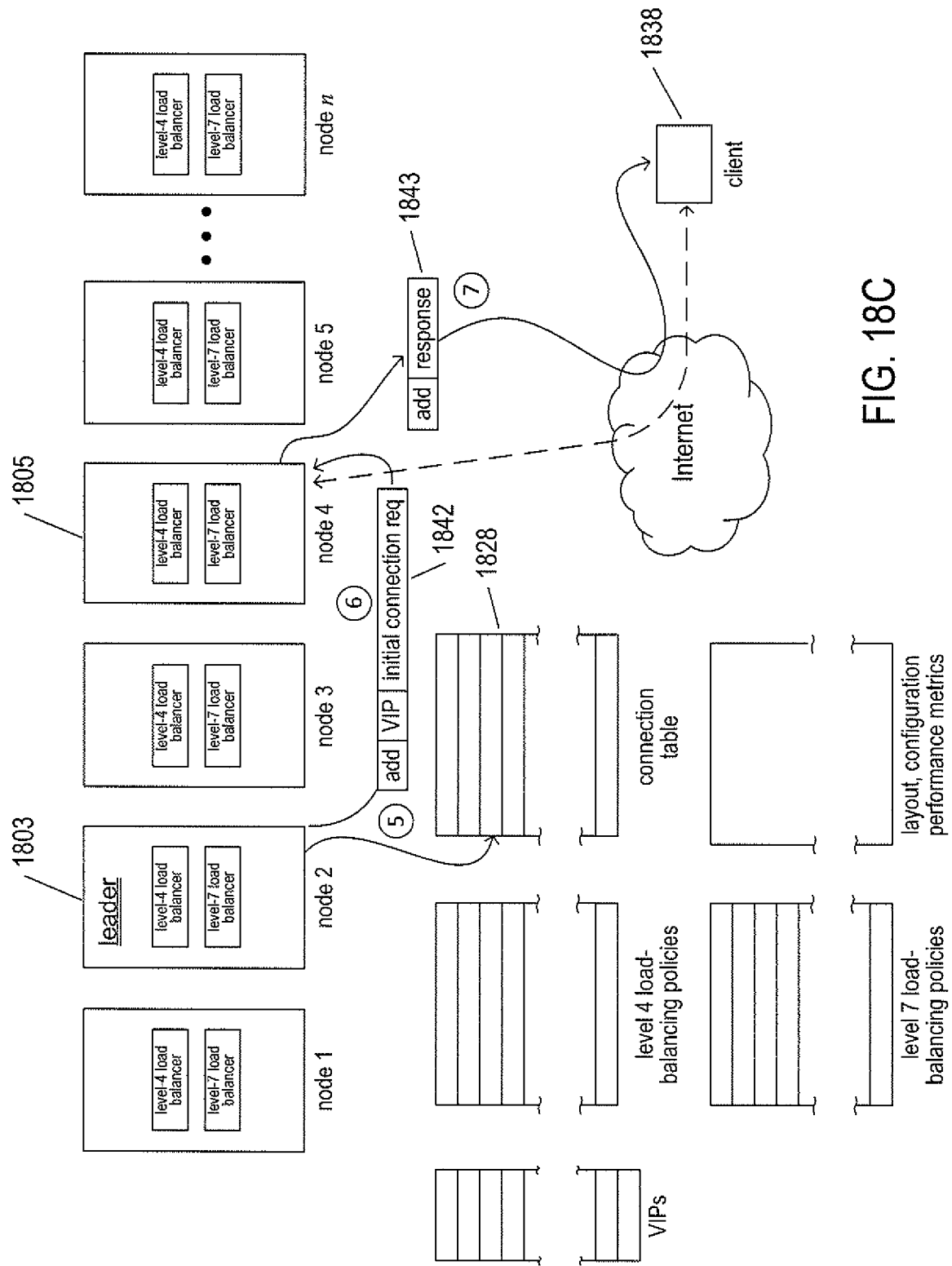

Turning to FIG. 18C, once the leader node 1803 has selected a computational node 1805 to receive the connection-request message 1839, the leader node 1803 generates a new entry for the connection table 1828 to represent a new connection from the client computer to the node 1805 to which the connection-request message is forwarded. Then, the leader node 1803 generates an internal connection-request message 1842 that is transmitted through one or more local networks to the target computational node 1805. The target computational node generates a corresponding response message 1843 that is transmitted to the connection-requesting remote client computer 1838. In some implementations, a connection is first established before service requests are made through the connection via subsequent request messages. In other implementations, an initial connection request may also include an additional service request, in which case the target node 1805 may carry out the requested service in order to prepare a response to the service request or, in other implementations, may distribute the service request to another computational node of the n computational nodes for processing.

Figure 18D:
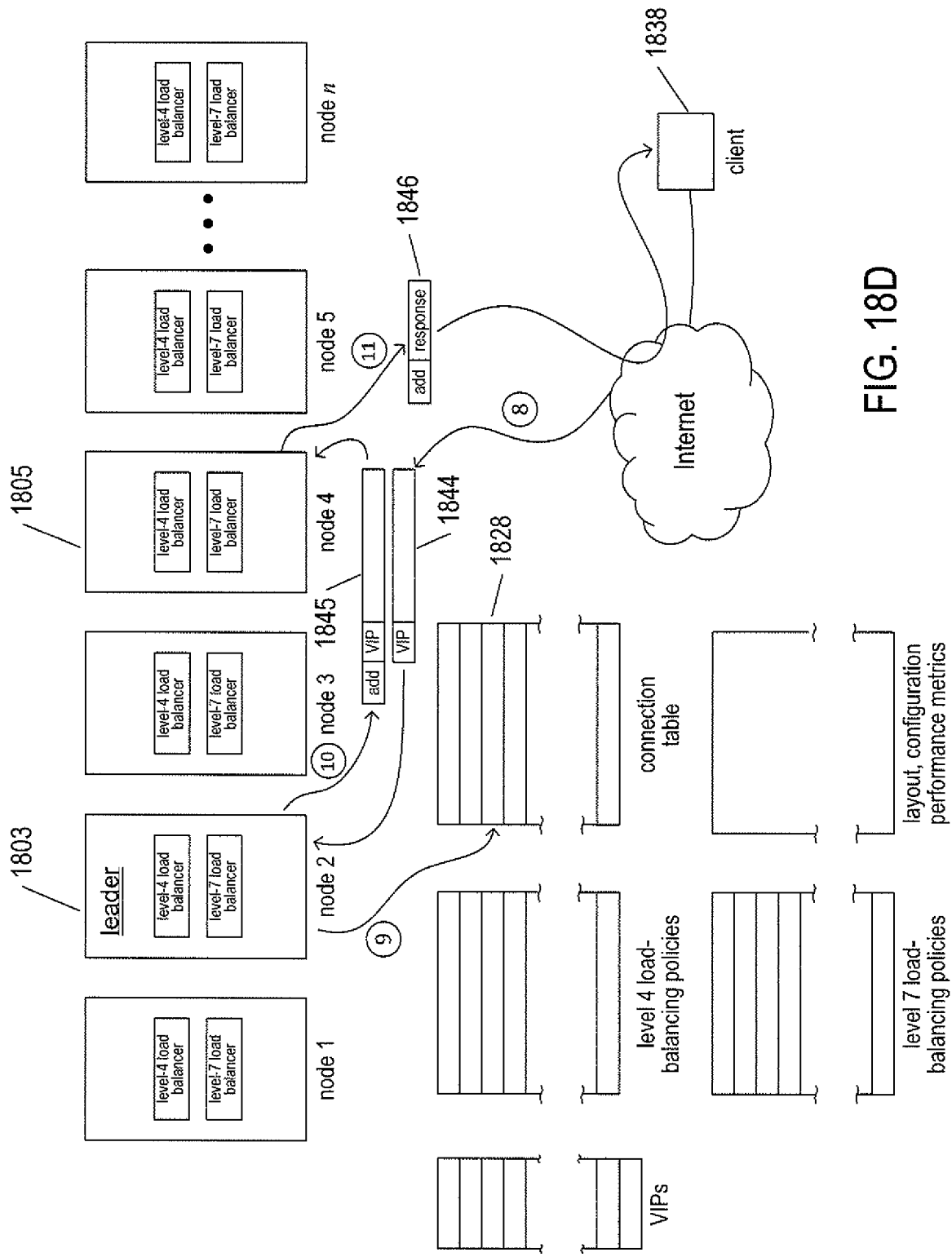

Once the connection has been established, as illustrated in FIG. 18D, the client computer 1838 may send a subsequent request message 1844 to the leader node 1803 associated with the VIP for the request of a service or a set of services. Because the subsequent request message is received in the context of an existing connection, as the leader node determines by accessing the connection table 1828, the leader node immediately prepares an internal request message 1845 corresponding to the received request message and forwards the internal request message to node 1805 that is responsible for handling requests received through the existing connection from the client computer 1838. Node 1805 may itself carry out the requested service or may distribute the requested-service request to another node. Ultimately, a response message 1846 is generated either by node 1805 or another computational node that carries out the request and returned to the requesting client computer 1838.

Figure 18E:
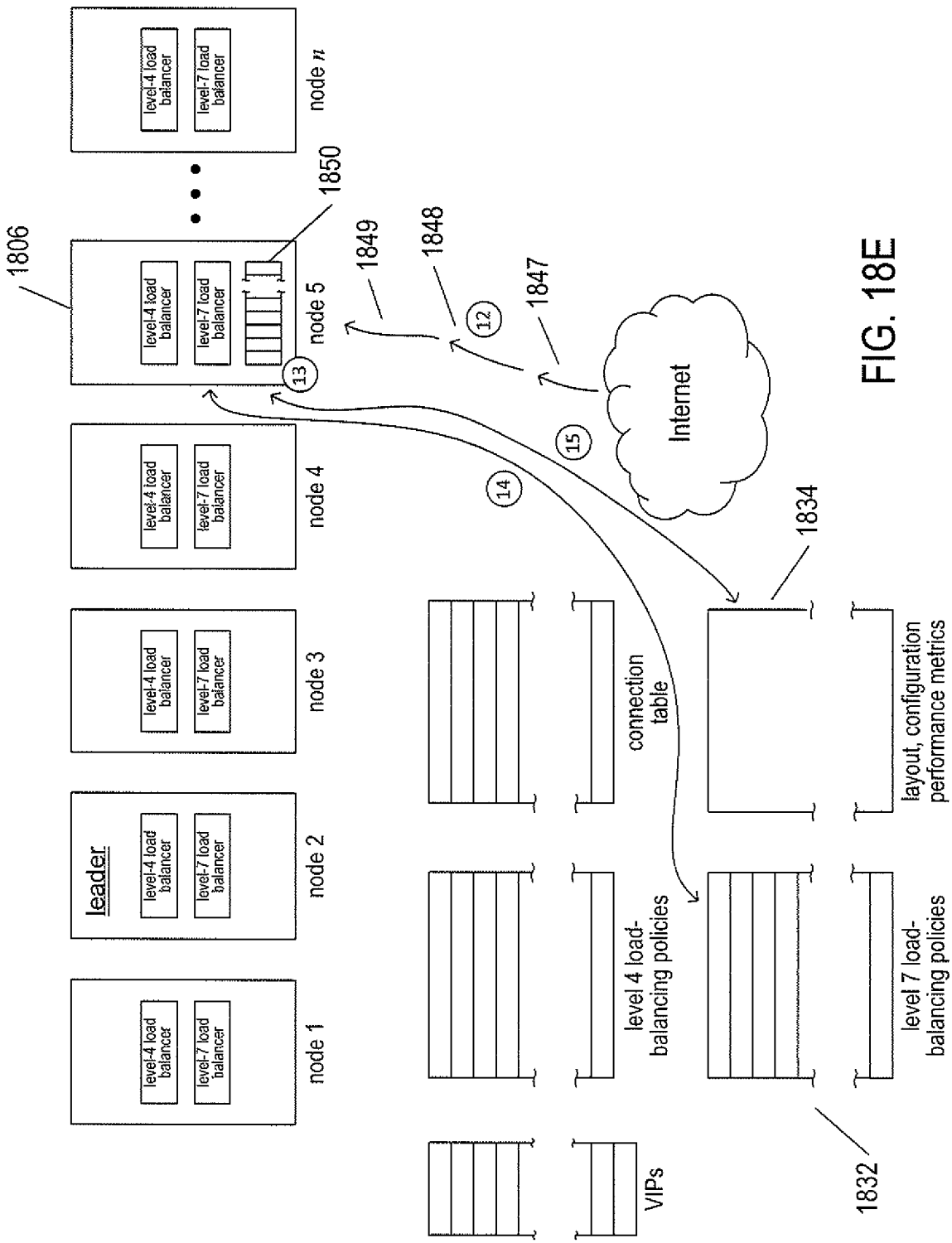
Figure 18F:
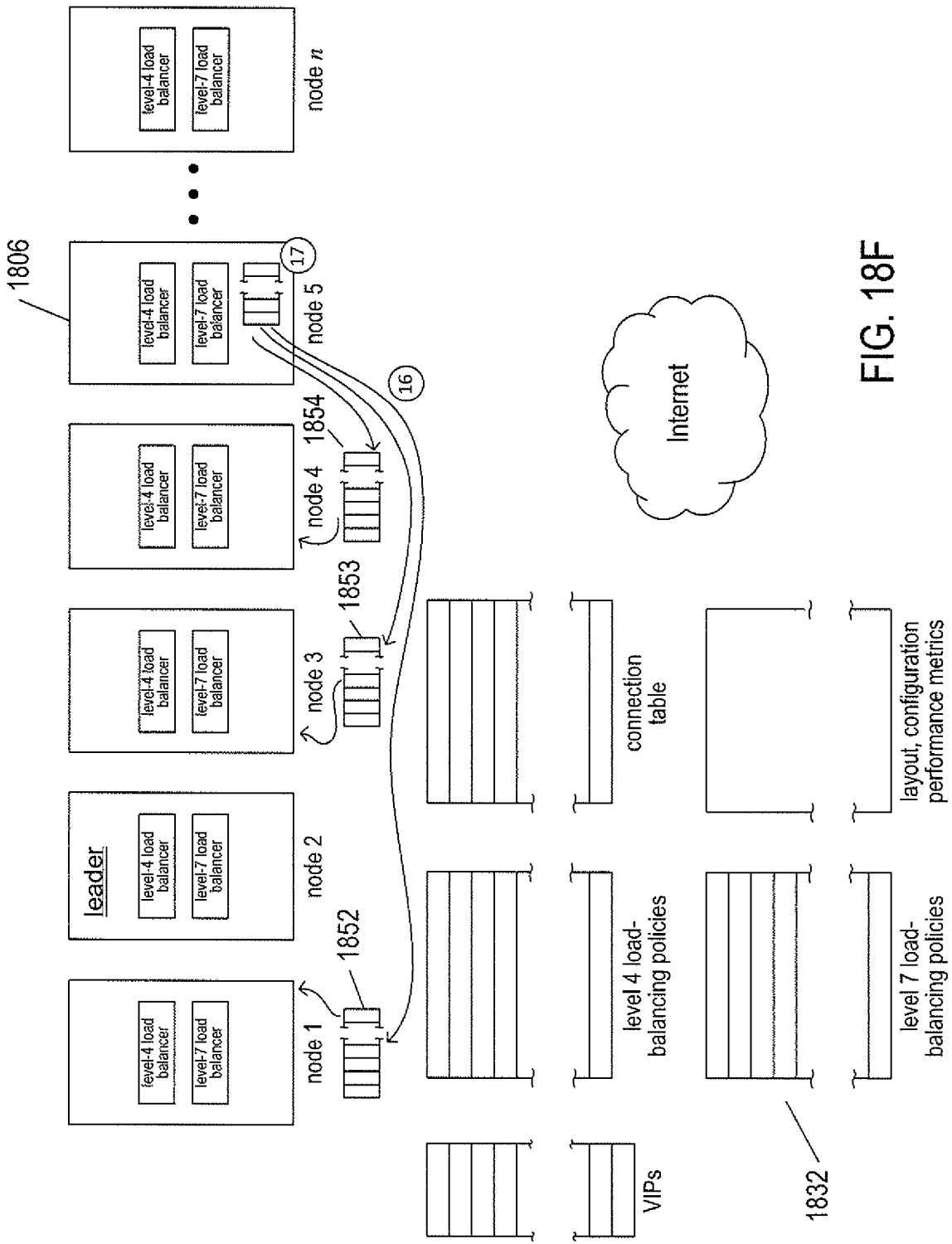

As shown in FIG. 18E, as any particular node receives requests from remote client computers, as represented by arrows 1847-1849 in FIG. 18E, the request messages are generally internally queued within the node 1850 for processing. Note that the received messages are not directly received by the node, but are instead received by leader nodes and forwarded to the node for processing, as discussed above. At particular intervals of time, or whenever the queue exceeds some threshold number of stored request messages, the node 1806 may distribute the queued request messages to other nodes that are controlled by the distributed service application. This redistribution of request messages is carried out by the layer-7 load-balancing subcomponents 1818-1823. The layer-7 load-balancing subcomponent of computational node 1806 consults the layer-7 load-balancing policies 1832 and stored information 1834 in order to determine to which of the n−1 other nodes to redistribute all or a subset of the queued messages for processing. Then, as shown in FIG. 18F, the node 1806 transmits sets of request messages 1852-1854 to one or more of the n−1 other computational nodes for processing according to the layer-7 load-balancing policies and rules 1832. In certain implementations, a set of request messages received for processing by a computational node may be further distributed to other computational nodes as part of a multi-tiered, or hierarchical, layer-7 distribution strategy. In those implementations, of course, techniques are employed to ensure that a message is not forwarded indefinitely, but is instead processed within a reasonable time periods after less than a threshold number of internal transmissions between computational nodes.

Figure 18G:
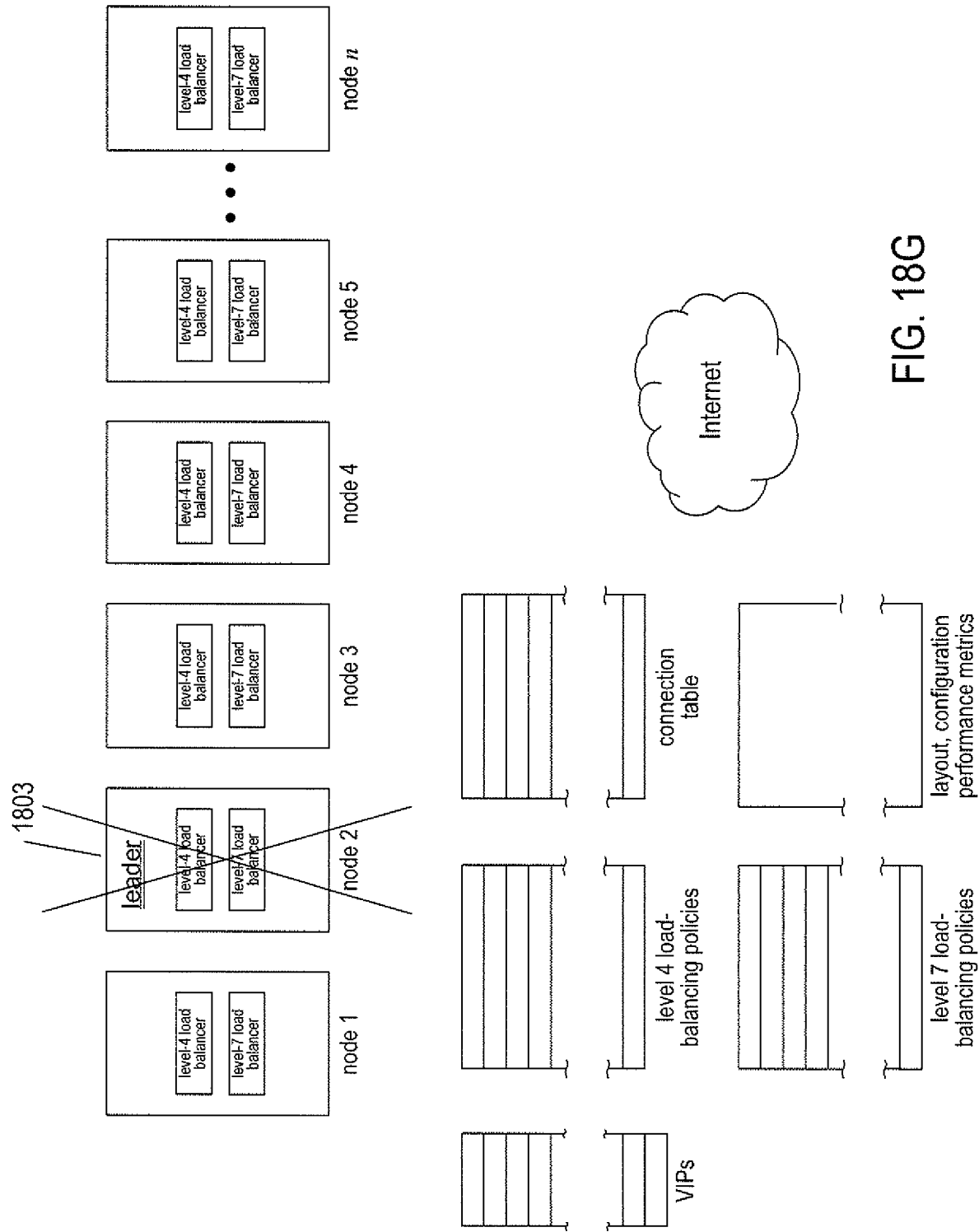
FIGS. 18G-I illustrate one high-availability feature of the layer-4 load-balancing subcomponent of the integrated application-aware load-balancing component.
Figure 18H:
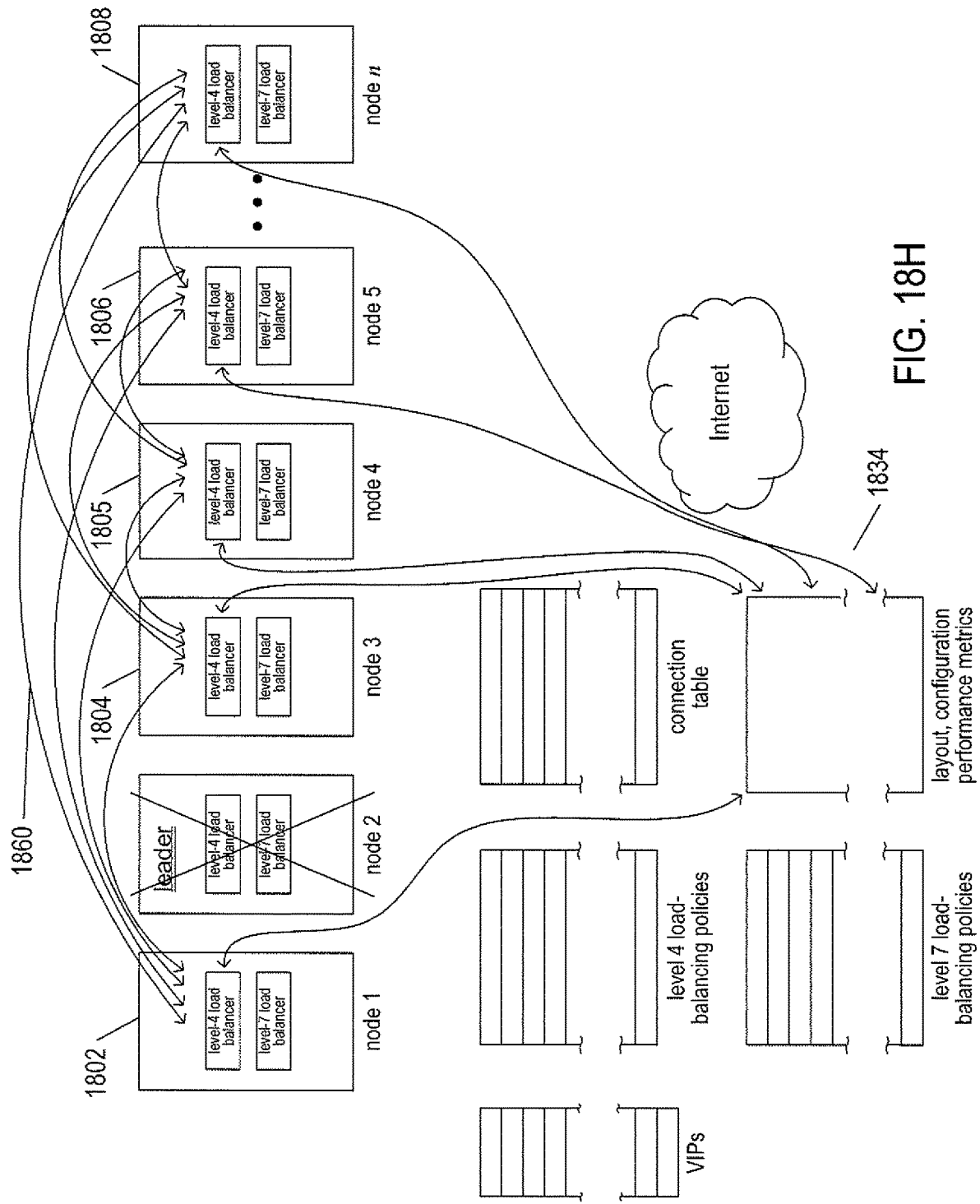
Figure 18I:
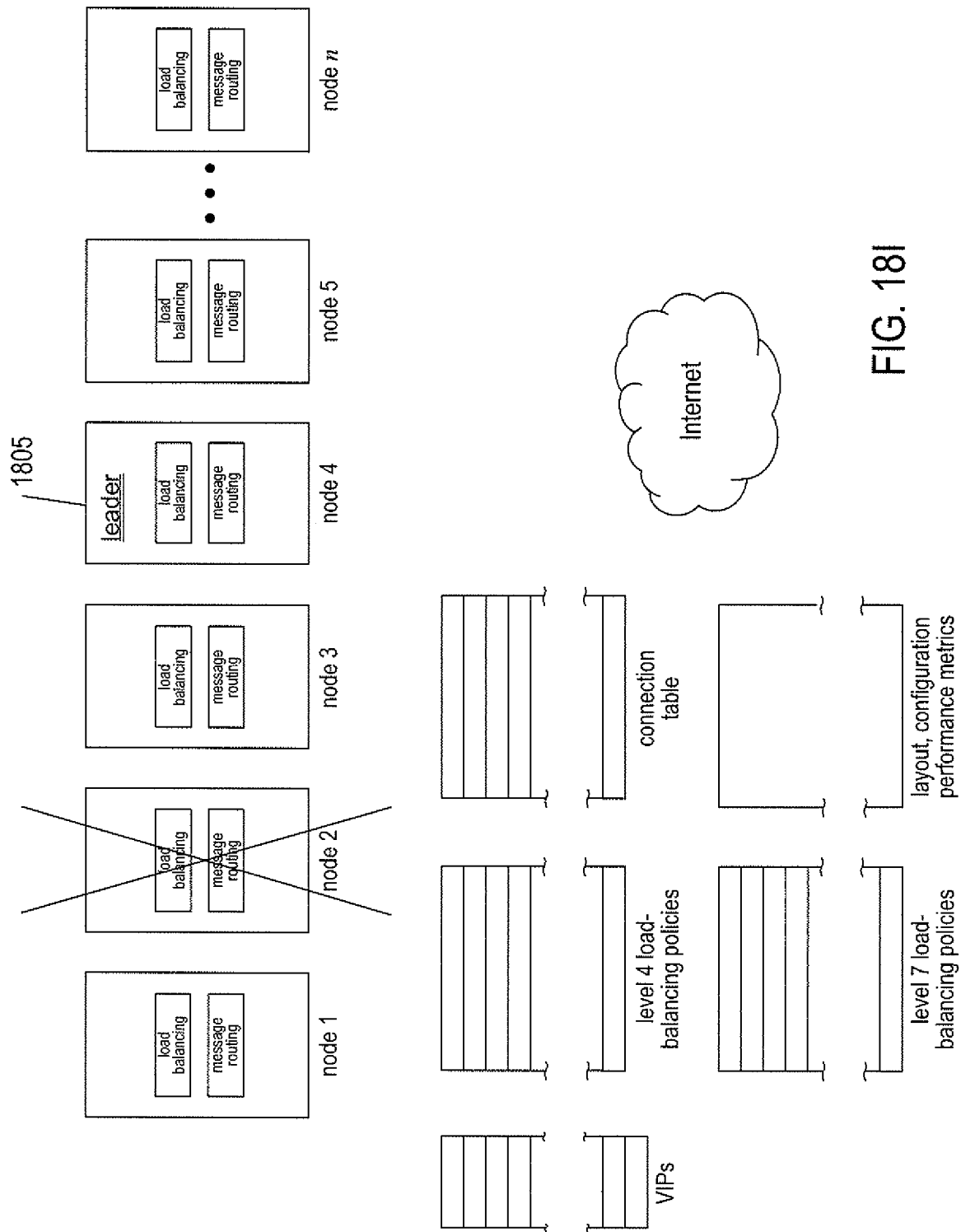

FIGS. 18G-I illustrate one high-availability feature of the layer-4 load-balancing subcomponent of the integrated application-aware load-balancing component. Continuing with the example of FIGS. 18A-F, in FIG. 18G, the leader node 1803 fails due to any of many different possible error conditions and failure conditions, including hardware failures and distributed-application crashes. When the leader associated with one or more VIPs fails, the remaining nodes cooperate to select a new leader in order to resume receiving request messages and directing them to computational nodes for processing via the layer-4 load-balancing subcomponent. Failure of a leader can be detected by a variety of different distributed-computing techniques. For example, the leader may broadcast heartbeat messages at regular time intervals and, when other nodes do not receive a next heartbeat message, additional message exchanges can be undertaken to determine whether or not the leader has failed. Alternatively, the leader may update a value in a distributed shared memory at regular intervals, and when a subsequent update does not occur, the remaining nodes may undertake message exchanges and other processes to determine whether or not the leader has failed. Watchdog processes may be launched within multiple nodes to actively query leaders in order to detect leader failures.

As shown in FIG. 18H, when failure of leader node 1803 has been detected and communicated to the remaining computational nodes 1802 and 1804-1808, the remaining computational nodes access the layout, configuration, and performance data 1834 in order to undertake a leader-election process via message exchanges, represented in FIG. 18H by curved arrows, such as curved arrow 1860. Once a new leader is selected, the layout, configuration, and performance data 1834 is updated to reflect the new leader for one or more VIPs, and the new leader undertakes various processes to acquire ownership of the VIPs previously associated with the failed leader and advertise ownership of the VIPs to communications-systems components in order to begin receiving request messages directed to the VIPs from remote clients. Leader failure may result in request-message-transmission failures, but these failures can be readily ameliorated by retrying the failed request-message transmissions by remote client computers. As shown in FIG. 18I, following the election process, a new leader 1805 resumes managing layer-4 load balancing.

Figure 19:
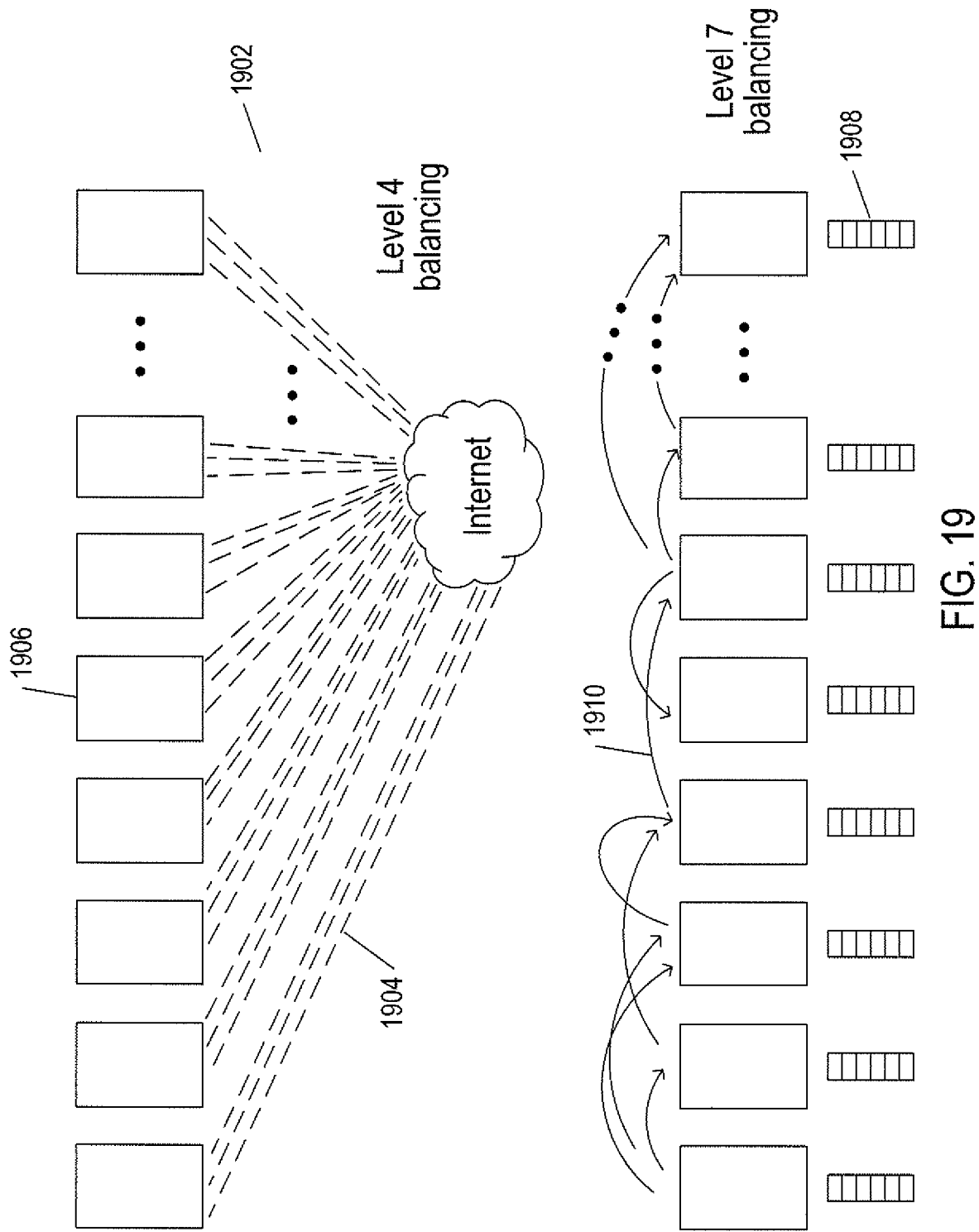
FIG. 19 summarizes operation of the layer-4-balancing subcomponent and the layer-7-load-balancing subcomponent of the integrated application-aware load-balancing component to which the current document is directed.

FIG. 19 summarizes operation of the layer-4-balancing subcomponent and the layer-7-load-balancing subcomponent of the integrated application-aware load-balancing component to which the current document is directed. Layer-4 balancing 1902 is directed at balancing communications connections, requested by client computers to services provided by the distributed service application, fairly among the computational nodes controlled, at least in part, by the distributed service application. In FIG. 19, the connections are represented by dashed lines, such as dashed line 1904, and the computational nodes are represented by rectangles, such as rectangle 1906. In FIG. 19, multiple connections are shown to be uniformly distributed among the computational nodes. However, layer-4 balancing may employ complex policies and rules that are directed to balance computational load rather than simply balancing connections between client computers and computational nodes within the distributed computer system. For example, the request-message traffic volume transmitted over a first particular connection may differ greatly from the request-message traffic volume transmitted through a second particular connection. Were one computational node to end up servicing a number of low-traffic-volume connections while another computational node ended up servicing multiple high-traffic-volume communications connections, the second node could easily be pushed towards its computational bandwidth limit and maximum resource capacity that the second node can provide for servicing client requests, while the first node may only use a small fraction of its available computational bandwidth and resource capacity in order to service the low-traffic-volume connections. Thus, more complex layer-4 load balancing may attempt to use stored performance-monitoring data and operational-characteristics data related to operation of the distributed service application in order to attempt to balance the actual computational load and resource-usage load fairly among the computational nodes, even when that involves non-uniform distribution of connections among the computational nodes. In many cases, layer-4 load balancing may attempt to optimize message distribution with respect to multiple goals and/or constraints. For example, in multi-tenant data centers, message distribution may be constrained by tenant-specific computational-resource allocations, including computational-bandwidth and communications-bandwidth per-tenant allocations. In these case, a fair distribution of workload is desired, but only to the point that per-tenant resource allocations are not violated or compromised. In more complex cases, additional considerations may apply, such as allowing temporary violations of tenant-specific resource allocations when tenants' throughputs are not adversely impacted.

By contrast, the layer-7 load-balancing subcomponent provides a finer-granularity load balancing that seeks to ensure that the computational and resource-usage load is fairly distributed among the computational nodes. This is illustrated in FIG. 19 by equal-length message queues, such as message queue 1908, associated with each of the computational nodes. As discussed above, layer-7 load balancing is carried out by message redistribution, indicated in FIG. 19 by curved arrows, such as curved arrow 1910, among the computational nodes that are, at least partly, controlled by the distributed service application. Layer-7 load balancing can ameliorate computational-load and resource-usage disparities that cannot be predicted and ameliorated by the coarser layer-4 load balancing. Layer-4 load balancing can load balance only by selective distribution of computational nodes to handle incoming connection requests, while layer-7 load balancing can continuously rebalance the actual computational loads, even when the message traffic and computational loads generated by the message traffic vary significantly among the active communications connections. In both cases, the stored configuration, layout, and performance data (1834 in FIG. 18A) for the distributed service application are accessible to the local load-balancing components within the computational nodes of the distributed computer system, allowing the stored data to be used in conjunction with stored policies and rules in order to carry out well-informed load balancing based on an awareness of the computational states of the local instances of the distributed service application in each of the computational nodes controlled, at least in part, by the distributed service application. As mentioned above, load balancing may be controlled by multiple policies, goals, and constraints, resulting in relatively complex load-balancing behaviors.

The integrated application-aware load-balancing component to which the current document is directed differs from currently available and previously developed external load balancers both in employing a combination of layer-4 and layer-7 balancing as well as in using stored configuration, layout, and performance data for the distributed service application in conjunction with load-balancing policies and rules in order to achieve much greater precision in balancing the computational load among the computational nodes as a result of an awareness by the load-balancing component of the detailed computational state of the distributed service application. Multi-level load balancing takes advantage of the different capabilities and benefits of layer-4 and layer-7 load balancing. Layer-4 load balancing, for example, is computationally efficient, but generally suffers from an inability to predict the computational load placed on a distributed service application and distributed-computer system by any particular new connection. By contrast, layer-7 load balancing involves additional message exchanges over local networks within the distributed computer system, which leads to computational and communications-bandwidth overheads, but can correct for actual dynamic loads applied by remote clients that cannot be corrected for by layer-4 load balancing, alone. In addition, layer-7 load balancing, alone, can lead to unfairly burdening certain computational nodes with the initial processing of messages, including message parsing, that are distributed when connections are distributed among the computational nodes by layer-4 load balancing. By using layer-4 load balancing in addition to layer-7 load balancing, the message-exchange overheads and initial-message-processing burdens attendant with layer-7 load balancing can be significantly decreased. In essence, layer-4 load balancing represents a first, coarser-grained and less dynamic load balancing and layer-7 load balancing represents a second, finer-grained and more dynamic load balancing.

Figure 20A:
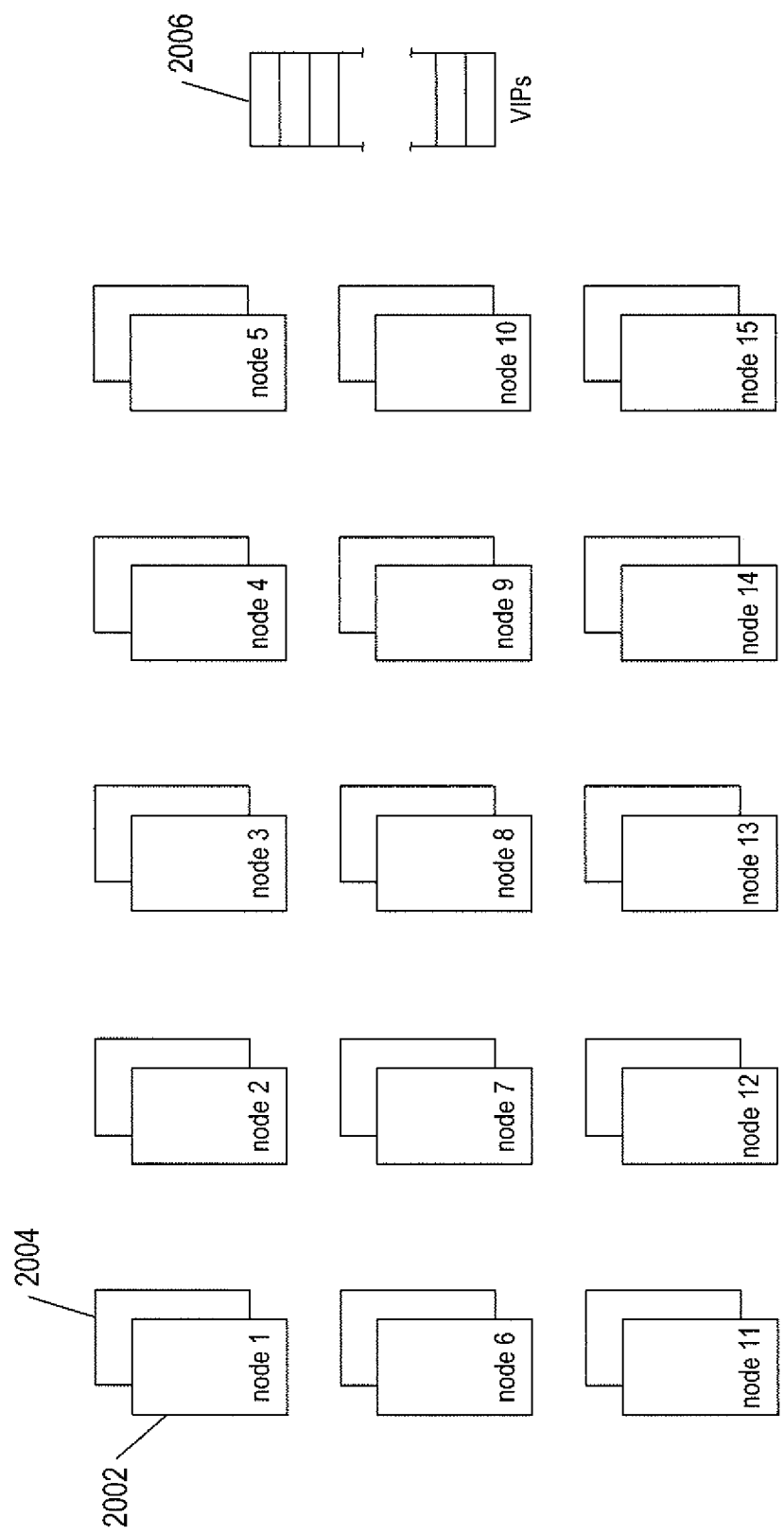
FIGS. 20A-D illustrate an additional aspect of the integrated application-aware load-balancing component to which the current document is directed.

FIGS. 20A-D illustrate an additional aspect of the integrated application-aware load-balancing component to which the current document is directed. FIG. 20A shows a number of computational nodes within a distributed computer system, each labelled with a node number and represented by a rectangle, such as rectangle 2002 representing a first computational node. Each computational node is associated with a second rectangle, such as rectangle 2004 associated with computational node 2002, the area of which represents various computational resources, including as data-storage capacity and networking bandwidth, that is provided by the computational node. The computational bandwidth of the node is represented by the area of the node-number-labelled rectangle, such as rectangle 2002. The computational nodes represent, in the aggregate, the computational bandwidth and system resources potentially available to a distributed service application. In addition, the distributed service application is normally allotted a set of VIPs 2006 to use as service entry points for receiving connection requests and other types of request messages from remote client computers.

Figure 20B:
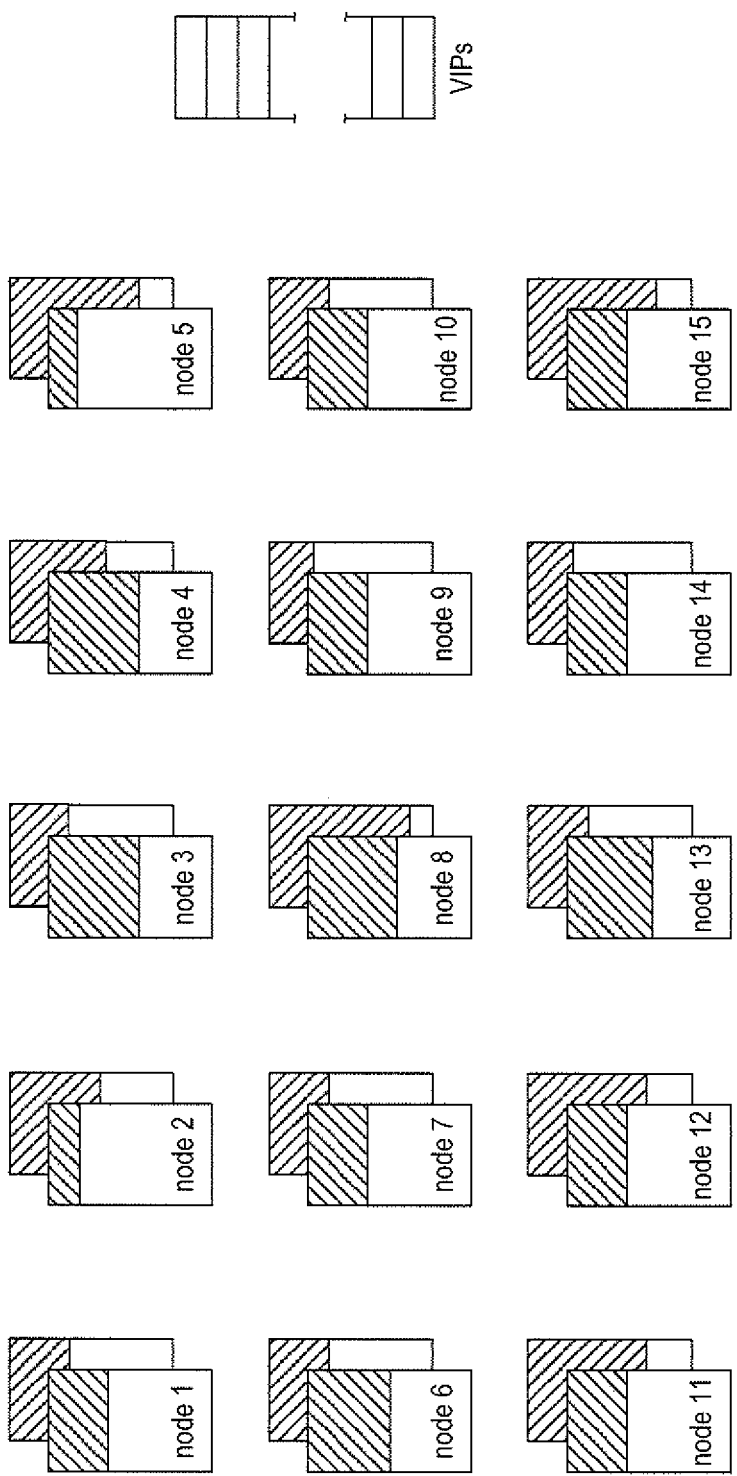
Figure 20C:
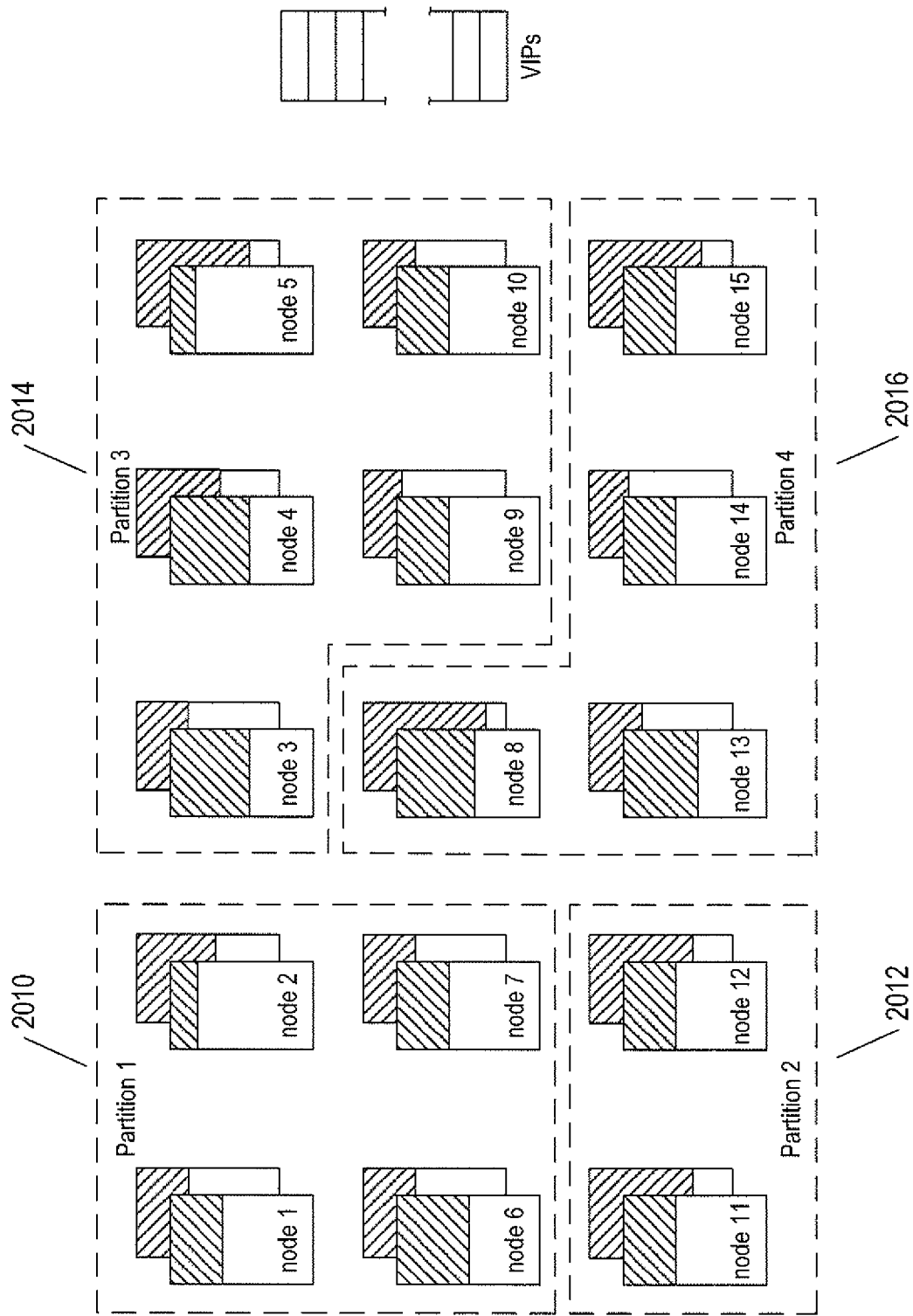
Figure 20D:
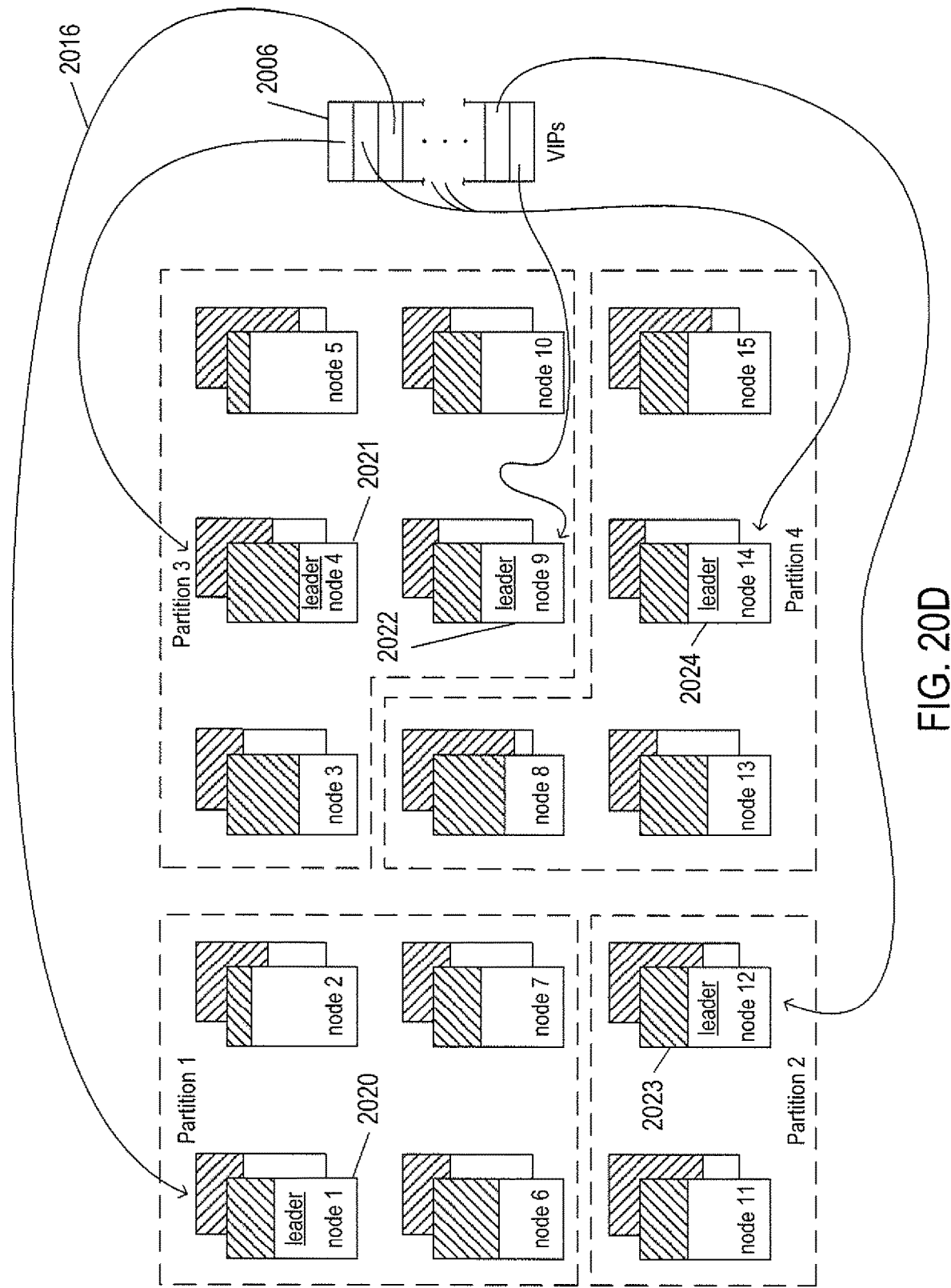

Initially, when a distributed service application is configured and launched within a distributed computer system, the computational bandwidth and resource capacity devoted to execution of the local instance of the distributed service application on each node is determined. FIG. 20B shows, using cross-hatching, the portions of the computational bandwidth and resource capacities allotted for execution of the distributed service application on each node. As shown in FIG. 20C, based on the computational bandwidth and resource capacity potentially allocable by each computational node to the distributed service application, the computational nodes may be partitioned into groups of nodes each devoted to servicing subsets of the total set of services provided by the distributed service application. In FIG. 20C, the partitions are denoted by areas bounded by dashed lines, including a first partition 2010, a second partition 2012, a third partition 2014, and a fourth partition 2016. Finally, as shown in FIG. 20D, one or more leaders 2020-2024 are selected for each partition and the VIPs 2006 are distributed among those leaders, as indicated by curved arrows in FIG. 20D, such as curved arrow 2026. In various different implementations, a computational node may be allowed to belong to multiple partitions, leaders for a partition may be selected from computational nodes that do not belong to that partition, and other, more complex strategies for partitioning and leader selection may be followed. As discussed further, below, distribution of the VIPs is intended to distribute the overhead for layer-4 load balancing among computational nodes so that individual computational nodes are not overwhelmed by layer-4 load balancing as well as to provide a reasonable number of entry points for each of the multiple services provided by the distributed service application. The partitioning of computational nodes and distribution of VIPs is carried out on an application-aware basis by the integrated application-aware load-balancing component to which the current document is directed. Application-aware partitioning and VIP distribution can provide far better informed and more precise distributed-service-application layout and configuration than can be provided by external load balancers and manual and/or script-based distributed-service-application configuration and management. Furthermore, the partitions and VIPs distribution are highly dynamic, so that changes in computational-node partitioning and VIP distribution can be made during distributed-service-application operation in order to track changing distributed-service-application and distributed-computer-system state and configuration.

Figure 21D:
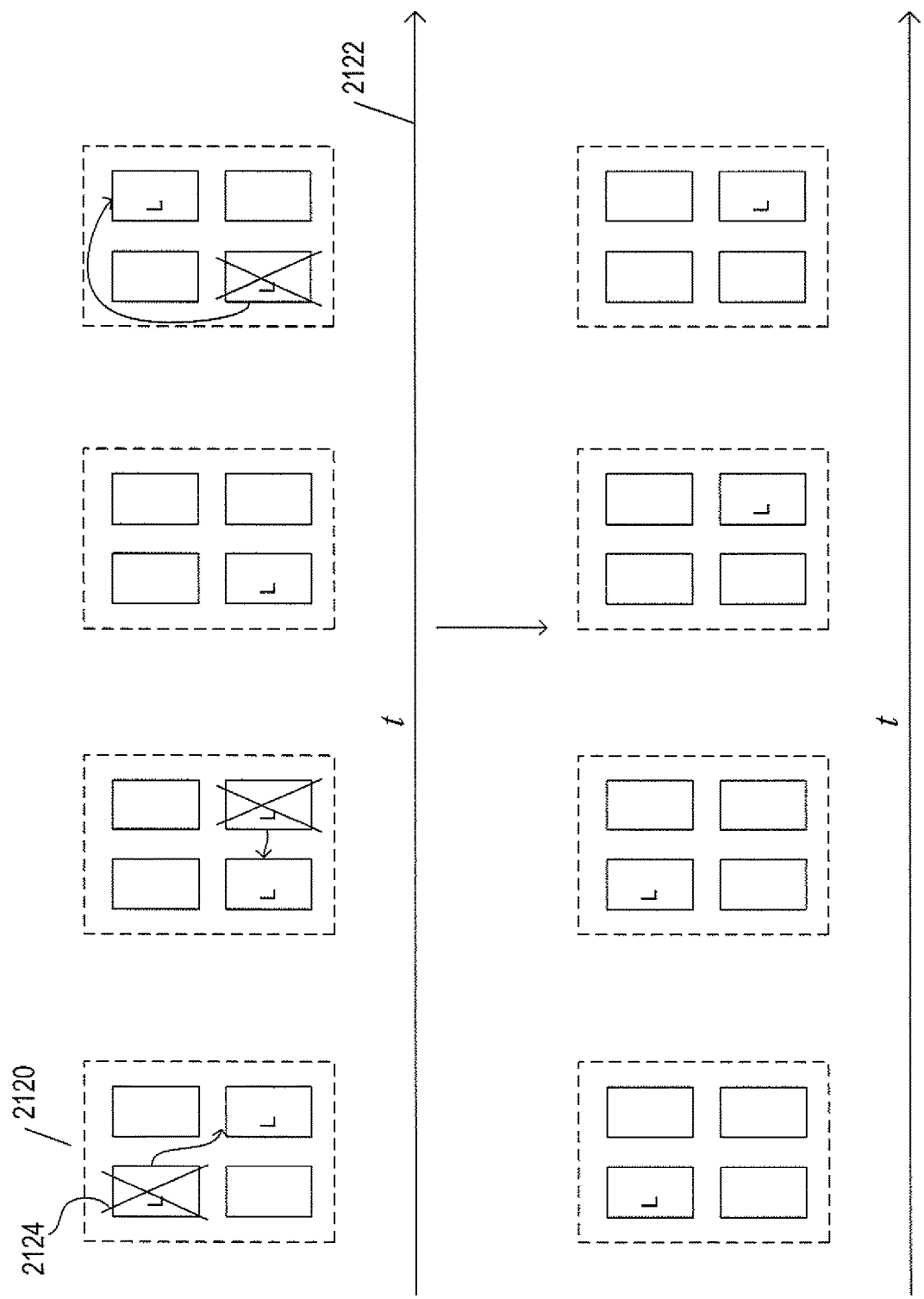

FIGS. 21A-D illustrate various goals and considerations that are addressed by the integrated application-aware load-balancing component to which the current document is directed. FIG. 21A shows a horizontal timeline 2102 and a partition of computational nodes 2104 at various points in time with respect to the timeline. Notice that the leader node for the partition is initially selected to be the top left node 2106 but that, over time, leadership is reassigned to other nodes of the partition. By dynamically reassigning the leadership role among nodes of a partition, no single node is required to bear the burden of layer-4 load balancing for too great a time interval. As discussed above with reference to FIGS. 20A-D, assignment of the leadership role to computational nodes generally assigns leadership roles for one or more VIPs to computational nodes within the partition responsible for servicing requests transmitted to those VIPs. In other words, the overhead of layer-4 load balancing, including routing of received messages through local networks to computational nodes assigned to handle the connections over which the messages are transmitted is borne by the partition responsible for servicing the requests transmitted to the VIPs. Furthermore, as shown in FIG. 20D, multiple leaders may be selected within a single partition to handle subsets of the total number of VIPs allocated to the partition. In this way, no single computational node is burdened with servicing too great a number of VIPs, so that individual computational nodes are not overwhelmed by communications traffic. In certain cases, no single computational node has sufficient communications bandwidth to handle incoming traffic to a partition, as a result of which multiple leaders are needed to service traffic on behalf of the partition. As noted above, both the partitions and the VIPs distribution can change dynamically to respond to differing computational loads, distributed-service-application configurations, scaling within a distributed computer system, and other changes to the computational environment. FIG.

21B illustrates distribution of VIPs among computational nodes of a distributed computer system so that no VIP-associated leader is associated with more than a threshold number of VIPs, no leader is burdened with more than a threshold amount of layer-4 balancing overhead, or that the combination of number of VIPs and amount of layer-4 balancing overhead falls below an aggregate threshold.

Another goal for operation of the integrated application-aware load-balancing component is to minimize inter-node message traffic. As shown in FIG. 21C, non-optimal load balancing may result in high rates of message exchange between nodes of a partition 2110 while optimal load balancing can significantly reduce inter-node communications traffic 2112. As mentioned above, intelligent use of both layer-4 load balancing and layer-7 load balancing can significantly reduce the inter-node message traffic resulting from layer-7 load-balancing request-message redistribution.

Figure 22:
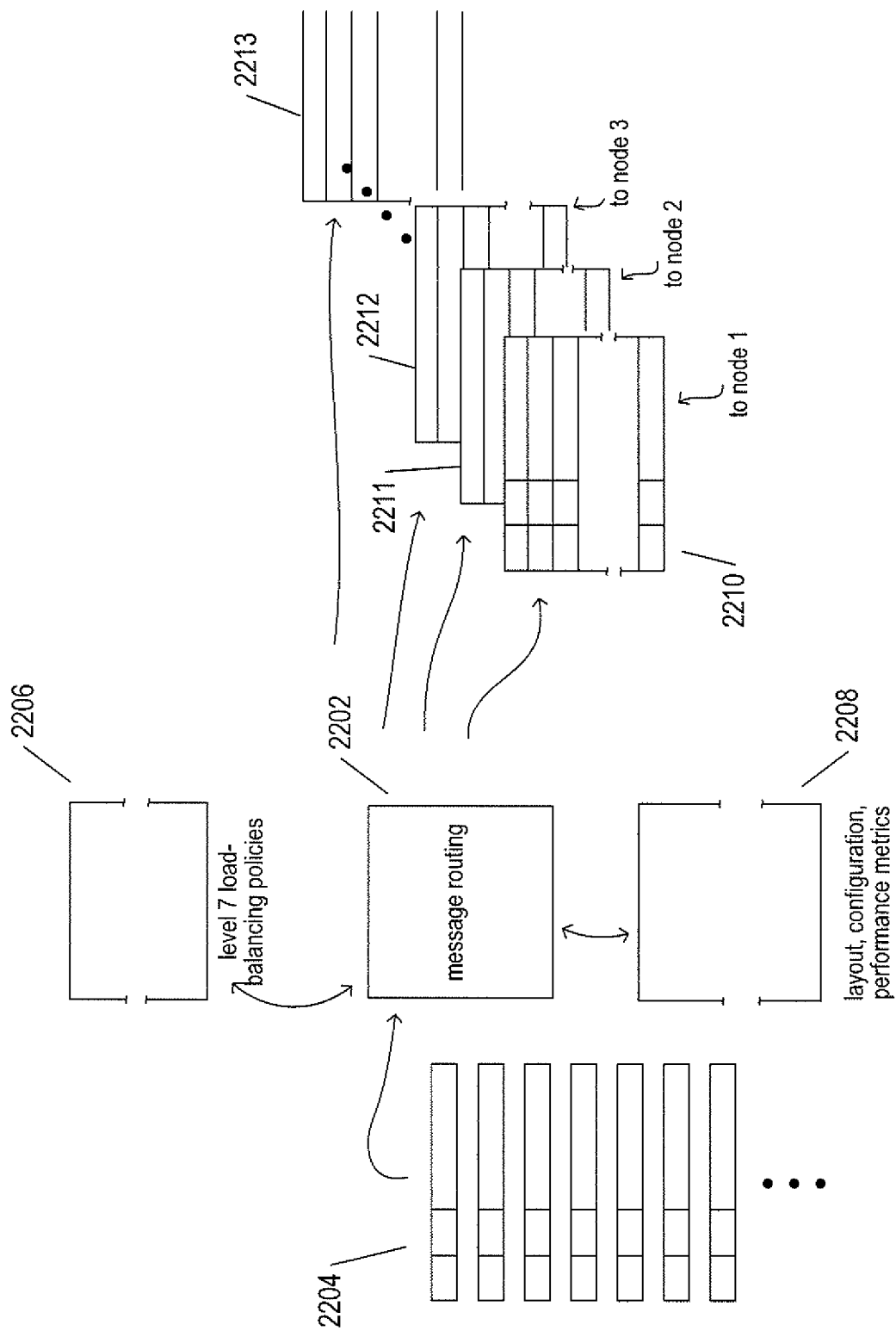
FIG. 22 illustrates yet an additional feature of the currently described integrated application-aware load-balancing component.

FIG. 21D illustrates yet another goal of the integrated application-aware load-balancing component to which the current document is directed. At the top of FIG. 21D, the state of a particular computational-node partition 2120 is shown at various points of time with respect to a horizontal timeline 2122. Because of lack of awareness of the distributed-service-application state, many leader failures occur over the interval of time represented by the horizontal timeline 2122. These failures are illustrated in FIG. 21D by crosses, such as cross 2124, superimposed over leader nodes, where the leader nodes are designed by the label "L." When more application-aware load balancing is carried out, as shown in the lower portion of FIG. 21D, leader failures can be significantly reduced and even largely eliminated. As one example, detailed information about the state of the distributed-service-application and distributed computer system can be used, by various monitoring processes, to anticipate computational-node failures, so that the leader-reselection process can be accelerated when such impending failures are detected. By redistributing leadership roles in anticipation of computational-node failures, the computational overhead, delays, and complexities associated with recovering from leader failures can be avoided. As other examples, both partitions and leaders selected for partitions may be dynamically adjusted in order to recover from computational-node failures, adjust the computational load applied to the computational nodes by the remote processor-controlled client devices, minimize time intervals over which a particular computational node is selected as a layer-4-load-balancing leader, anticipate computational-node failures and operational deterioration, readjust connection and message distribution as a result of changes to distributed-computer-system configuration, as a result of changes to load-balancing policies, and/or to adjust connection and message distribution as a result of internal-monitoring or client feedback FIG. 22 illustrates yet an additional feature of the currently described integrated application-aware load-balancing component. In FIG. 22, the message-routing subcomponent of the load-balancing component within a computational node 2202 is shown to process incoming request messages 2204 by consulting the layer-7 load-balancing policies 2206 and the layout, configuration, and performance data 2208 stored within a distributed computer system to facilitate both layer-4 and layer-7 load balancing. The layer-7 load-balancing subcomponent 2202 queues those incoming messages that are determined to be sent to other computational nodes into output queues 2210-2213 for each of the other computational nodes. When the number of request messages in a particular output queue exceeds a threshold number, at particular time intervals, or in both cases, the messages within an output queue are combined together and sent as an aggregate multi-request-message message to the computational node associated with the output queue. By batching request messages together in this fashion, communications overheads associated with layer-7 load balancing are minimized. As discussed further, below, the layer-7 load-balancing subcomponent may, in certain cases, immediately transmit request messages to another node for processing in synchronous fashion while batching other request messages for asynchronous processing.

Figure 23A:
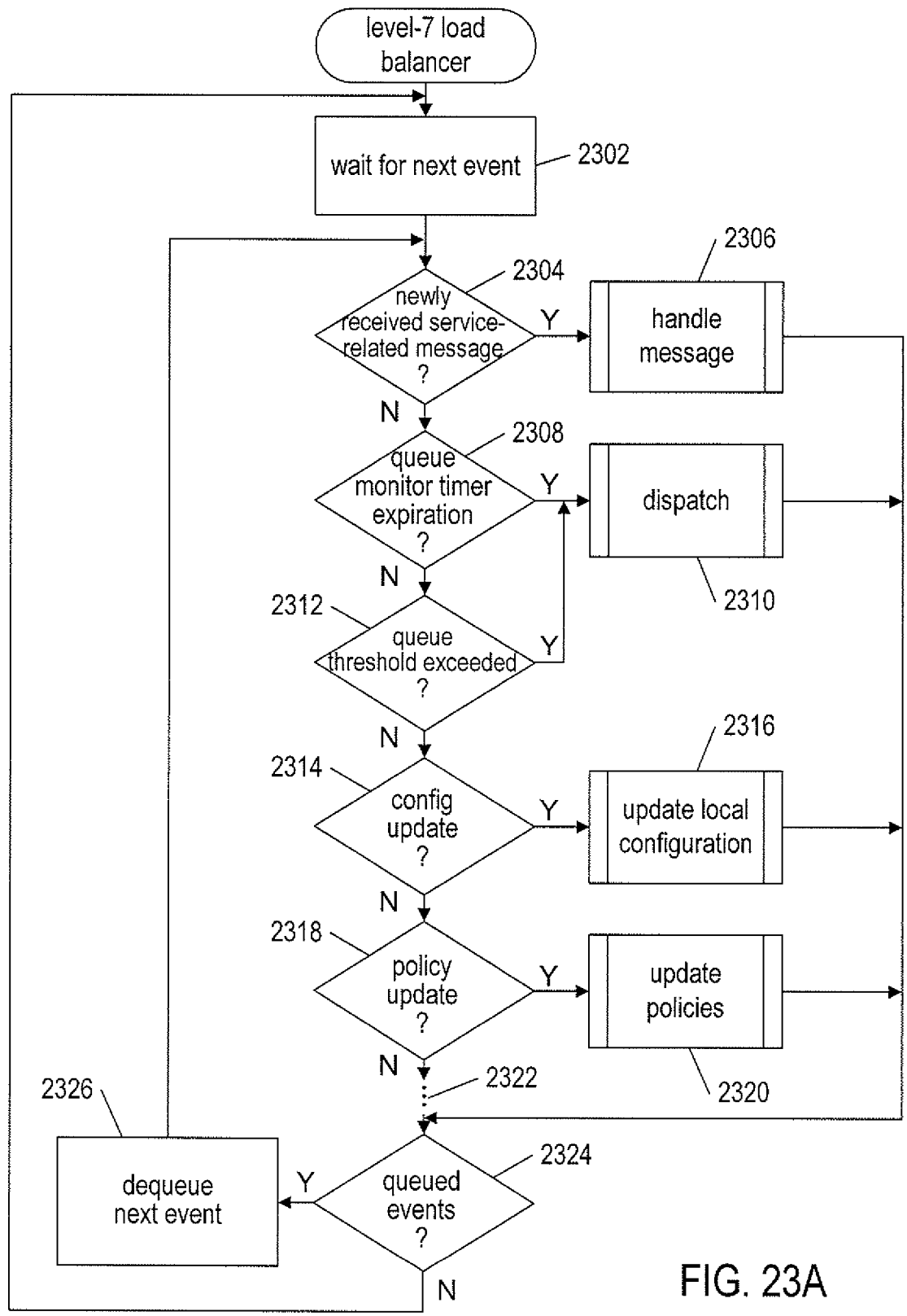
FIGS. 23A-C provide control-flow diagrams that illustrate implementation of the layer-7 load-balancing subcomponent of the integrated application-aware load-balancing component to which the current document is directed.
Figure 23B:
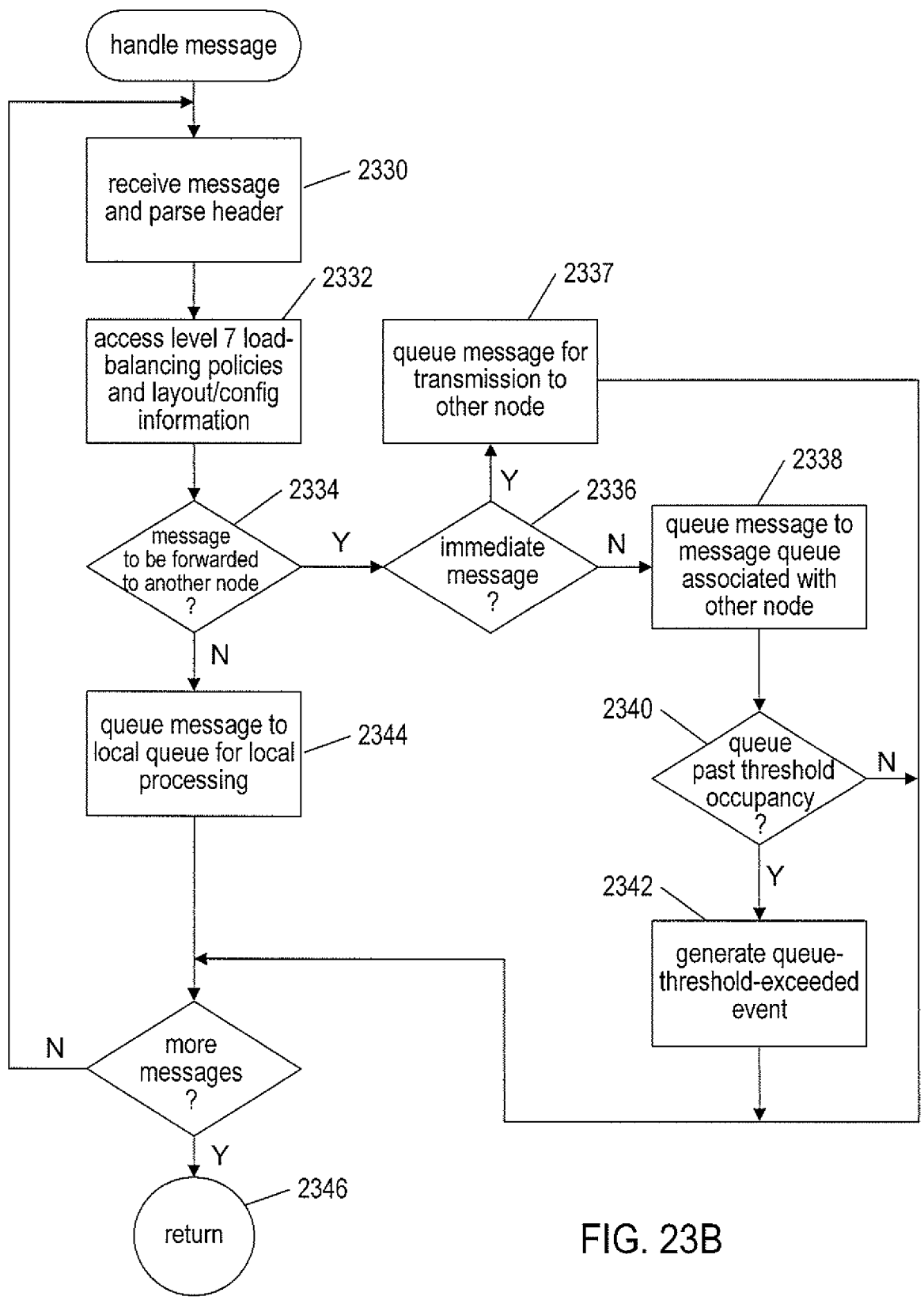
Figure 23C:
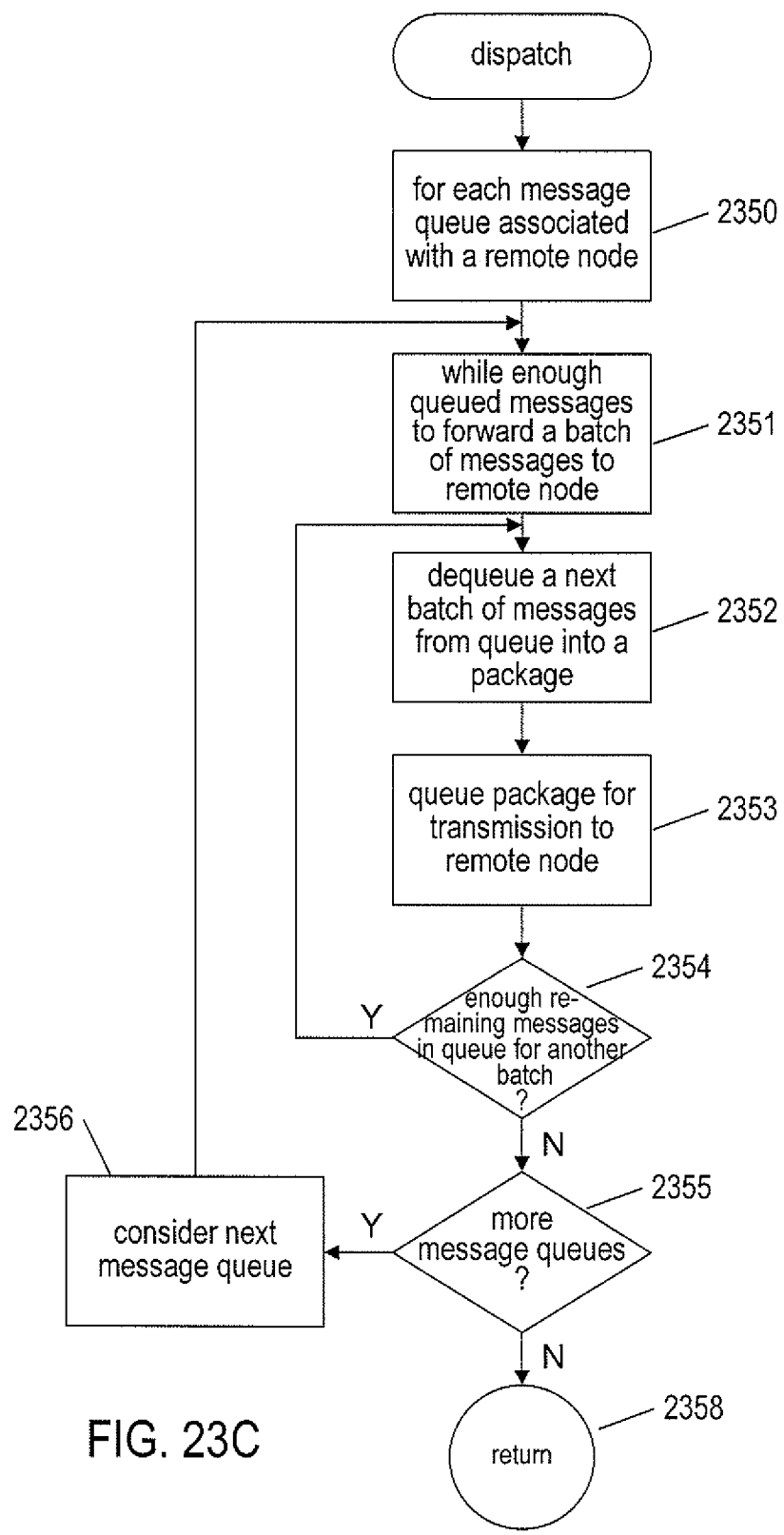

FIGS. 23A-C provide control-flow diagrams that illustrate implementation of the layer-7 load-balancing subcomponent of the integrated application-aware load-balancing component to which the current document is directed. FIG. 23A shows an event loop that underlies layer-7 load balancing. In step 2302, the event loop waits for a next event to occur. When the next-occurring event is the reception of a service-related message, such as a request message, as determined in step 2304, a message handler is called, in step 2306, to process the service-related message and any subsequent messages received prior to completion of the current event-loop iteration. Otherwise, when the next-occurring event is the expiration of a queue-monitor timer, as determined in step 2308, a dispatch routine is called, in step 2310, to bundle asynchronous messages queued for different nodes into aggregate messages for transmission to the other computational nodes, as discussed above with reference to FIG. 22. When the next-occurring event is a queue-threshold-exceeded event, as determined in step 2312, the dispatch routine of step 2310 is called. In certain implementations, the dispatch routine is called with an argument indicating which output queue to dispatch messages from. When the next-occurring event is a configuration-update event, as determined in step 2314, the local configuration, layout, and performance data are updated from the centrally stored data by a call to the update local configuration routine, in step 2316. When the next-occurring event is a policy-update event, as determined in step 2318, an update-policy routine is called in step 2320 to update the local copy of layer-7 load-balancing policies. Ellipses 2322 represent many additional types of events that are handled within the event loop represented in FIG. 23A for the layer-7 load-balancing subcomponent of the currently described integrated-application-aware load-balancing component. When there are additional queued events, as determined in step 2324, a next event is dequeued in step 2326 and control returns to step 2304. Otherwise, control returns to step 2302 where the event loop waits for the occurrence of a next event.

FIG. 23B provides a control-flow diagram for the message handler called in step 2306 in FIG. 23A. In step 2330, a service-related message is received and the message header is parsed. In step 2332, the routine accesses layer-7 load-balancing policies and the local copy of the layout, configuration, and performance data in order to determine to which computational node to forward the service-related message. When it is determined to forward the message to a different computational node, in step 2334, and when the message is of a type that requires immediate, synchronous delivery to the other node, as determined in step 2336, the message is queued for transmission to the other node in step 2337. Otherwise, the message is queued, in step 2338, to a local message queue associated with the other node. When queuing of the message results in the queue occupancy exceeding a threshold occupancy, as determined in step 2340, then, in step 2342, a queue-threshold-exceeded event is generated. When the received message is determined to be processed on the local node, in step 2334, the message is queued to a local queue for local processing, in step 2344. When subsequent messages have been received during processing of the received message, control returns to step 2330 for processing a next received message. Otherwise the message handler returns in step 2346.

FIG. 23C provides a control-flow diagram for the dispatch routine called in step 2310 of FIG. 23A. In the outer for-loop of steps 2350-2356, each message queue associated with a remote computational node is considered. In the inner while-loop of steps 2351-2354, while there are enough queued messages in the currently considered message queue to forward as a batch of messages to the remote node, a next batch of messages is dequeued from the message queue into an aggregate message, or package, in step 2352, which is queued for transmission to the remote node in step 2353. When there are enough remaining messages in the message queue for another batch transmission, as determined in step 2354, control returns to step 2352. Otherwise, when there are more message queues to consider, as determined in step 2355, a next message queue is considered in step 2356 and control flows to the beginning of the inner while-loop of step 2351. Otherwise, the dispatch routine returns, in step 2358.

Figure 24A:
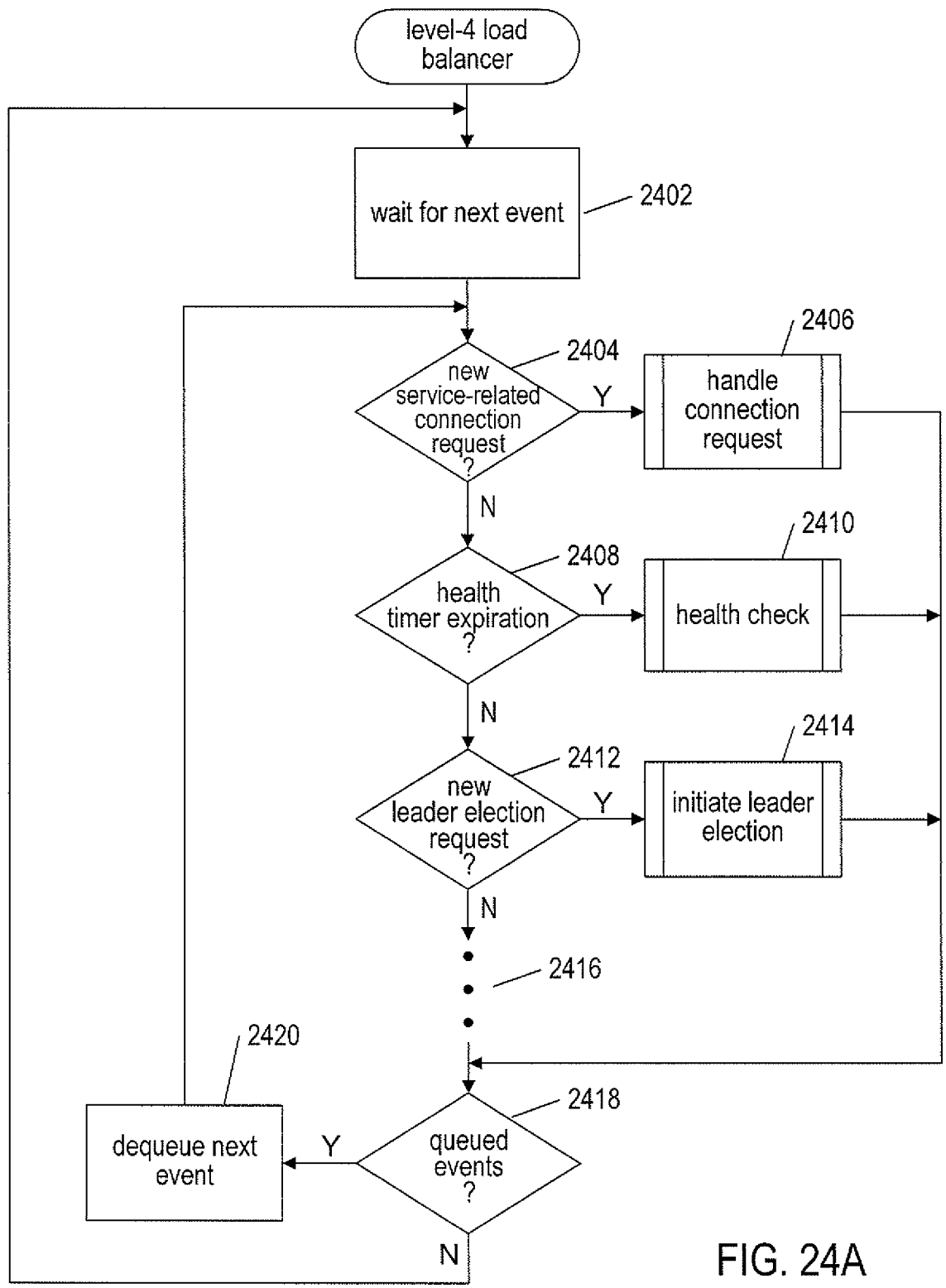
FIGS. 24A-B provide control-flow diagrams that illustrate operation of the layer-4 load-balancing subcomponent of the currently disclosed integrated application-aware load-balancing component.
Figure 24B:
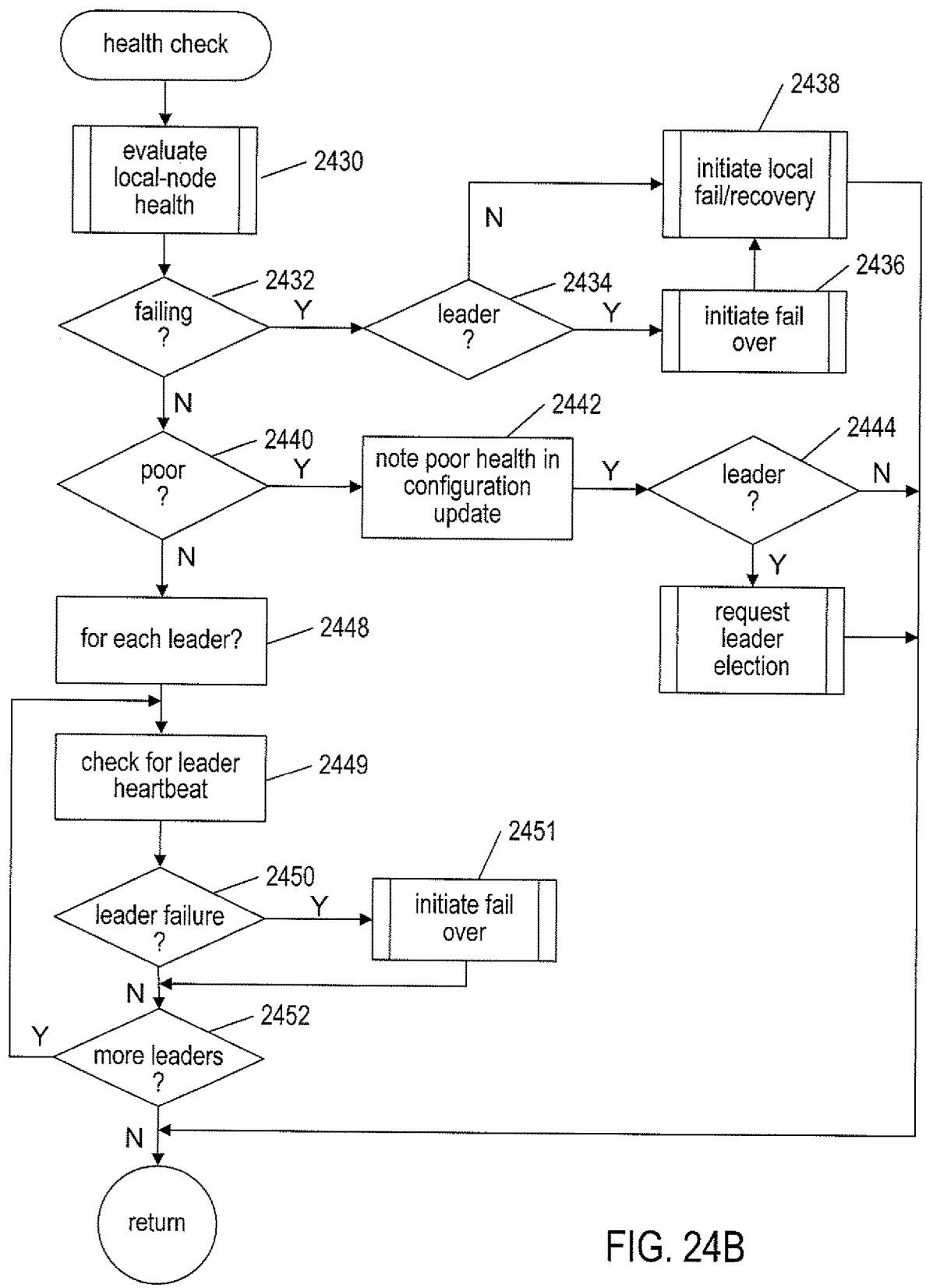

FIGS. 24A-B provide control-flow diagrams that illustrate operation of the layer-4 load-balancing subcomponent of the currently disclosed integrated application-aware load-balancing component. FIG. 24A shows an event loop that underlies implementation of the layer-4 load-balancing subcomponent. In step 2402, the event loop waits for a next event. When the next event is a new service-related connection request, as determined in step 2404, a handle-connection-request routine is called, in step 2406. When the next event is a health-timer-expiration event, as determined in step 2408, a health-check routine is called in step 2410. When the next event is a new leader election request, as determined in step 2412, an initiate-leader-election routine is called in step 2414. Ellipses 2416 indicate that many other types of events are handled by the event loop. When there are more queued events to handle, as determined in step 2418, a next event is dequeued in step 2420 and control returns to step 2404 for processing of the next event. Otherwise, control returns to step 2402 where the event loop waits for the occurrence of a next event.

FIG. 24B provides a control-flow diagram for the health-check routine called in step 2410 of FIG. 24A. In step 2430, an evaluate-local-node-health routine is called that evaluates whether the local node is imminently failing or in poor condition. When the local node is imminently failing, as determined in step 2432, and when the local node is a leader for one or VIPs, as determined in step 2434, then, in step 2436, leader failover is initiated in order to transfer the leader role to another computational node and a local fail/recovery routine is called, in step 2438, to attempt to address the local-node-failing condition. When the local node is in poor health, as determined in step 2440, the poor health of the local node is noted in a configuration update, in step 2442 and, when the local node is a leader for one or more VIPs, as determined in step 2444, a leader election is requested in step 2446. When the local node is not either failing or in poor health, then, in the for-loop of steps 2448-2452, the local node checks for the leader heartbeat for each leader and, when no heartbeat is detected, initiates failover of the leader.

Although the present invention has been described in terms of particular embodiments, it is not intended that the invention be limited to these embodiments. Modifications within the spirit of the invention will be apparent to those skilled in the art. For example, any of many different design and implementation parameters, including modular organization, choice of programming languages, choice of hardware platforms, choice of distributed computer systems and configurations, data structures, control structures, virtualization layers, and other such design and implementation parameters may be varied to generate a variety of different specific implementations of the currently disclosed integrated application-aware load-balancing component of a distributed service application and distributed computer system. The currently disclosed integrated application-aware load-balancing component may be incorporated into a wide variety of different types of distributed applications, including distributed service applications. Many different variations in leader-election methods, node-health and node-failure monitoring are possible. Any of a multitude of different load-balancing policies and rules can be incorporated into the stores layer-4 and layer-7 load-balancing policies, and the load-balancing policies and rules can be dynamically modified, deleted, and augmented during distributed-application operation.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A distributed computer system having multiple computational nodes, each controlled by a local instance of the distributed application that includes a local instance of an integrated, application-aware load-balancing component, the integrated, application-aware load-balancing component comprising:
   a layer-4 load-balancing subcomponent that distributes communications connections initiated by remote processor-controlled client devices to the distributed application among the multiple computational nodes in order to balance the computational load applied to the distributed computer system by the remote processor-controlled client devices; and
   a layer-7 load-balancing subcomponent that redistributes messages transmitted to the distributed computer system by the remote processor-controlled client devices, directed to the distributed application, and received by one or more of the multiple computational nodes among one or more of the multiple computational nodes in order to balance the computational load applied to the distributed computer system by the remote processor-controlled client devices.

2. The integrated, application-aware load-balancing component of claim 1 wherein the distributed computer system further includes a set of virtual IP addresses allocated to the distributed application, a connection table, layer-4 load-balancing policies, layer-7 load-balancing policies, representations of the layout and configuration of the distributed application within the distributed computer system, performance-metric values and representations of operational characteristics of the distributed application.

3. The integrated, application-aware load-balancing component of claim 2 wherein the set of virtual IP addresses allocated to the distributed application, a connection table, layer-4 load-balancing policies, layer-7 load-balancing policies, representations of the layout and configuration of the distributed application within the distributed computer system, performance-metric values and representations of operational characteristics of the distributed application are stored in one or more memories and/or mass-storage devices within the distributed computer system and accessed by the local instances of the distributed application that control the multiple computational nodes.

4. The integrated, application-aware load-balancing component of claim 3 wherein local copies of the set of virtual IP addresses allocated to the distributed application, a connection table, layer-4 load-balancing policies, layer-7 load-balancing policies, representations of the layout and configuration of the distributed application within the distributed computer system, performance-metric values and representations of operational characteristics of the distributed application are stored by the multiple computational nodes.

5. The integrated, application-aware load-balancing component of claim 2 wherein the integrated, application-aware load-balancing component partitions the multiple computational nodes into one or more computational partitions, selects one or more of the computational nodes in each computational partition as layer-4-load-balancing leaders for the partition, and assigns one or more virtual IP addresses from the set of virtual IP addresses to each layer-4-load-balancing leader.

6. The integrated, application-aware load-balancing component of claim 5 wherein the integrated, application-aware load-balancing component modifies one or more of the assignment of computational nodes to partitions, the selections of computational nodes as layer-4-load-balancing leaders, and the assignment of virtual IP addresses to layer-4-load-balancing leaders during operation of the distributed application in order to recover from computational-node failures, adjust the computational load applied to the computational nodes by the remote processor-controlled client devices, minimize time intervals over which a particular computational node is selected as a layer-4-load-balancing leader, anticipate computational-node failures and operational deterioration, readjust connection and message distribution as a result of changes to distributed-computer-system configuration, as a result of changes to load-balancing policies, and/or to adjust connection and message distribution as a result of internal-monitoring or client feedback.

7. The integrated, application-aware load-balancing component of claim 5 wherein, when a new connection request is received by a layer-4-load-balancing leader, the layer-4-load-balancing leader accesses the layer-4 load-balancing policies, representations of the layout and configuration of the distributed application within the distributed computer system, and performance-metric values and representations of operational characteristics of the distributed application and uses information obtained by accessing the layer-4 load-balancing policies, representations of the layout and configuration of the distributed application within the distributed computer system, and performance-metric values and representations of operational characteristics of the distributed application to select a computational node to which to forward the connection request so that the computational load applied to the distributed computer system by the remote processor-controlled client devices is balanced among the multiple computational nodes.

8. The integrated, application-aware load-balancing component of claim 7 wherein, after selecting the computational node to which to forward the connection request, the layer-4-load-balancing leader generates an internal connection-request message that the layer-4-load-balancing leader forwards to the selected computational node through one or more local networks and updates the connection table to reflect establishment of a connection between the selected computational node and a remote client device that transmitted the connection request to the layer-4-load-balancing leader.

9. The integrated, application-aware load-balancing component of claim 8 wherein the selected computational node returns a connection-request response message to the remote client device that transmitted the connection request to the layer-4-load-balancing leader.

10. The integrated, application-aware load-balancing component of claim 5 wherein, when a message is received by a layer-4-load-balancing leader from a remote client device within the context of an existing communication connection, the layer-4-load-balancing leader accesses the connection table to determine that the message is within the context of the existing communication connection, uses information in the connection table to identify the computational node to which the existing communication connection is established, and generates an internal message that includes the received message and that the layer-4-load-balancing leader forwards to the identified computational node.

11. The integrated, application-aware load-balancing component of claim 10 wherein, after receiving the generated internal message, the identified computational node returns a response message to the remote client device.

12. The integrated, application-aware load-balancing component of claim 5 wherein the layer-7 load-balancing subcomponent of each computational node, upon receiving a generated internal message that includes a request message that requests performance of a service by the distributed application on behalf of a remote client device, accesses the layer-7 load-balancing policies, representations of the layout and configuration of the distributed application within the distributed computer system, and performance-metric values and representations of operational characteristics of the distributed application and uses information obtained by accessing the layer-7 load balancing policies, representations of the layout and configuration of the distributed application within the distributed computer system, and performance-metric values and representations of operational characteristics of the distributed application to select a computational node to which to forward the request message for processing.

13. The integrated, application-aware load-balancing component of claim 12 wherein, after selecting the computational node to which to forward the request message for processing, the layer-7 load-balancing subcomponent determines, based on the type of request message, whether to forward the request message for processing synchronously or asynchronously to the selected computational node.

14. The integrated, application-aware load-balancing component of claim 12 wherein, when the layer-7 load-balancing subcomponent determines to synchronously forward the request message for processing, the layer-7 load-balancing subcomponent queues the request message for immediate transmission through one or more local area networks to the selected computational node.

15. The integrated, application-aware load-balancing component of claim 12 wherein, when the layer-7 load-balancing subcomponent determines to asynchronously forward the request message for processing, the layer-7 load-balancing subcomponent queues the request message to an output queue associated with the selected computational node.

16. The integrated, application-aware load-balancing component of claim 12 wherein the layer-7 load-balancing subcomponent dequeues multiple queued messages from the output queue and forwards them as a single batch of messages to the selected computational node.

17. A method for balancing a computational load applied by remote processor-controlled client devices to computational nodes within a distributed computer system controlled by a distributed application, the method comprising:
   including an integrated, application-aware load-balancing component in the distributed application, the integrated, application-aware load-balancing component comprising
   a layer-4 load-balancing subcomponent that distributes communications connections from remote processor-controlled client devices to the distributed application among the multiple computational nodes in order to balance the computational load applied to the distributed computer system by the remote processor-controlled client devices, and
   a layer-7 load-balancing subcomponent that redistributes messages transmitted to the distributed computer system by the remote processor-controlled client devices, directed to the distributed application, and received by one or more of the multiple computational nodes among one or more of the multiple computational nodes in order to balance the computational load applied to the distributed computer system by the remote processor-controlled client devices.

18. The method of claim 17 further including:
   storing, within the distributed computer system, a set of virtual IP addresses allocated to the distributed application, a connection table, layer-4 load-balancing policies, layer-7 load-balancing policies, representations of the layout and configuration of the distributed application within the distributed computer system, performance-metric values and representations of operational characteristics of the distributed application.

19. A physical data-storage device that stores computer instructions that, when executed by one or more processors of multiple computational nodes within a distributed computer system, generate, on each computational node, a load-balancing component of a distributed application comprising:
   a layer-4 load-balancing subcomponent that distributes communications connections from remote processor-controlled client devices to the distributed application among the multiple computational nodes in order to balance the computational load applied to the distributed computer system by the remote processor-controlled client devices, and
   a layer-7 load-balancing subcomponent that redistributes messages transmitted to the distributed computer system by the remote processor-controlled client devices, directed to the distributed application, and received by one or more of the multiple computational nodes among one or more of the multiple computational nodes in order to balance the computational load applied to the distributed computer system by the remote processor-controlled client devices.

20. The physical data-storage device of claim 19 wherein computer instructions, when executed by one or more processors of multiple computational nodes within a distributed computer system, store, within the distributed computer system, a set of virtual IP addresses allocated to the distributed application, a connection table, layer-4 load-balancing policies, layer-7 load-balancing policies, representations of the layout and configuration of the distributed application within the distributed computer system, performance-metric values and representations of operational characteristics of the distributed application.

* * * * *